US010977435B2

(12) United States Patent
Convertino et al.

(10) Patent No.: US 10,977,435 B2
(45) Date of Patent: Apr. 13, 2021

(54) METHOD, APPARATUS, AND COMPUTER-READABLE MEDIUM FOR VISUALIZING RELATIONSHIPS BETWEEN PAIRS OF COLUMNS

(71) Applicant: Informatica LLC, Redwood City, CA (US)

(72) Inventors: Gregorio Convertino, Sunnyvale, CA (US); Maoyuan Sun, Blacksburg, VA (US)

(73) Assignee: Informatica LLC, Redwood City, CA (US)

(*) Notice: Subject to any disclaimer, the term of this patent is extended or adjusted under 35 U.S.C. 154(b) by 1224 days.

(21) Appl. No.: 14/981,053

(22) Filed: Dec. 28, 2015

(65) Prior Publication Data
US 2017/0185668 A1  Jun. 29, 2017

(51) Int. Cl.
G06F 40/18 (2020.01)
G06F 17/18 (2006.01)
G06T 11/20 (2006.01)

(52) U.S. Cl.
CPC .............. *G06F 40/18* (2020.01); *G06F 17/18* (2013.01); *G06T 11/206* (2013.01)

(58) Field of Classification Search
CPC ......... G06F 40/18; G06F 17/18; G06T 11/206
See application file for complete search history.

(56) References Cited

U.S. PATENT DOCUMENTS

| 8,990,675 | B2* | 3/2015 | Folting | G06Q 10/10 715/212 |
| 9,507,824 | B2* | 11/2016 | Young | G06F 17/30454 |
| 9,779,147 | B1* | 10/2017 | Sherman | G06F 17/30392 |
| 9,779,150 | B1* | 10/2017 | Sherman | G06F 17/30572 |
| 2004/0122646 | A1* | 6/2004 | Colossi | G06F 17/30592 703/22 |
| 2009/0007060 | A1* | 1/2009 | Hall | G06F 8/34 717/105 |
| 2009/0313246 | A1* | 12/2009 | Saito | G06F 17/30864 |
| 2011/0178974 | A1* | 7/2011 | Sayal | G06N 5/022 706/50 |
| 2012/0310874 | A1* | 12/2012 | Dantressangle | G06F 17/30315 707/600 |

(Continued)

*Primary Examiner* — Alicia M Willoughby
(74) *Attorney, Agent, or Firm* — Amardeep S. Grewal; Reed Smith LLP

(57) ABSTRACT

An apparatus, computer-readable medium, and computer-implemented method for visualizing relationships between pairs of columns, comprising identifying a relationship classification corresponding to two columns in a plurality of columns based on a data type of each column in the two columns, applying one or more statistical measures to data in the two columns to generate association data quantifying a plurality of relationships between data values in a first column of the two columns and data values in a second column of the two columns, wherein the one or more statistical measures are determined based at least in part on the relationship classification, and transforming the association data into a visualization, wherein the visualization comprises one or more indicators corresponding to one or more relationships in the plurality of relationships and wherein a layout of the visualization is determined based on the relationship classification.

90 Claims, 48 Drawing Sheets

(56) References Cited

U.S. PATENT DOCUMENTS

| | | | |
|---|---|---|---|
| 2014/0114707 A1* | 4/2014 | Rope | G06Q 10/10 |
| | | | 705/7.11 |
| 2014/0375544 A1* | 12/2014 | Venable | G06F 3/013 |
| | | | 345/156 |
| 2015/0067556 A1* | 3/2015 | Tibrewal | G06F 17/30598 |
| | | | 715/765 |
| 2015/0095105 A1* | 4/2015 | Fitts | G06Q 30/0201 |
| | | | 705/7.29 |
| 2015/0339369 A1* | 11/2015 | Rais-Ghasem | G06F 17/30589 |
| | | | 707/739 |
| 2016/0103885 A1* | 4/2016 | Lee | G06F 17/30539 |
| | | | 707/739 |
| 2017/0116228 A1* | 4/2017 | Alberg | G06F 17/30294 |
| 2018/0122109 A1* | 5/2018 | Li | G06T 7/13 |

\* cited by examiner

Receive a selection of two column identifiers corresponding to two columns in the plurality of columns

101

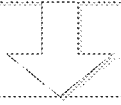

Identify a relationship classification corresponding to the two columns in the plurality of columns based on a data type of each column in the two columns

102

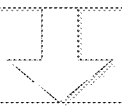

Determine one or more statistical measures based on the relationship classification

103

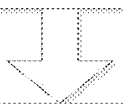

Apply one or more statistical measures to data in the two columns to generate association data quantifying a plurality of relationships between data values in a first column of the two columns and data values in a second column of the two columns

104

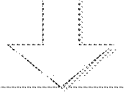

Transform the association data into a visualization

| Athlete ID 201 | Nationality 202 | Sport 203 | Finish 204 | Age 205 |
|---|---|---|---|---|
| 422 | Ghana | Basketball | Third | 24 |
| 311 | Chile | Soccer | First | 25 |
| 132 | Ecuador | Tennis | Second | 19 |
| 533 | Egypt | Soccer | Ninth | 27 |
| 316 | Chile | Soccer | First | 22 |
| 543 | Italy | Soccer | Second | 21 |
| 124 | France | Tennis | First | 20 |
| 132 | Canada | Hockey | Second | 26 |
| 131 | Russia | Hockey | First | 28 |
| 316 | India | Cricket | First | 25 |
| 123 | Japan | Baseball | Second | 29 |
| 134 | U.S.A. | Baseball | First | 24 |
| 756 | Botswana | Cricket | Sixth | 27 |
| 357 | Iran | Soccer | Twelfth | 22 |
| 364 | France | Soccer | Third | 21 |
| 265 | Egypt | Soccer | Ninth | 24 |
| 975 | U.S.A. | Soccer | Tenth | 25 |

Relate Columns — 206

Fig. 2

| Athlete ID 701A | Nationality 702A | Sport 703A | Finish 704A | Age 705A |
|---|---|---|---|---|
| 422 | Ghana | Basketball | Third | 24 |
| 311 | Chile | Soccer | First | 25 |
| 132 | Ecuador | Tennis | Second | 19 |
| 533 | Egypt | Soccer | Ninth | 27 |
| 316 | Chile | Soccer | First | 22 |
| 543 | Italy | Soccer | Second | 21 |
| 124 | France | Tennis | First | 20 |
| 132 | Canada | Hockey | Second | 26 |
| 131 | Russia | Hockey | First | 28 |
| 316 | India | Cricket | First | 25 |
| 123 | Japan | Baseball | Second | 29 |
| 134 | U.S.A. | Baseball | First | 24 |
| 756 | Botswana | Cricket | Sixth | 27 |
| 357 | Iran | Soccer | Twelfth | 22 |
| 364 | France | Soccer | Third | 21 |
| 265 | Egypt | Soccer | Ninth | 24 |
| 975 | U.S.A. | Soccer | Tenth | 25 |
| ... | ... | ... | ... | ... |

```
┌─────────────────────────────────────────────────────────────────────────────┐
│ Receive, via the interface, a selection of a range of data values in the    │
│ distribution of data values in the second column                            │
│                                                                             │
│                                   1501                                      │
└─────────────────────────────────────────────────────────────────────────────┘
                                      │
                                      ▼
┌─────────────────────────────────────────────────────────────────────────────┐
│ Apply the one or more global statistical measures to the data in the first  │
│ column and data corresponding to the selected range of data values in the   │
│ second column to generate new global association data                       │
│                                                                             │
│                                   1502                                      │
└─────────────────────────────────────────────────────────────────────────────┘
                                      │
                                      ▼
┌─────────────────────────────────────────────────────────────────────────────┐
│ Apply the one or more categorical statistical measures to the data in the   │
│ first column and data corresponding to the selected range of data values in │
│ the second column to generate new categorical association data quantifying  │
│ each relationship between each category in the first column and the         │
│ selected range of data values in the second column                          │
│                                                                             │
│                                   1503                                      │
└─────────────────────────────────────────────────────────────────────────────┘
                                      │
                                      ▼
┌─────────────────────────────────────────────────────────────────────────────┐
│ Apply the one or more categorical statistical measures to the data in the   │
│ first column and data corresponding to a plurality of subsets of the        │
│ selected range of data values to generate subset categorical association    │
│ data quantifying each relationship between each category in the first       │
│ column and each subset in the plurality of subsets of the selected range    │
│ of data values in the second column                                         │
│                                                                             │
│                                   1504                                      │
└─────────────────────────────────────────────────────────────────────────────┘
                                      │
                                      ▼
┌─────────────────────────────────────────────────────────────────────────────┐
│ Update the visualization with one or more of the new global association     │
│ data, the new categorical association data, or the subset categorical       │
│ association data                                                            │
│                                                                             │
│                                   1505                                      │
└─────────────────────────────────────────────────────────────────────────────┘
```

Fig. 15

METHOD, APPARATUS, AND COMPUTER-READABLE MEDIUM FOR VISUALIZING RELATIONSHIPS BETWEEN PAIRS OF COLUMNS

BACKGROUND

Spreadsheet-based applications are frequently used to analyze large data sets and provide business intelligence or provide data-based answers to specific questions. For example, many business users utilize applications such as Microsoft Excel, Informatica REV, or Trifacta Wrangler, to review and analyze data in order to answer a specific business question in a timely way.

Spreadsheets and other large data sets are frequently organized into columns, which can be thought of as the stored measurements of a variable or a finite set of values stored in a table and associated with a particular variable. One of the drawbacks of current spreadsheet-based applications is that they do not progressively enable the analysis of column-to-column relationships by a business user as she opens a new spreadsheet or table of data. The need of the business user, typically not an expert in statistics, is to first easily identify relevant column-to-column relationships as she opens a new data set and then, upon demand, drill into details to understand the relationship that allow her to answer a specific business question.

Real spreadsheets used in businesses contain a mix of numerical and categorical variables. Moreover the number of columns can be significantly large. Thus the progressive disclosure of details is critical to guide the business user towards relevant relationships. Without any guidance regarding potential relationships among different types of data sets in a spreadsheet, a business user utilizing a spreadsheet program will have difficulty identifying and analyzing the information relevant to their respective inquiry.

Another drawback of current spreadsheet applications is that they do not help users understand relationships between two columns where one or both columns are categorical. A categorical column is a column which includes nominal or ordinal variables that can take on values as elements of a bounded discrete set (e.g., a column of categories of buyers or categories of products bought in a spreadsheet being analyzed by a data analyst in a sales department).

The spreadsheet tools (Microsoft Excel, Informatica REV, Trifacta Wrangler Wrangler) for business users support single-column profiling: the tool may provide direct or indirect ways to view column profiling information such as the total values in the column and sub-total by category in that column (such as the bottom panel of the user interface in Informatica REV, the top panel in of the user interface in Trifacta Wrangler, or the pivot table user interface in Microsoft Excel). However, these tools do not show the user if two columns are related and what the nature of the relationship is. For example, if the columns are customer categories (A) and sales territories (B), these tools do show users if the distribution of customer categories (A) changes across territories (B).

On the other hand, tools for data professionals, such as statistical tools (e.g., SAS, IBM SPSS, R) and visualization (TIBCO Software, Tableau Software) tools are typically too complex and time-demanding for the average business user. The statistical tools require the user to make decisions beforehand and assume that the user (i.e. the statistician, data scientist, or skilled data analyst) knows in advance what statistical and visualization methods to select in order to analyze the relationship (e.g., the statistical test and the visualization to be used) or has the time and skills to find it out interactively. For example, many statistical tools require the selection of a "relationship method" which is used to select the specific statistical analysis that is applied to two data sets. However, the business user has different training, needs, and constraints than statisticians or data scientists. In particular, the business user typically lacks both statistics training and the time necessary to drill into each relationship using statistical software (e.g., SAS, IBM SPSS, R).

BRIEF DESCRIPTION OF THE DRAWINGS

FIG. 1 illustrates a flowchart for visualizing relationships between pairs of columns according to an exemplary embodiment.

FIG. 2 illustrates an interface for relating a pair of columns according to an exemplary embodiment.

FIGS. 7A-7E illustrate an interface including relationship indicators according to an exemplary embodiment.

FIG. 15 illustrates a flowchart for updating a categorical-numerical visualization in response to selection of a range according to an exemplary embodiment.

DETAILED DESCRIPTION

Figure 3:
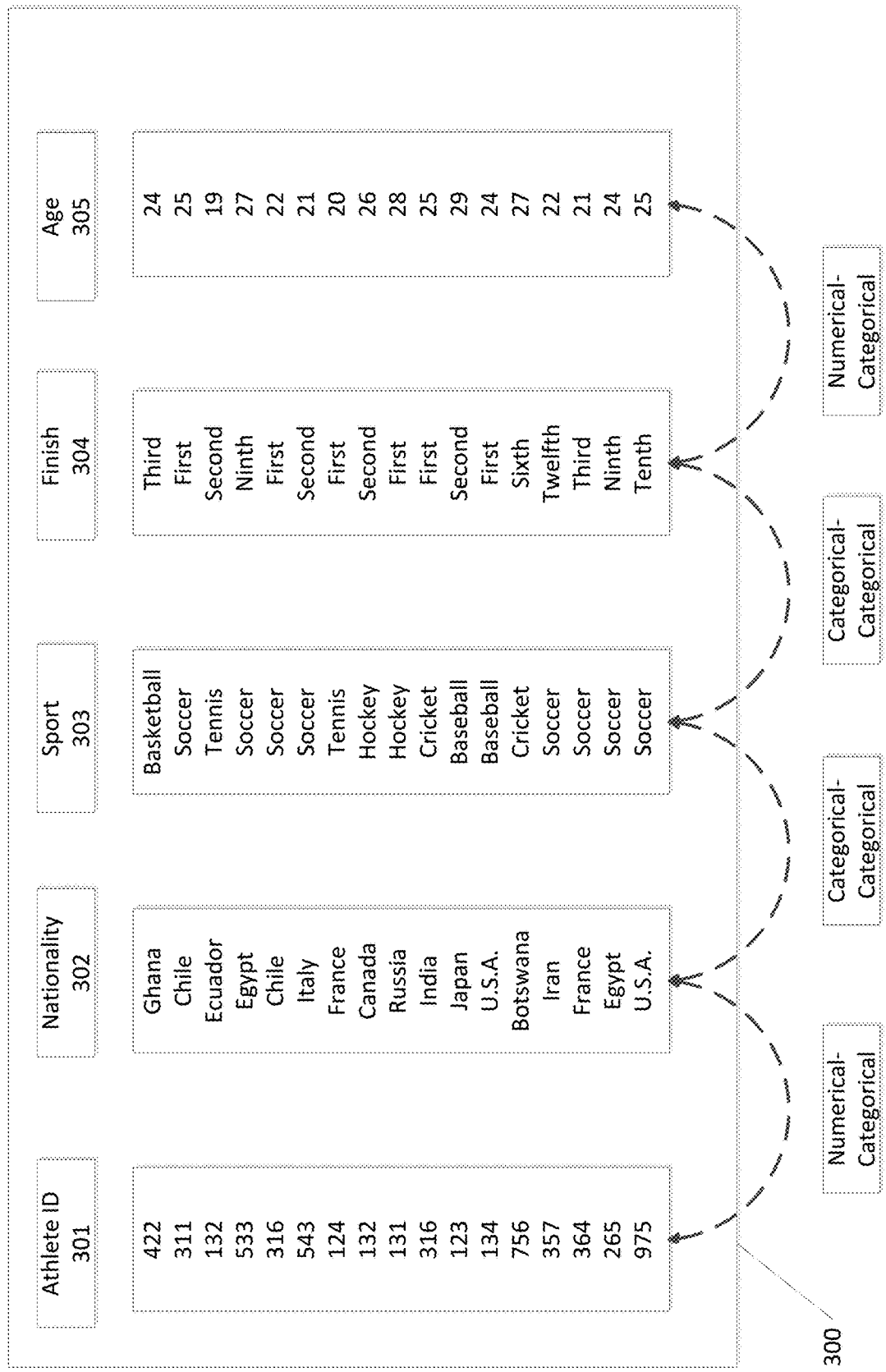
FIG. 3 illustrates relationship classifications between columns according to an exemplary embodiment.

While methods, apparatuses, and computer-readable media are described herein by way of examples and embodiments, those skilled in the art recognize that methods, apparatuses, and computer-readable media for visualizing relationships between pairs of columns are not limited to the embodiments or drawings described. It should be understood that the drawings and description are not intended to be limited to the particular form disclosed. Rather, the intention is to cover all modifications, equivalents and alternatives falling within the spirit and scope of the disclosure. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

The inventors have discovered a method and system for visualizing relationships between pairs of columns which solves the problems associated with existing data analysis tools and spreadsheet applications. In particular, the disclosed method and system enables business users to quickly identify relationships between columns, easily drill down into different levels of relationships, relate columns which involve categorical data, and visualize the relationship information.

FIG. 1 illustrates a flowchart for visualizing relationships between pairs of columns according to an exemplary embodiment. At step 101 a selection of two column identifiers corresponding to two columns in a plurality of columns can be received. As indicated by the dashed line for step 101 in FIG. 1, this step is optional, as the two columns may be identified by other means, as will be discussed below. For example, in a spreadsheet with 5 columns, all possible pairs of columns may be identified automatically.

FIG. 2 illustrates an example of this selection in an interface 200 of an application, such as a spreadsheet application. The interface 200 illustrates data columns with data on the athletes that participated in an international athletic competition. It includes the columns Athlete ID 201, Nationality 202, Sport 203, Finish 204, and Age 205. We assume that the data analyst looking at this data is interested in discovering significant relationships among the columns.

Athlete ID 201 and Age 205 are examples of numerical data columns. Numerical data columns correspond to a variable that can take values along a continuous range such as a set of Integer or Real numbers.

Nationality 202, Sport 203, and Finish 204 are examples of categorical data columns. Categorical data columns include nominal or ordinal variables that can take on values as elements of a bounded discrete set. A nominal variable is a categorical variable which has two or more categories but which has no intrinsic ordering to the categories or values. Nationality 202 and Sport 203 are both examples of nominal categorical columns. A categorical ordinal variable is a categorical variable in which an intrinsic ordering exists among the categories or values. Finish 204 is an example of a categorical ordinal column. The terms nominal, ordinal, and numerical correspond to types of scales. In this Application, we reduce the three types of scales to two by combining nominal and ordinal in the categorical type. These types qualify the type of values that a variable can take; therefore they qualify the type of variable. In Statistics, while the values of an ordinal variable (e.g., high, medium, low) can be expressed as numbers by converting the intrinsic ordering into numerical values (e.g., 1, 2, 3), this does not make the resulting variable a numerical variable. However, for practical reasons the analyst may still decide to do this conversion and treat the resulting variable as a numerical variable. This may happen, for example, when the analyst wants to report average and standard deviation values as summary of the many categorical responses (e.g., high, medium, low) to a question on product satisfaction. However, the conversion of a numerical variable to categorical (e.g., from numerical values to classes) is always possible.

As shown in interface 200, a user has selected columns Nationality 202 and Sport 203. This selection can be made by clicking on the columns or the column headers, selecting the column names from a list or other interface element, or by inputting the column names. The user can then proceed with relating the two columns by clicking on the relate button 206.

Returning to FIG. 1, at step 102 a relationship classification corresponding to two columns in a plurality of columns is determined based on a data type of each column in the two columns. As discussed above, the data type of each column in the plurality of columns can be either categorical data or numerical data. Accordingly, the relationship classification will be one of categorical-categorical (when both columns are categorical data columns), categorical-numerical (when only one of the columns is a categorical data column), and numerical-numerical (when both columns are numerical data columns). This determination can be made by reading metadata associated with each column, reading the data values in each column and making a determination as to type, or by receiving input from the user regarding the column type for each column.

FIG. 3 illustrates an interface 300 with columns Athlete ID 301, Nationality 302, Sport 303, Finish 304, and Age 305. FIG. 3 illustrates the relationship classifications between adjacent columns in the interface 300. For example, column Athlete ID 301 and Nationality 302 have a relationship classification of Numerical-Categorical whereas column Nationality 302 and Sport 303 have a relationship classification of Categorical-Categorical.

As discussed earlier, identification of pairs of columns does not need to be performed through a selection by a user and may be performed automatically. For example, all pairs of columns in a plurality of columns of a spreadsheet can automatically be identified for processing, as will be described below. This is useful in the scenario where a user is analyzing a dataset to identify significant relationships between columns but does not know beforehand which column pairs are likely to have a significant relationship.

For example, in the case of the columns of FIG. 3, this would involve automatically identifying relationship classifications corresponding to the column pairs {301, 302}, {301, 303}, {301, 304}, {301, 305}, {302, 303}, {302, 304}, {302, 305}, {303, 304}, {303, 305}, and {304, 305}. In general, given n columns of a spreadsheet, the system can automatically identify all distinct pairs of columns, n (combination) 2. In this case, since there are five columns, the number of distinct pairs would be $$c_5^2 = \frac{5!}{(5-2)!\,2!} = 10$$

distinct pairs.

Figure 4:
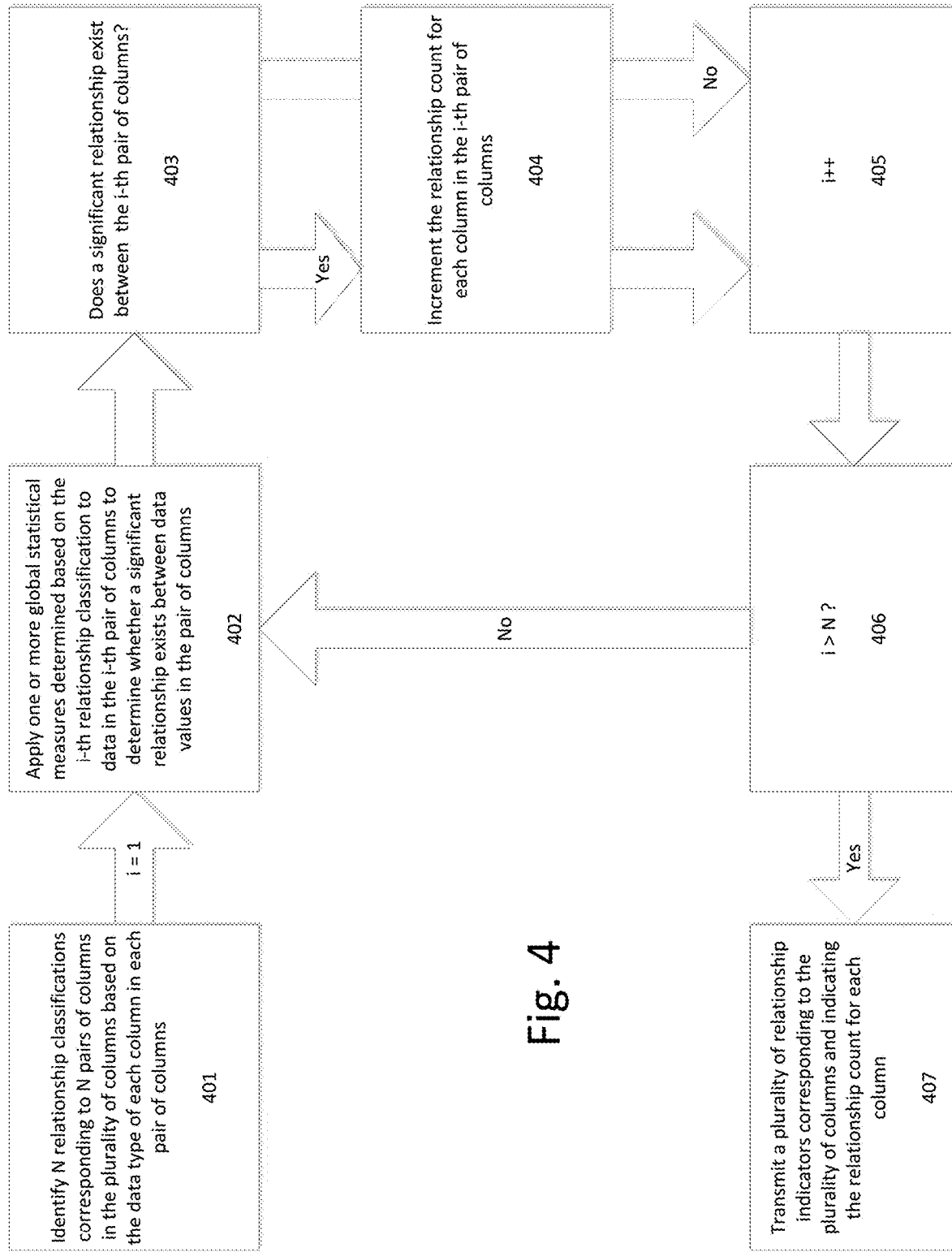
FIG. 4 illustrates a flowchart for determining relationships between a plurality of columns according to an exemplary embodiment.

FIG. 4 illustrates a flowchart for visualizing significant relationships between N pairs of columns in a spreadsheet. At step 401 N relationship classifications corresponding to the N pairs of columns in the plurality of columns are determined based on the data type of each column in each pair of columns. Each column in the plurality of columns can have an associated relationship count which is a variable that tracks the number of significant relationships between that column and other columns. At step 401, the relationship count for each column can be initialized to zero.

For each of the N pairs of columns, steps 402-406 can be applied in a loop to determine the total number of significant relationships for each column in the plurality of columns. These steps are explained in detail below.

A variable i corresponding to a pair of columns in the N pairs of columns is set to 1 (thus corresponding to the first column-pair) prior to step 402. At step 402 one or more global statistical measures are applied to data in the i-th pair of columns to determine whether a significant relationship exists between data values in a first column of the i-th pair of columns and data values in a second column of the i-th pair of columns. These global statistical measures are determined based at least in part on the relationship classification for the i-th pair of columns.

At step 403 a determination is made regarding whether a significant relationship exists between the i-th pair of columns based at least in part on the result of the global statistical measures. If a relationship exists then at step 404 the relationship count corresponding to each column in the i-th pair of columns is incremented. After step 404 the process proceeds to step 405.

If a relationship does not exist for the i-th pair of columns, then the process proceeds from step 403 to step 405, where i is incremented to correspond to the next pair of columns in the N pairs of columns. At step 406 a determination is made regarding whether i is greater than N (whether all of the pairs of columns have been traversed). If not, then the process proceeds back to step 402 and continues. Otherwise, at step 407 a plurality of relationship indicators corresponding to the plurality of columns are transmitted. Each relationship indicator corresponds to a column in the plurality of columns and indicates the relationship count of that column.

Figure 5:
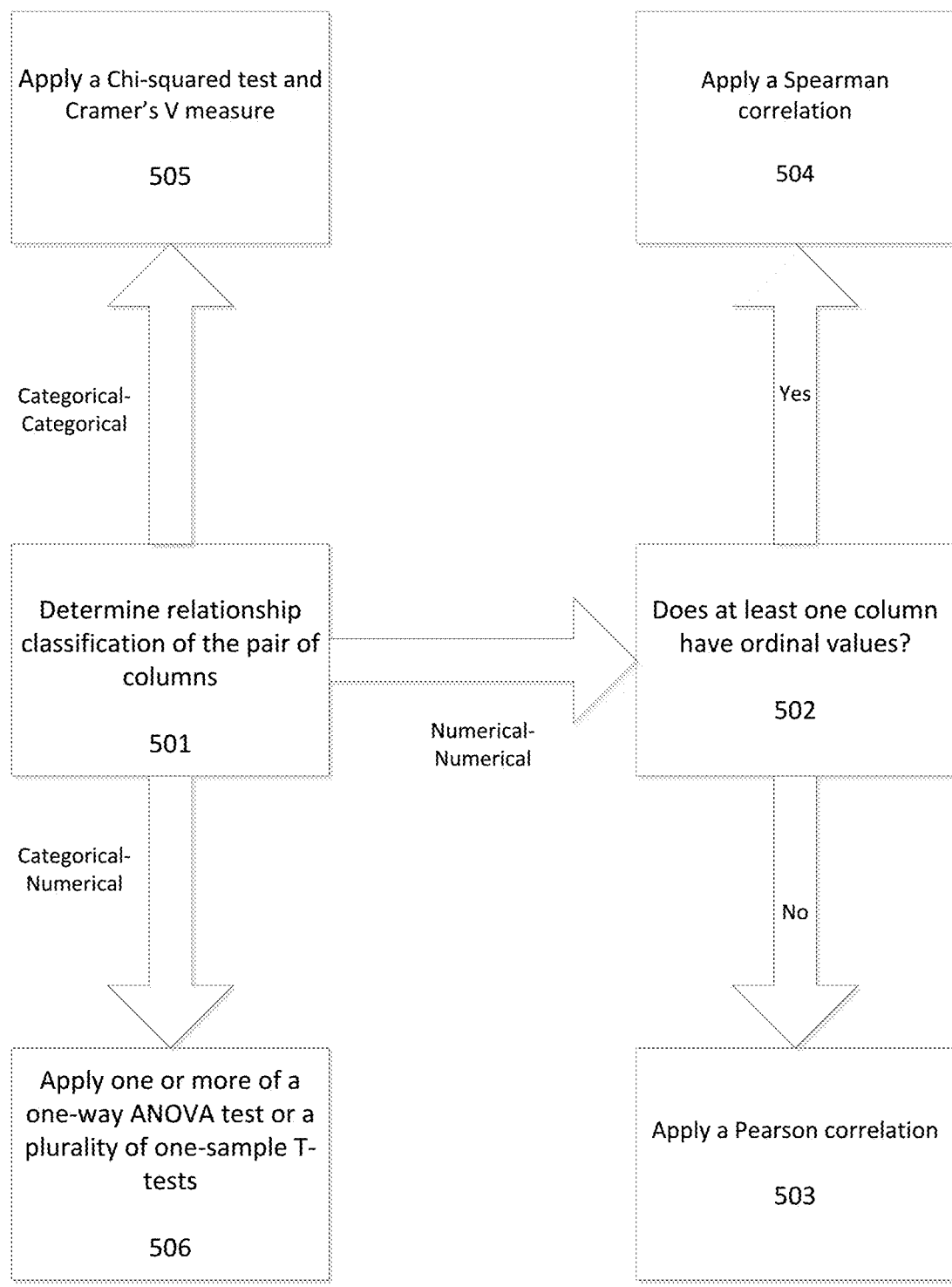
FIG. 5 illustrates a flowchart for applying global statistical measures according to an exemplary embodiment.

FIG. 5 illustrates a flowchart for determining which global statistical measures are to be applied to each pair of columns. The actual application of the statistical measures is described in detail in the sections of the specification corresponding to statistical measures applied to each relationship classification. At step 501 a relationship classification is determined for the pair of columns. If the relationship classification is categorical-categorical, then at step 505 a Chi-squared test and Cramer's V measure are applied to the data in the pair of columns. If the relationship classification is categorical-numerical, then one or more of a One-way ANOVA test or a plurality of one-sample T-tests can be applied to the data in the pair of columns at step 506. The One-way ANOVA test measures the significance of mean-based differences among the samples of numerical values that are identified by the categorical value. The t-test and analysis of variance (ANOVA) compare group means. While the t-test is limited to comparing means of two groups, one-way ANOVA can compare more than two groups. One-way ANOVA produces equivalent results to those of the t-test. The difference is that ANOVA examines mean differences using the F statistic, whereas the t-test uses the t statistic. These tests are described in greater detail in the specification.

Otherwise, if the relationship classification is numerical-numerical, then a determination is made at step 503 regarding whether at least one column in the pair of columns comprises ordinal data values. If so, then at step 504 a Spearman correlation is applied to the data in the pair of columns. Otherwise, if both columns in the pair of columns comprise continuous data values, then at step 503 a Pearson correlation is applied to the data in the pair of columns.

Figure 6:
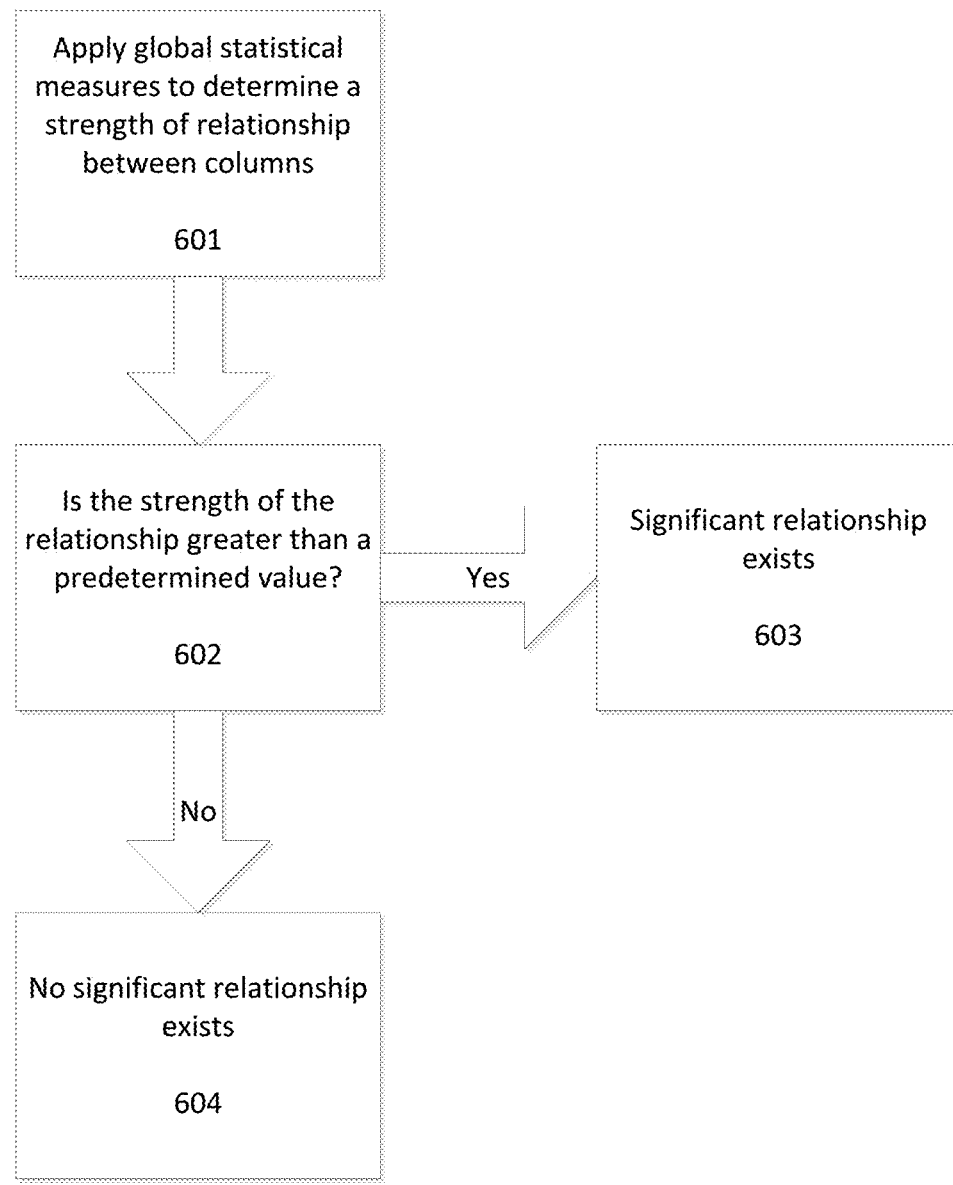
FIG. 6 illustrates a flowchart identifying a significant relationship according to an exemplary embodiment.

FIG. 6 illustrates a flowchart for applying one or more global statistical measures to data in a pair of columns to determine whether a relationship exists between data values in the pair of columns. At step 601 one or more global statistical measures are applied to determine a strength of relationship between data values in a first column of the pair of columns and data values in a second column of the pair of columns. At step 602 a determination is made whether the strength of relationship is above a predetermined significance threshold. This predetermined threshold can correspond to a statistical significance threshold and/or can be specified by a user. If the strength of relationship is above the predetermined significance threshold, then at step 603 a determination is made that a significant relationship exists between data values in a first column of the pair of columns and data values in a second column of the pair of columns. Otherwise, at step 604 a determination is made that no relationship exists.

As discussed with reference to FIG. 4, once the relationship count for each column in a plurality of columns is determined, then a plurality of relationship indicators corresponding to the plurality of columns are transmitted.

FIG. 7A illustrates an interface 700 showing an example of these relationship indicators and can correspond to an interface of a spreadsheet program when a business user opens the spreadsheet. Interface 700 includes columns Athlete ID 701, Nationality 702, Sport 703, Finish 704, and Age 705. Additionally, interface 700 includes relationship indicators 701B, 702B, 703B, 704B, and 705B, which correspond to each of the respective columns.

Each of these relationship indicators corresponds to a column and indicates a number of relationships between that column and other columns (the relationship count). In this example, each relationship indicator in the plurality of relationship indicators comprises a circle having a size proportional to the relationship count of the corresponding column. However, other relationship indicators can be utilized which also indicate a relationship count, including one or more of shapes (with increasing size corresponding to increasing relationship count or different shapes corresponding to different relationship counts), letters (each letter corresponding to a different relationship count), numbers (corresponding to the relationship count), colors (with different colors corresponding to different relationship counts or color intensity corresponding to relationship count), or any other visual indicator of relationship count.

Figure 7B:
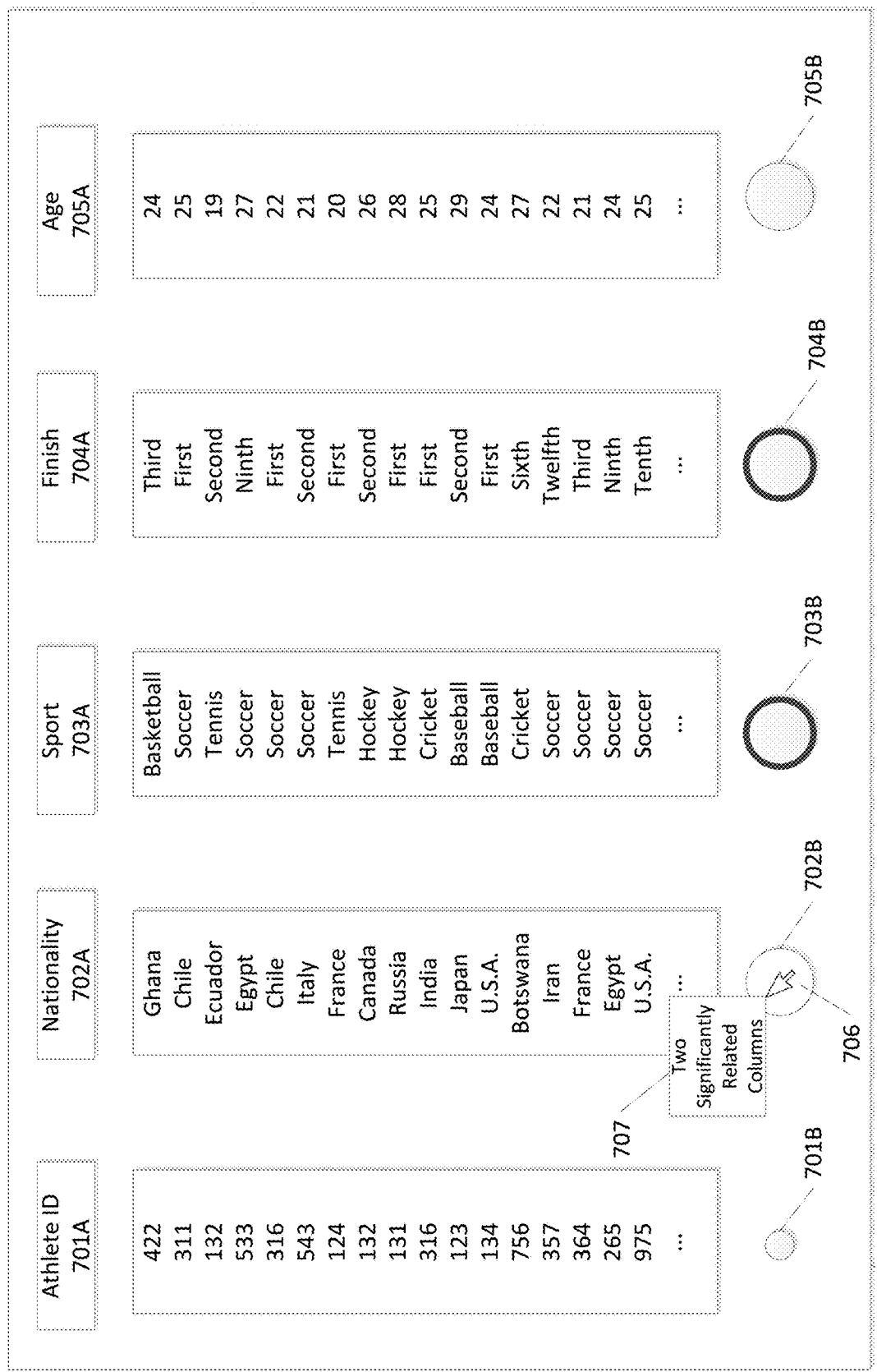

FIG. 7B illustrates additional functionality of the relationship indicators. As shown in FIG. 7B, a user has selected relationship indicator 702B by moving the mouse pointer 706 to hover over the relationship indicator 702B. This selection could also take place by the user touching the relationship indicator 703B on a touchscreen interface, single-clicking the relationship indicator 702B using a pointing device, or some other input.

In response to the selection, column information window 707 is transmitted which displays the number of columns that are significantly related to the column 702A corresponding to that relationship indicator 702B. In this case, there are two related columns. Additionally, the relationship indicators corresponding to the two related columns can also be highlighted or visually emphasized in some way. As shown in interface 700, the relationship indicators 703B and 704B are highlighted, indicating that a relationship exists between column Nationality 702A and column Sport 703A and that a relationship exists between column Nationality 702A and column Finish 704A.

Figure 7C:
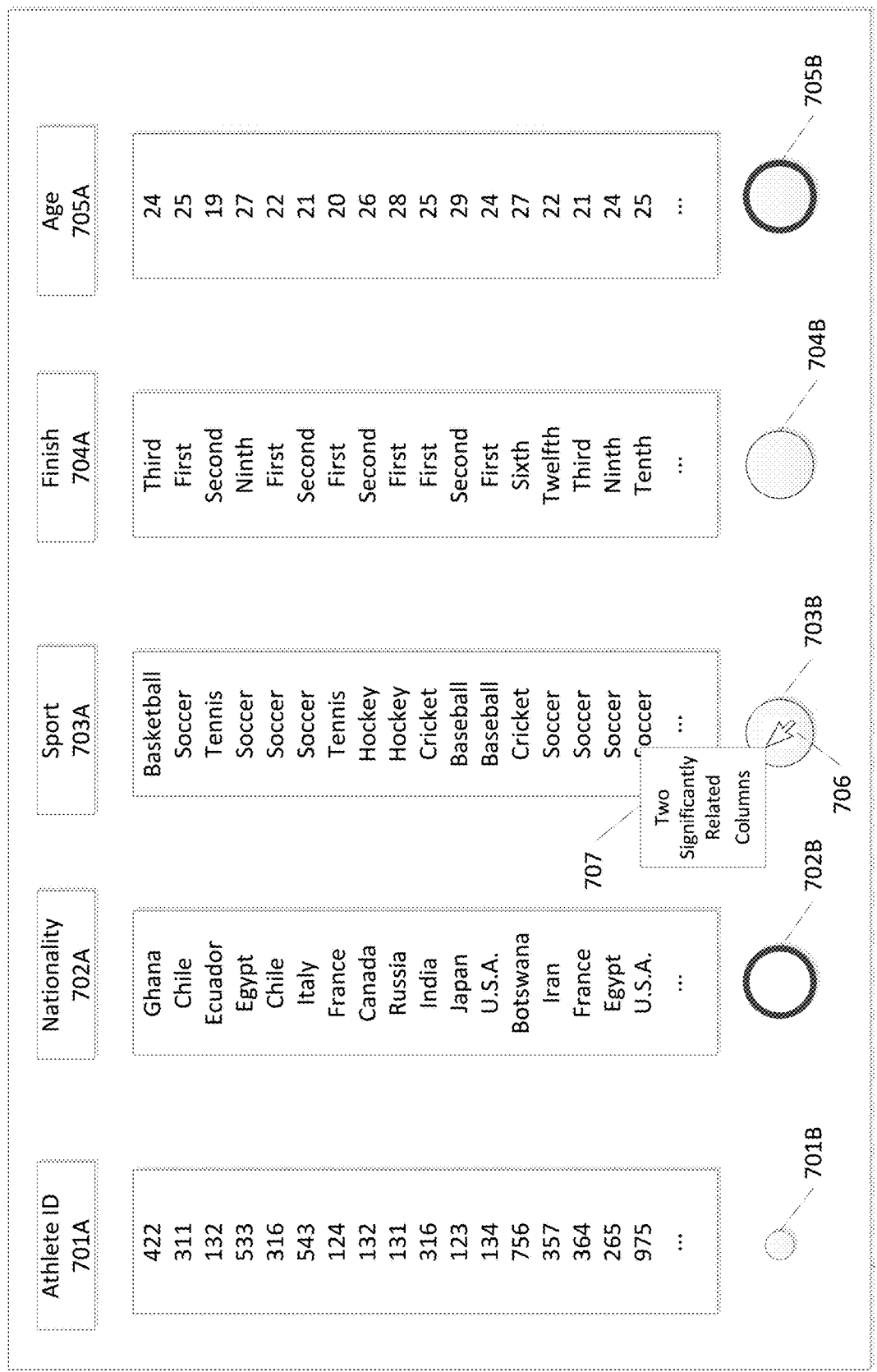

FIG. 7C illustrates another example where the user has selected relationship indicator 703B corresponding to column Sport 703A by hovering the mouse pointer 706 over that relationship indicator. In this case, the column information window 707 also indicates two significantly related columns. As the size of relationship indicator 703B is the same as the size of relationship indicator 702B, the number of related columns should also be the same. As shown in FIG. 7C, the two columns which are related to column Sport 703A are column Nationality 702A and column Age 705A.

Figure 7D:
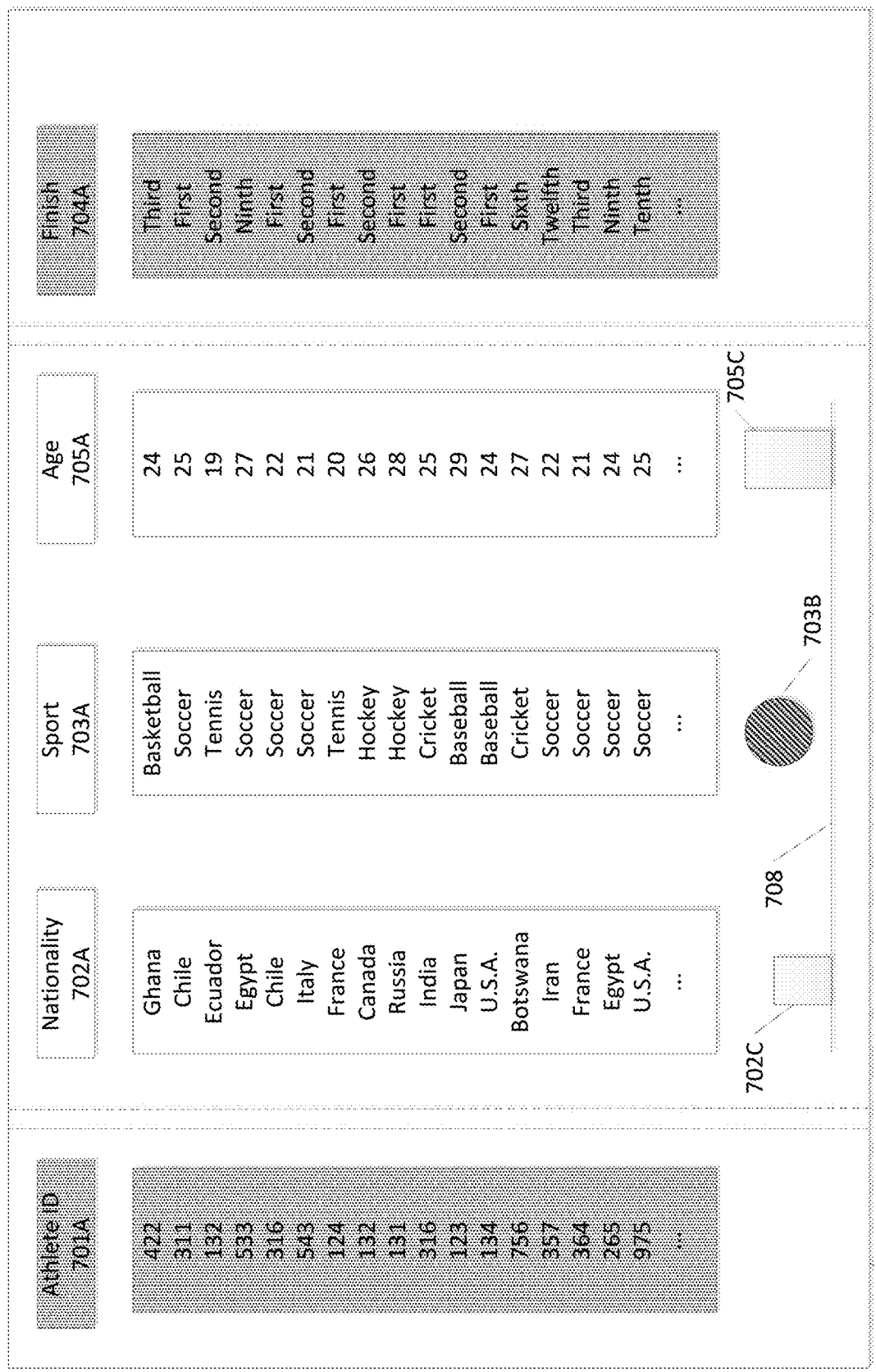

FIG. 7D illustrates additional functionality of the relationship indicators. In FIG. 7D, the user has re-selected relationship indicator 703B. This re-selection can be performed by some input. For example, if the user was hovering the mouse pointer over relationship indicator 703B in FIG. 7C, then the user can click on the relationship indicator 703B to bring up an interface such as the one shown in FIG. 7D. Alternatively, the re-selection can be another input or combination of inputs, such as a double-tap on a touch screen, a tap and hold on a touch screen, a right-click with a mouse, a double-click with a mouse, a keyboard input, a keyboard input and a mouse input together, or some other input command.

After the re-selection of relationship indicator 703B, the interface is transformed so that the columns which are not related to the corresponding column (Sport 703A in this example) for that relationship indicator are de-emphasized and the columns which are related to the corresponding column are emphasized. As shown in FIG. 7D, this results in columns 701A and 704A, which are not related to column 703A, being shifted to the periphery of the interface and either shaded out (as shown in FIG. 7D) or being de-emphasized in some other way. This can include removing the unrelated columns from the interface, fading the unrelated columns in terms of brightness, blocking the unrelated columns with a mask, reducing the size of the unrelated columns, or some other transformation which visually de-emphasizes the unrelated columns relative to the related columns.

At the same time, the columns which are related to the corresponding column are emphasized. In this case, columns 702A and 705A are displaced within the interface so that they are both adjacent to column 703A. The columns can also be emphasized in other ways, such as highlighting the related columns or corresponding relationship indicators, enlarging the related columns, brightening the related columns, or some other transformation which visually emphasizes the related columns relative to the unrelated columns. The columns which are related to the column corresponding to the relationship indicator can also be sorted in some order, such as by strength of relationship.

Additionally, as shown in FIG. 7D, two relationship strength indicators 702C and 705C corresponding to columns 702A and 705A are also transmitted within the interface 700 when the user selects relationship indicator 703B. The relationship strength indicators indicate the strength of relationship between the column corresponding to the selected relationship indicator and the respective related column. Therefore, relationship strength indicator 702C indicates the strength of the relationship between the data values in column 703A and column 702A and the relationship strength indicator 705C indicates the strength of the relationship between the data values in column 703A and column 705A. The relationship strength indicators can be shown on an axis, such as axis 708 and provides a reference for the strength of each relationship.

Figure 7E:
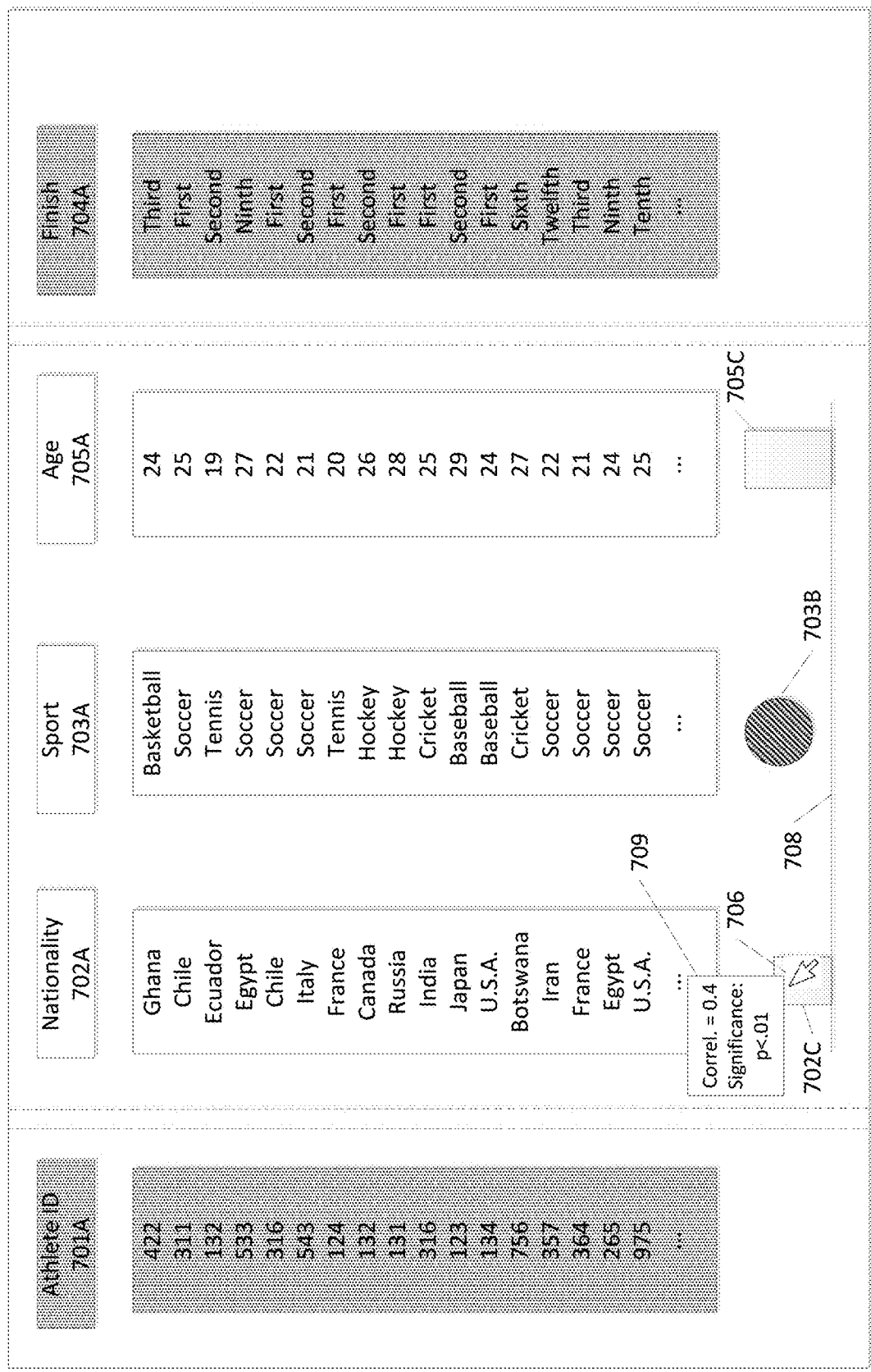

FIG. 7E illustrates a user interaction with a relationship strength indicator. As shown in FIG. 7E, when a user selects relationship strength indicator 702C (such as by hovering the mouse pointer 706 over it, tapping it, or some other selection input as discussed earlier), a relationship strength information window 709 can be transmitted within the interface 700. Relationship strength information window 709 displays information regarding the strength of the relationship between the two corresponding columns. In this case, relationship strength information window 709 indicates that the correlation strength between the data values is equal to 0.4, with a p-value which is less than a 0.01 significance threshold. Additionally, when one of the columns in the pair of columns is a categorical column, the relationship strength information window 709 can also transmit information relating to categorical associations between categories of one of the columns and either categories or numerical values in the other column of the pair of columns.

If the user were to re-select relationship strength indicator 702C, (such as by clicking on it, double tapping it, or some other re-selection input as discussed earlier), the interface would then transform into a column relationship interface for the columns 703A and 702A. In this case, the interface would transform into a categorical-categorical relationship visualization, as will be described further in this document. Similarly, if the user were to select and/or re-select relationship strength indicator 705C, the interface would then transform into a column relationship interface for the columns 703A and 705A.

Regardless of how the two columns in the plurality of columns are identified (whether automatically or through selection by a user), a relationship classification corresponding to the two columns is identified based on a data type of each column in the two columns.

Referring back to FIG. 1, at step 103 one or more statistical measures to apply to the data in the two columns are determined based at least in part on the relationship classification. The one or more statistical measures include global statistical measures such as the ones described with regard to FIG. 5. For example, if the relationship classification is categorical-numerical, then a one-sample T-test would be applied as a global statistical measure. Global statistical measures refer to statistical metrics which measure the relationship strength between the set of all data points in a first column and the set of all data points in the second column.

Additionally, if at least one of the columns in the two columns comprises a categorical column (meaning that the relationship classification is either categorical-categorical or categorical-numerical), the one or more statistical measures identified can include one or more categorical statistical measures.

At step 104 the one or more statistical measures are applied to data in the two columns to generate association data quantifying a plurality of relationships between data values in a first column of the two columns and data values in a second column of the two columns. As discussed above, the one or more statistical measures are determined based at least in part on the relationship classification.

Figure 8:
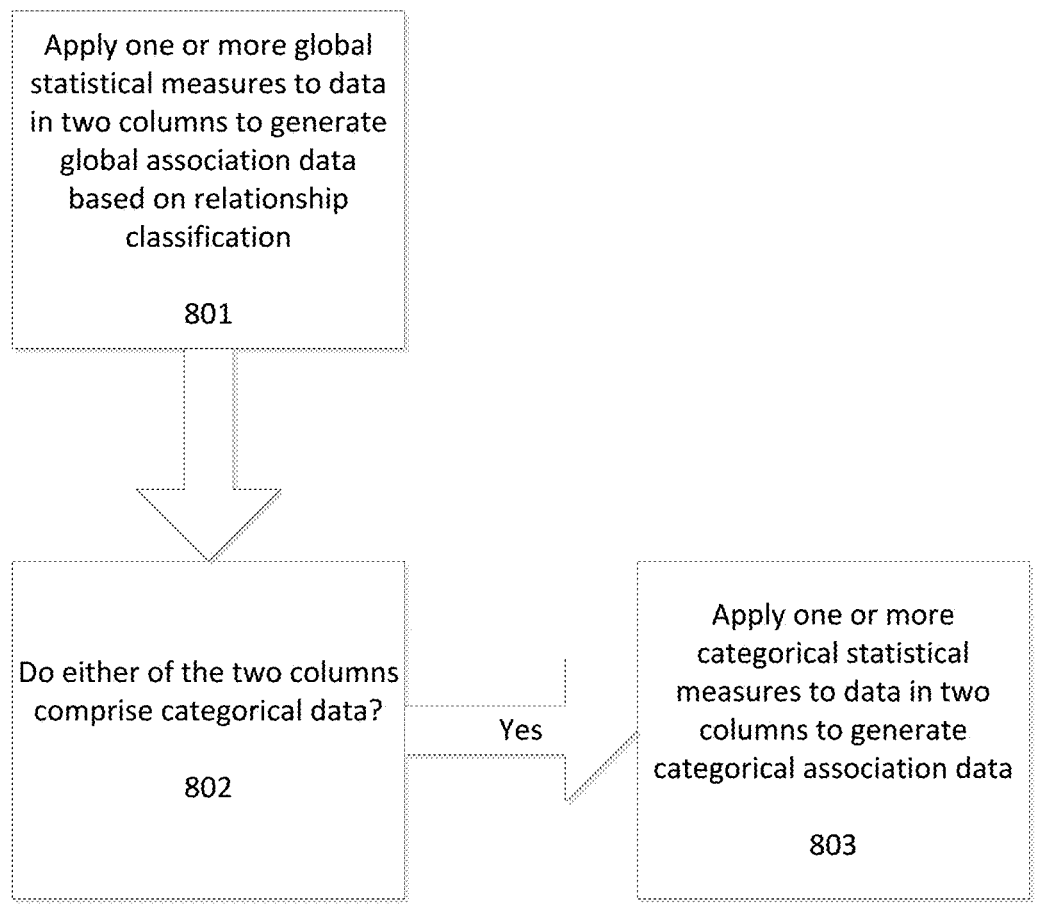
FIG. 8 illustrates a flowchart for applying statistical measures to data in two columns according to an exemplary embodiment.

FIG. 8 illustrates a flowchart for applying one or more statistical measures to data in the two columns to generate association data quantifying a plurality of relationships between data values in a first column of the two columns and data values in a second column of the two columns.

At step 801 one or more global statistical measures are applied to the data in the two columns to generate global association data. As discussed earlier, the one or more global statistical measures which are applied are based at least in part on the relationship classification and are described in greater detail below.

Numerical-Numerical Global Statistical Measures

As shown in FIG. 5, when the relationship classification comprises numerical-numerical (meaning both columns correspond to numerical data), the applied global statistical measures can be either a Spearman correlation and a T-test or a Pearson correlation and a T-test, depending on whether at least one column comprises ordinal values.

Specifically, when the relationship classification comprises numerical-numerical, the one or more global statistical measures comprise a Pearson r correlation, for the pairs of continuous variables and Spearman rank-order ρ correlation for the pairs of ordinal variables or continuous-ordinal pairs.

For Pearson's r correlation, given n rows and two columns, X and Y, with values x and y, respectively, the correlation is computed as follows, based on the formula:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}},$$

where $\bar{x}$ and $\bar{y}$ are mean values for the X and Y columns.

For Spearman's rank-order ρ correlation, given n rows and two columns, X and Y, with values x and y, respectively, the correlation is computed as follows, based on the formula:

$$\rho = 1 - \frac{6\sum_{i=1}^{n} d_i^2}{n(n^2 - 1)},$$

where $d_i$ is the difference between the ranks of $x_i$ and $y_i$ at row i.

In addition to the values of r and p, the one or more global statistical measures provide as output a significance value which can be the result of 2-tailed t-test (for rejecting the null hypothesis $H_0$: ρ=0 in favor of the alternative hypothesis $H_0$: ρ< >0). Conventionally, this is based on the given sampling distribution df=n−2.

Categorical-Categorical Global Statistical Measures

When the relationship classification comprises categorical-categorical, the one or more global statistical measures can include a Chi-squared test and Cramer's V measure, as is explained below.

Two categorical columns X and Y, where X has c categories and Y r categories, can be represented as a X by Y table with c columns and r rows and c*r cells containing the frequencies of co-occurrences of XY combinations of categories.

X and Y are considered related when they are not independent. Based on the above-mentioned table independence can be measured using the Pearson's r Chi-Square statistic. The strength of the association can be measured using the Cramer's V measure, based on Pearson's r Chi-Square.

Given two categorical variables x and y, the chi-square statistic or $X^2$ is calculated as follows:

$$X^2 = \sum_{i=1}^{r}\sum_{j=1}^{c}\frac{(O_{ij} - E_{ij})^2}{O_{ij}}, df = (r-1)(c-1)$$

Where $O_{ij}$ represents observed frequencies of co-occurrence already in the table and $E_{ij}$ represents the expected frequencies of co-occurrence. $E_{ij}$ can be computed by averaging the two marginal totals of the observed value common to each cell, which are referred to as $O_i+$ and $O_1+$ respectively (and O++ is the total of totals).

$$E_{ij} = \frac{O_{i+}O_{+j}}{O_{++}}$$

The basic variant of this method measures the strength of X-Y association in absolute terms. To test if there is a significant association between X and Y (i.e., if we can reject the hypothesis of independence) a margin of error is set that is acceptable. For example, the alpha value can be set to either 0.05 or 0.01. This corresponds to a probability of, respectively, 5% or 1% of making a (Type I) error by concluding that there is a relationship between two variables when there is not a relationship. Once the alpha is set, then a corresponding critical value for $X^2$ is obtained from an external statistical library that computes critical $X^2$ (two-tail) based on the $X^2$ probability distribution and the significance if tested as follows: if the $X^2$ computed from the X-Y table is larger than the critical value obtained (given the alpha value) then there is an association.

Based on the $X^2$ statistic we also measure the strength of the association in a way that is analogous to the Pearson's r for n-n column relationships using the Cramer's V coefficient, which ranges from 0 to 1:

$$V = \sqrt{\frac{X^2}{O_{++} * (\min(r, c) - 1)}}$$

The advanced variant of this method measures the strength of X-Y association in relative terms: that is, by adapting to the level of variability observed in the data sets of the community of business users that is implementing the proposed system. This adaptation is done by deriving the critical alpha value discussed based on a data corpus of reference. For example, the alpha can be set as the top 5% most related c-c pairs that have a Cramer's V coefficient equal or greater than 0.3.

The data corpus comprises a collection of datasets, where each data set contains a mix of numerical and categorical columns. The main benefit of defining a data corpus of reference for the proposed method and system is the ability to account for regularities in data (e.g., predominant column types and combinations of column types) endemic of specific industry verticals (e.g., banking & insurances, manufacturing, retail, oil and gas) and/or organizational functions (e.g., Sales, Marketing, Finance, Human Resources).

Categorical-Numerical Global Statistical Measures

When the relationship classification comprises categorical-numerical, the one or more global statistical measures can include one or more of a one-way ANOVA test, a plurality of one-sample T-tests, or in situations where the categorical variable is an ordinal variable, a Spearman correlation. The t-test and analysis of variance (ANOVA) compare group means. While the t-test is limited to comparing means of two groups, one-way ANOVA can compare more than two groups. One-way ANOVA produces equivalent results to those of the t-test. The difference is that ANOVA examines mean differences using the F statistic, whereas the t-test uses the t statistic.

Plurality of One-Sample T-Tests

A plurality of one-sample t-tests can be used to determine whether the total mean or population mean $\bar{x}$, over the numerical variable, differs from the sample mean $\bar{x}_i$ for the i-th category of the categorical variable.

The null hypothesis tested is that there is no difference: $H_0: \bar{x} = \bar{x}_i$ The statistic used to test it is the t-test, which reports the t statistic and a significance level or p-value.

Consistently with the principle used for the c-c relationship (e.g., where column to column dependence was measured using a Chi-Square), the purpose of this method is to define the categorical column Y related to the numerical column X such that for each of the categories frequency values can be observed that are far enough from those expected. Specifically, the c-n relationship strength can be measured as an aggregation of the differences from the expected values for each of category-specific distributions over Y. The key assumption is that the expected value is derived from the global distribution (all category-specific distributions combined) over Y.

Based on this general method, different measures of relationship strengths can be defined. For each measure a specific attribute can be chosen to be used to measure the differences from the expected values (e.g., mean, standard deviation, mode) from the global distribution.

One attribute that can be used as the attribute for measurement is the mean attribute. On this basis X and Y can be determined to be related when the mean values in the X column corresponding to each of the categories in Y vary significantly from the global mean values in the X column. The relationship strength is measured using a one-sample t-test for each of the categories in Y with respect to the overall distribution (i.e., for all the categories at once). This test is used when, given a sample j, it is necessary to test if the sample is significantly different (i.e., its mean $\bar{x}_j$) from a population mean $\bar{x}$. The steps are as follows:

(1) The system pre-computes the following inputs to the one-sample t-test statistic:
   a. The mean $\bar{x}$ of the global distribution (expected mean)
   b. For each of the r categories of $Y_j$ (where j=1 . . . r):
     i. The mean $\bar{x}_j$ of the j-th distribution (observed mean)
     ii. The standard deviation $\sigma_j$ of the j-th distribution
     iii. The number of observations $n_1$ of the j-th distribution (2) The system computes the t-test statistic $t_j$ for each of the r categories of $Y_j$ (where j=1 . . . r)

$$t_j = \frac{\bar{x}_j - \bar{x}}{\sigma_j \sqrt{\frac{n_j}{n_j-1}}}$$

(3) The system computes average t-test value (where j=1 . . . r)

(4) The system tests the significance of $\bar{t}$ against critical t values $t_a$ (5) If significant, the value $\bar{t}$ is normalized to take values between 0 and 1: norm-$\bar{t}$ and this is used as measure of strength The alpha value can be set, for example, to 0.05 or 0.01. This corresponds to a probability of, respectively, 5% or 1% of making a (Type I) error by concluding that there is a relationship between two variables when there is not. Once the alpha is chosen, then the corresponding $t_a$ critical value is obtained from an external statistical library that computes critical t values (two-tail): i.e., $t_{a=0.05}$ or $t_{a=0.01}$. Finally, the significance is tested as follows: if the $\bar{t}$ is larger than the critical value obtained (given the alpha value) than there is an association between the categorical data values in Y and the numerical data values in X.

The advanced variant of this method measures the strength of X-Y association in relative terms: that is, by adapting to the level of variability observed in the data sets of the community of business users that is implementing the proposed system. This adaptation is done by deriving the critical alpha value discussed above to a corpus of reference.

In this case, two variants can be implemented. A first variant can set the alpha as the top 5% most related c-n pairs that have $\bar{t}$ value equal or greater than 0.3. A second variant can replace steps 4 and 5 above and rely instead on average and variance of the t-test values.

One-Way ANOVA Test

One-way ANOVA can also be used to measure the overall strength between a categorical and a numerical variable. This statistic test determines whether the means of the k samples of values, over the numerical variable, (i.e., for the k categories in the categorical variable) are significantly different.

The null hypothesis tested is $H_0: m_1 = m_2 = \ldots = m_k$

The statistic used to test the F ratio. This test reports the F statistic and a significance level or p-value. Below we describe how the F statistic is computed.

Notation

The index i represents the $i^{th}$ category of the categorical variable, where i ranges from 1 to k The index j represents the $j^{th}$ value over the numerical variable for a specific category, where j ranges from 1 to $n_S$ n is the total number of values over the numerical variable from all categories $y_{ij}$ is the value of the $j^{th}$ value over the numerical variable in the $i^{th}$ category $\bar{y}_i$ is the mean of the $i^{th}$ category $\bar{\bar{y}}$ is the mean of all n values over the numerical variable from all categories, $$\bar{\bar{y}} = \frac{1}{n}\sum_{i=1}^{k}\sum_{j=1}^{n_s} Y_{ij},$$

or the mean of the sample means

Computing the F statistics requires the following three steps:

(1) Sum of Squares

Sum of Squares for Treatments, $SST=n_s\Sigma_{i=1}^{k}(\bar{y}_i-\bar{\bar{y}})^2$ is the "Between Group" (or between category) variation, where the k "groups" of values, for the k categories of the categorical variable, are represented by their sample means. If the sample means differ substantially then SST will be large.

Sum of Squares for Error, $SSE=\Sigma_{i=1}^{k}\Sigma_{j=1}^{n_s}(y_{ij}-\bar{y})^2$ is the "Within Group" variation (or within category) represents the random or sample-to-sample variation (2) Mean Squares Mean Square for Treatments, $$MST = \frac{SST}{k-1}$$

or variance between categories

Mean Square for Error, $$MSE = \frac{SSE}{n-k}$$

or variance within categories (population variance).

Where k−1 are the degrees of freedom for treatments, and n−k are the degrees of freedom for error (3) F-Ratio The statistic is finally computed as $$F = \frac{MST}{MSE}$$

If the null hypothesis is correct then this ratio should be close to one. If some of the sample means differ substantially, however, the ratio will be much larger. Large values of F therefore correspond to strong evidence for rejecting $H_0$.

A p-value corresponding to the F-ratio and the degrees of freedom is finally obtained from a pre-computed F table (available in most statistical packages).

Extrapolation of Data Values

Additionally, before applying any t-tests, a one-way ANOVA test, or a Spearman correlation (as discussed below), for any category of the of the categorical variable that identifies only as small sample of values on the numerical variable (i.e., a small number of occurrences of that category) the system can optionally increase this sample by simulating/extrapolating additional values that satisfy specific constraints such as preserving the mean, standard deviation, or value range of the original sample. This feature can be used to meet minimal sample size requirements for the statistical tests.

Spearman Correlation

When the categorical variable is ordinal then the alternative to using the One-way ANOVA (analysis of variance) test is the Spearman correlation for the global association data. The alternative to using the t-test for each category is to compute the difference between the Spearman correlation values obtained with and without the inclusion of that category—this difference will correspond to the categorical association data.

Referring back to FIG. 8, at step 802 a determination is made regarding whether one or more of the two columns comprises categorical data (whether the relationship classification comprises either categorical-categorical or categorical numerical).

If neither of the two columns comprises categorical data (if the relationship classification is numerical-numerical), then the process proceeds to step 105 of FIG. 1 and the association data (the global association data in this case) is transformed into a numerical-numerical visualization. The visualization can include one or more indicators corresponding to one or more relationships among the data values the layout of the visualization can be determined based on the relationship classification. For example, the numerical-numerical visualization will have a different layout than the categorical-numerical visualization, which itself will have a different layout from the categorical-categorical visualization.

The numerical-numerical visualization can take a number of forms, such as a scatterplot of values in the first column plotted against values in the second column. In this case a first axis can be used to represent the range of values in the first column and a second axis can represent the range of values in the second column. Other visualizations can include generating a best-fit line or curve to fit the data.

Referring to FIG. 8, if at least one of the two columns comprises categorical data (if the relationship classification comprises either categorical-categorical or categorical numerical), then at step 803 one or more categorical statistical measures are applied to the data in the two columns generate categorical association data. As explained below, the one or more categorical statistical measures are also determined based on the relationship classification of the columns.

Categorical-Categorical Categorical Statistical Measures

Figure 9:
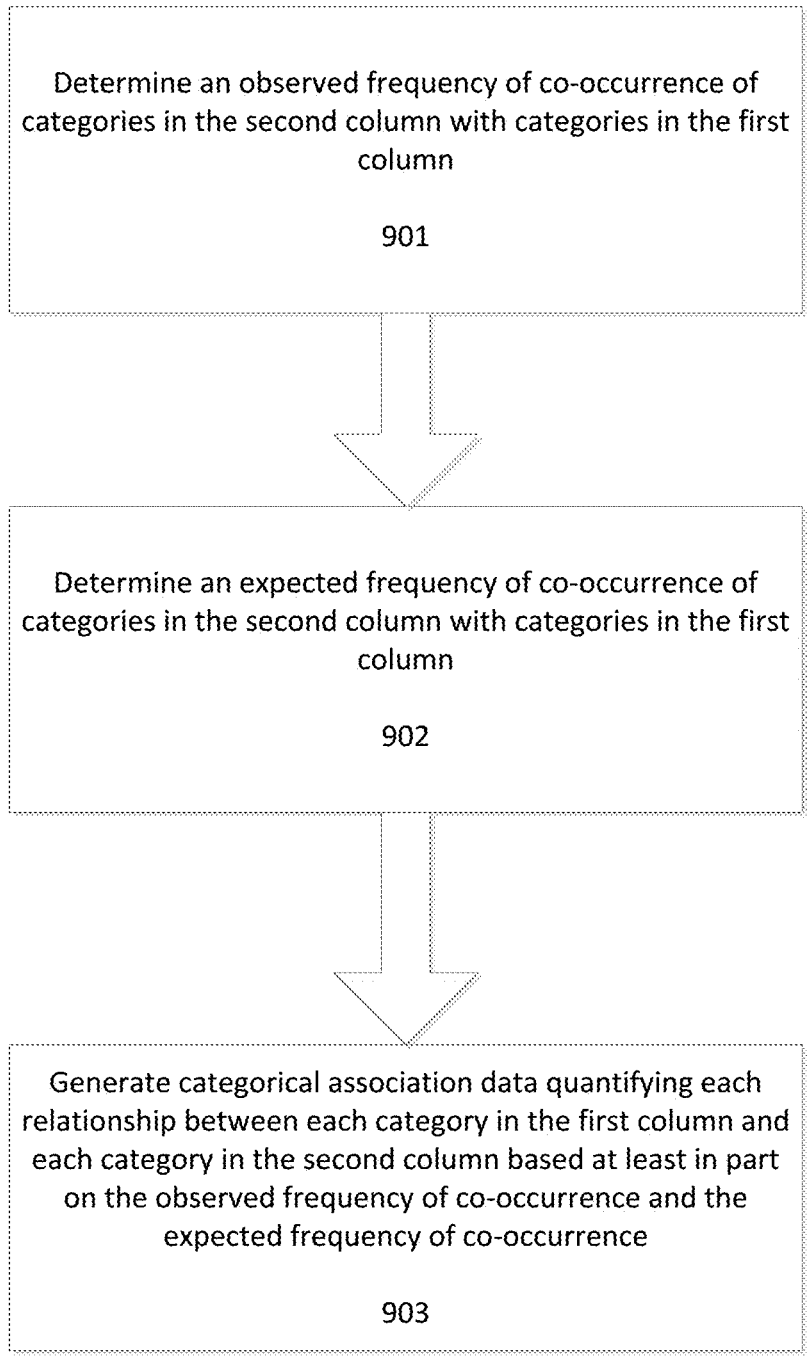
FIG. 9 illustrates a flowchart for applying categorical statistical measures to generate categorical association data for categorical-categorical relationships according to an exemplary embodiment.

FIG. 9 illustrates a flowchart for generating categorical association data for a first column and second column having a categorical-categorical relationship classification. At step 901 an observed frequency of co-occurrence of categories in the second column with categories in the first column is determined. As discussed earlier with regard to the section on global statistical measures for categorical-categorical relationship classifications, the observed frequency of co-occurrence is given by Oij for each of the categories i in the first column and the categories j in the second column.

At step 902 an expected frequency of co-occurrence of the categories in the second column with the categories in the first column is determined. As discussed earlier with regard to the section on global statistical measures for categorical-categorical relationship classifications, the expected frequency of co-occurrence is given by Eij for each of the categories i in the first column and the categories j in the second column.

At step 903 categorical association data quantifying each relationship between each category in the first column and each category in the second column is generated based at least in part on the observed frequency of co-occurrence and the expected frequency of co-occurrence. The categorical association data for each pair of categories (one category from the first column and one category from the second column) can be expressed as a relationship strength:

$$f_{ij} = \frac{O_{ij}}{E_{ij}} - 1$$

When f=0, there is no relationship as the observed frequency of occurrence is equal to the expected frequency of occurrence. When f<0, there is a negative relationship, as the observed frequency of occurrence is less than the expected frequency of occurrence. When f>0, there is a positive relationship, as the observed frequency of occurrence is greater than the expected frequency of occurrence.

Categorical-Categorical Visualization

After the categorical association data is generated, the process proceeds to step 105 of FIG. 1 and the association data (the global association data and the categorical association data in this case) is transformed into a categorical-categorical visualization. The visualization can include one or more indicators corresponding to one or more relationships in the plurality of relationships (categorical and global) among the data values in both columns and the layout of the visualization can be determined based on the relationship classification. For example, the numerical-numerical visualization will have a different layout than the categorical-numerical visualization, which itself will have a different layout from the categorical-categorical visualization.

Figure 10A:
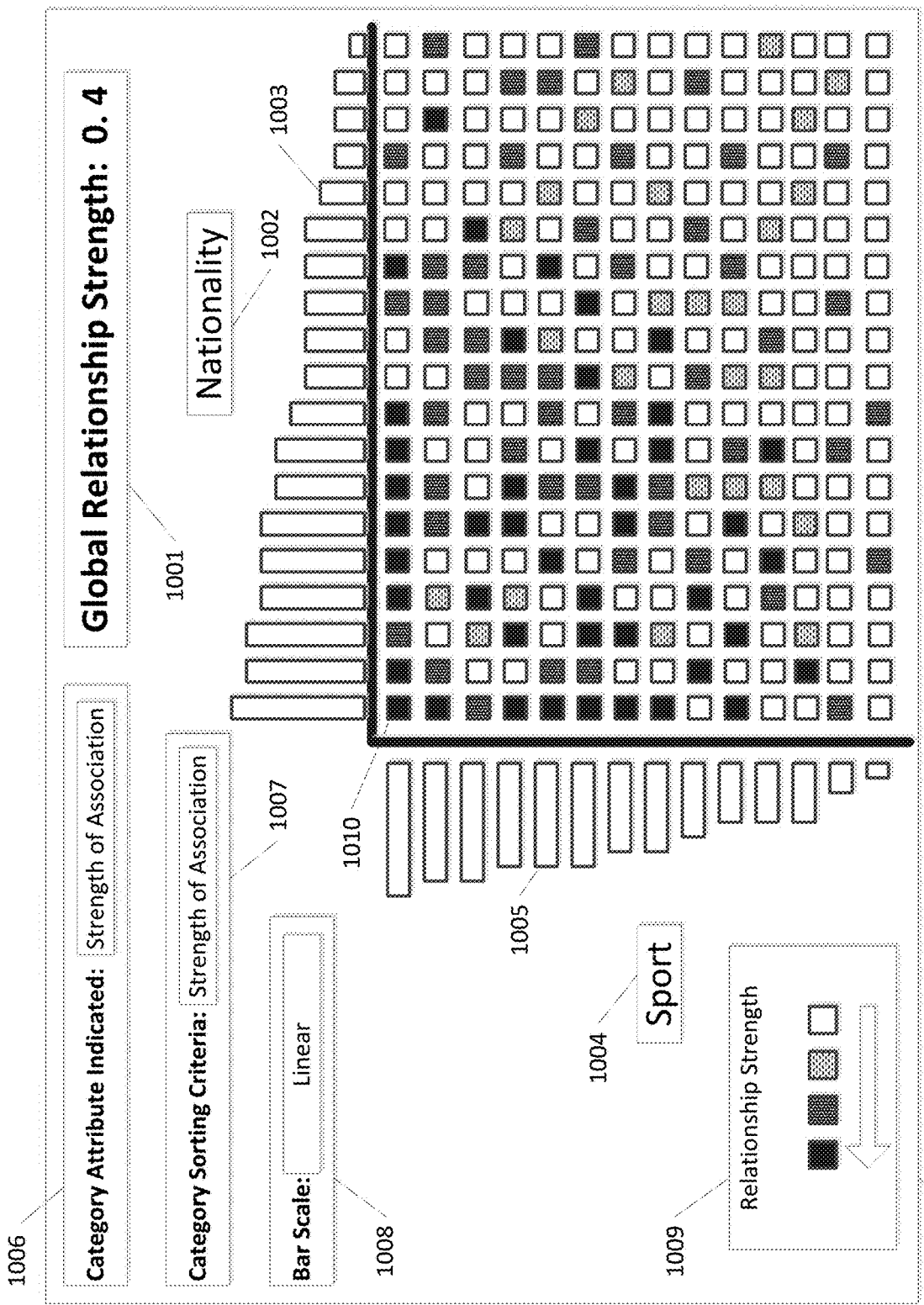
FIGS. 10A-10F illustrate an interface for visualizing categorical-categorical relationships according to an exemplary embodiment.

FIG. 10A illustrates an example of the categorical-categorical visualization in interface 1000. The interface 1000 can correspond to the Nationality 702A and Sport 703A columns of FIG. 7E and can be generated, for example, as a result of the user re-selecting relationship strength indicator 702C.

As shown in FIG. 10A, the interface 1000 includes a global relationship indicator 1001 corresponding to the global association data. In this case, the global relationship indicator 1001 corresponds to the result of Cramer's V coefficient, as discussed earlier. The visualization also includes a first axis comprising a first plurality of category indicators 1005 representing a plurality of categories of the first column, which is indicated by column indicator 1004.

The first plurality of category indicators 1005 can be sorted according to a sorting criteria 1007, which in this case is the overall strength of association between a category of a column and the categories of the another column. Other sorting criteria can include one or more of names of categories within the column, an intrinsic rank of categories within the column (in the case of ordinal categorical variables), a frequency of a corresponding category, or a strength of association between a corresponding category in a column and all categories in another column.

Each category indicator in the first plurality of category indicators 1005 visually represents a category attribute 1006 of the corresponding category. In this case, the category attribute indicated is the strength of association between the corresponding category in the first plurality of categories and the categories of the second column. Therefore, the categories of the first column which have a higher strength of association with the categories of the second column will have a category indicator which reflects this higher strength of association, such as through a longer bar, shading, color, or some other visual representation. Other category attributes include one or more of a name of a corresponding category, an intrinsic rank of a corresponding category, a frequency of a corresponding category, or a strength of association between a corresponding category in a column and all categories in another column.

The scale of each of the category indicator bars for each of the first plurality of category indicators can also be adjusted from linear to logarithmic using interface component 1008. As shown in FIG. 10A, the bars of the category indicators are linear.

The visualization also includes a second axis comprising a second plurality of category indicators 1003 representing a plurality of categories of the second column, which is indicated by a second column indicator 1002.

As shown in FIG. 10A, the second plurality of category indicators 1003 are also sorted according to a sorting criteria 1007, which in this case is the overall strength of association between a category of a column and the categories of the another column.

Each category indicator in the second plurality of category indicators 1003 visually represents a category attribute 1006 of the corresponding category. In this case, the category attribute indicated is the strength of association between the corresponding category in the second plurality of categories and the categories of the first column. Therefore, the categories of the second column which have a higher strength of association with the categories of the first column will have a category indicator which reflects this higher strength of association, such as through a longer bar, shading, color, or some other visual representation. The scale of each of the category indicator bars for each of the second plurality of category indicators can also be adjusted from linear to logarithmic using interface component 1008. As shown in FIG. 10A, the bars of the category indicators are linear.

The visualization also includes a plurality of categorical association indicators, such as categorical association indicator 1010, which correspond to the categorical association data. As shown in FIG. 10A, the plurality of categorical association indicators are arranged in rows corresponding to the first plurality of category indicators and columns corresponding to the second plurality of category indicators.

Each categorical association indicator visually represents a relationship between a category in the plurality of categories in the first column and a category in the plurality of categories in the second column (in this case, the ratio of the observed frequency of co-occurrence of a category in the first column and a category in the second column to the expected frequency of co-occurrence of a category in the first column and a category in the second column).

As shown in key 1009 of FIG. 10A, the relative strength of the relationship is given by the shading/color of the corresponding categorical association indicator, with darker categorical association indicators corresponding to stronger relationships. However, a variety of visual representations can be utilized for the categorical association indicators. For example, each categorical association indicator in the plurality of categorical association indicators can comprise one or more of a color, a number, a shape, or any other visual representation which conveys a strength of relationship.

The interface 1000 of the categorical-categorical visualization is configured to receive user input relating to one or more of the sorting criterion 1007, the category attribute visually represented by each category indicator 1006, one or more category indicators in the first plurality of category indicators 1005, or one or more category indicators in the second plurality of category indicators 1007, or the bar scale 1008.

Additional operations that can be performed on the categories in the categorical-categorical visualization include selecting or filter one or more categories, grouping multiple categories into a single category, splitting a category into multiple categories using an intermediate visualization (e.g., a bar chart) to allow the user to express one or more cutoff values or separators required to execute the split.

Additional operations that can be performed on the categorical-categorical visualization include any of the operations described above for a categorical column that are based on the value in the other categorical value, such as grouping or splitting categories in one of the two columns. Additionally, a categorical column can be recoded into an ordinal column based on the values in the other column.

The method described with reference to FIG. 1 can further include receiving, via the interface, a user input relating to one or more of: the sorting criterion, the category attribute visually represented by each category indicator, one or more category indicators in the first plurality of category indicators, or one or more category indicators in the second plurality of category indicators and updating one or more of: the global relationship indicator, the first plurality of category indicators, the second plurality of category indicators, or the categorical association indicators based at least in part on the user input.

Figure 10B:
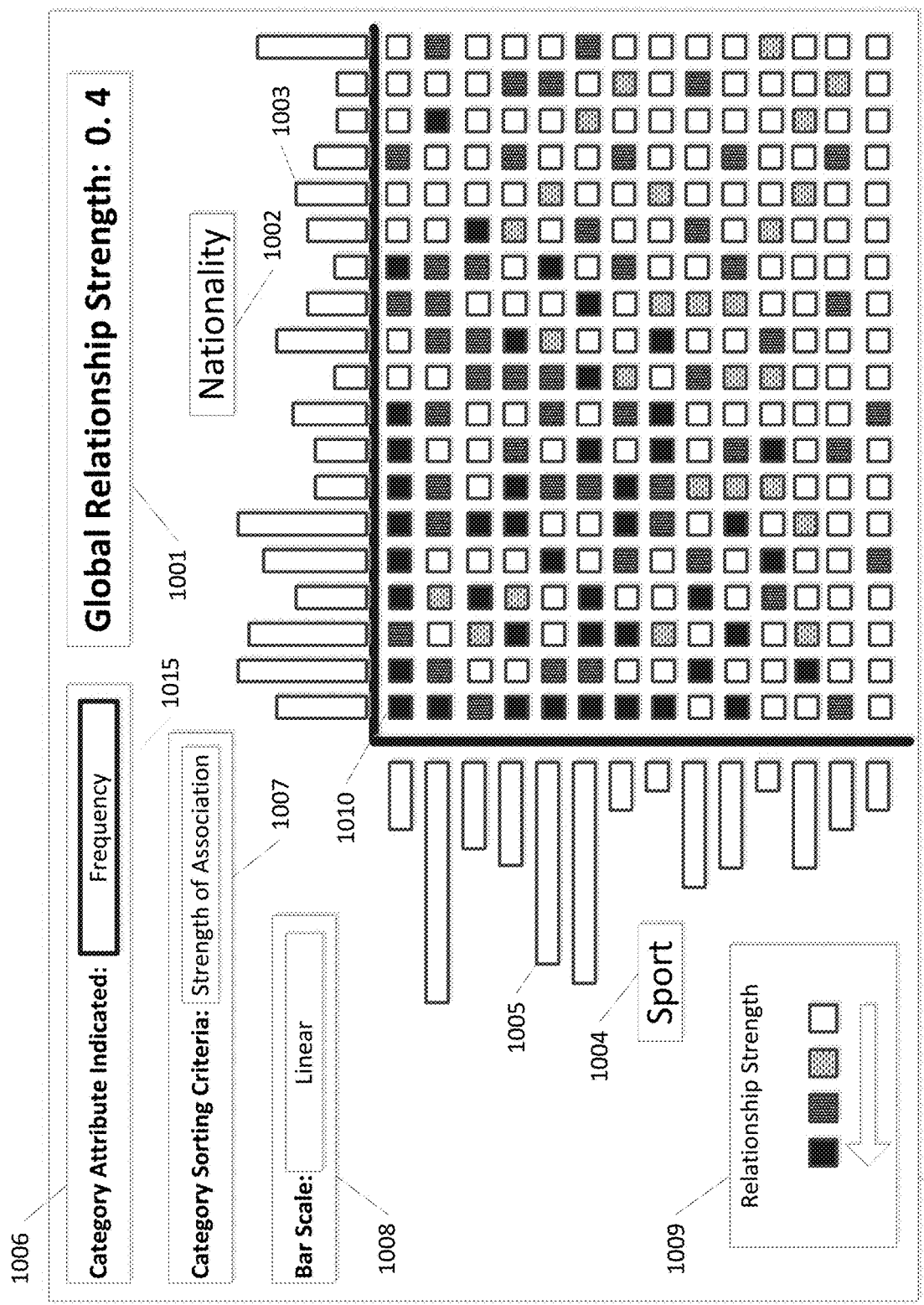

For example, FIG. 10B illustrates the scenario where the user has adjusted the category attribute indicated 1006 to select frequency of category 1015 rather than strength of association. As shown in FIG. 10B, the corresponding category indicators 1003 and 1005 have been updated and not reflect the frequency of each category. As shown in FIG. 10B, the ordering of the categories and the categorical association indicators have not changed since the user did not change the category sorting criteria.

Figure 10C:
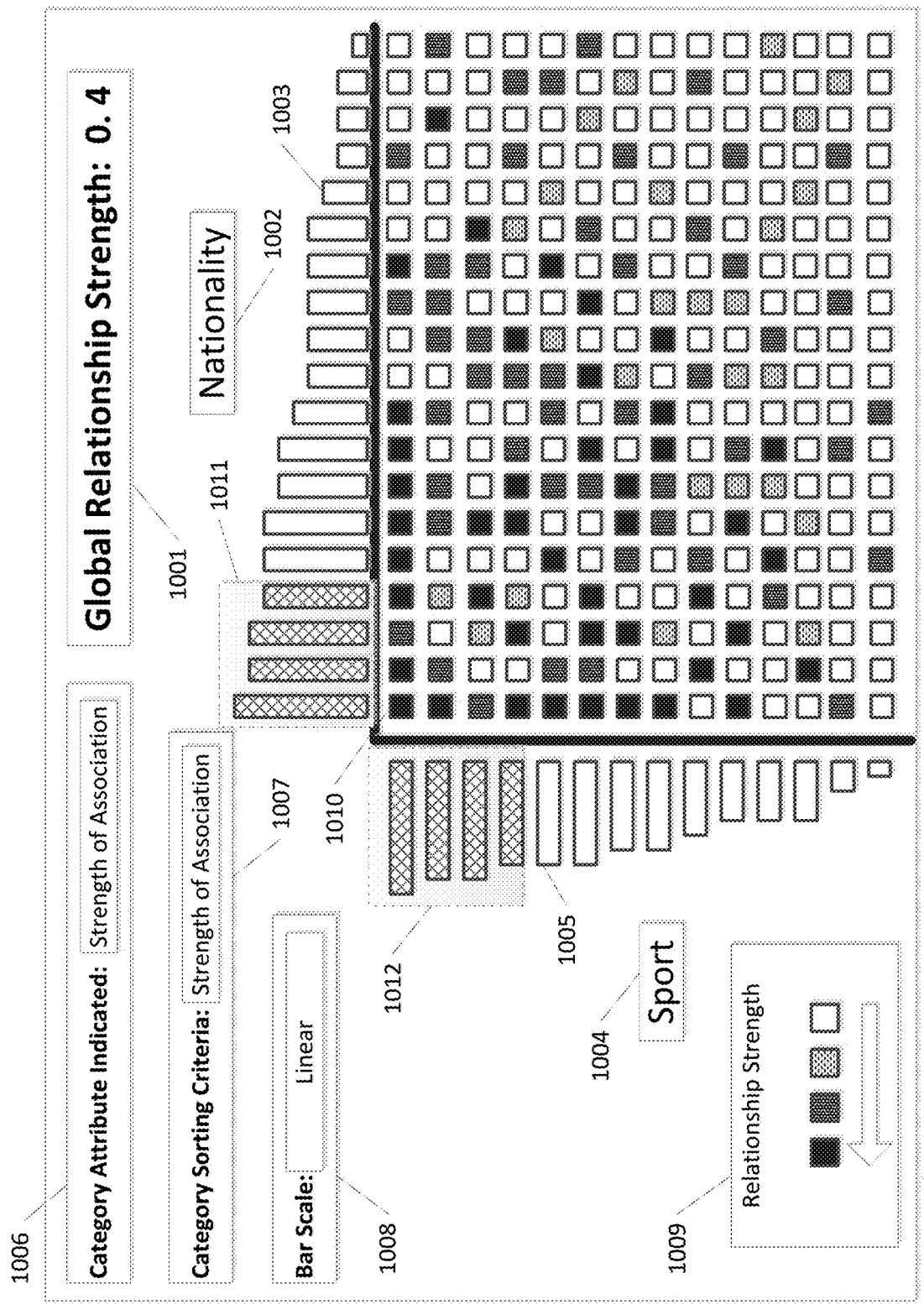

FIG. 10C illustrates the scenario where the user has selected category indicators 1012 in the first plurality category indicators 1005 and selected category indicators 1011 in the second plurality of category indicators. These selections can be made using an input device. For example, the user can drag a mouse pointer within the interface 1000 to create boxes 1011 and 1012 which include the selected categories.

After receiving this selection, the system can recalculate all metrics in the categorical-categorical visualization using only the categories corresponding to the selected category indicators and/or the system can revise the interface 1000 of the visualization to emphasize categories and categorical association indicators corresponding to the selected category indicators.

In the scenario where a selection is made of one or more category indicators in a first plurality of category indicators corresponding to one or more categories of the first column and one or more category indicators in a second plurality of category indicators corresponding to one or more categories of the second column, recalculating all metrics in the categorical-categorical visualization using only the categories corresponding to the selected category indicators can include applying the one or more global statistical measures to the data in the one or more categories of the first column and the one or more categories of the second column to generate new global association data.

Recalculating all metrics in the categorical-categorical visualization can also include applying the one or more categorical statistical measures to the data in the one or more categories of the first column and the one or more categories of the second column to generate new categorical association data and updating the visualization based at least in part on one or more of the new global association data or the new categorical association data.

Of course, it is not necessary to re-calculate all metrics in response to a selection of one or more subsets of categories indicators, as only one or more metrics can be re-calculated, such as the global relation strength. Alternatively, the system can merely update the interface of the visualization to emphasize the selected category indicators. The user can specify how they would like the selection of subsets of category indicators to be handled (such as which metrics, if any, they would like to recalculate).

Figure 10D:
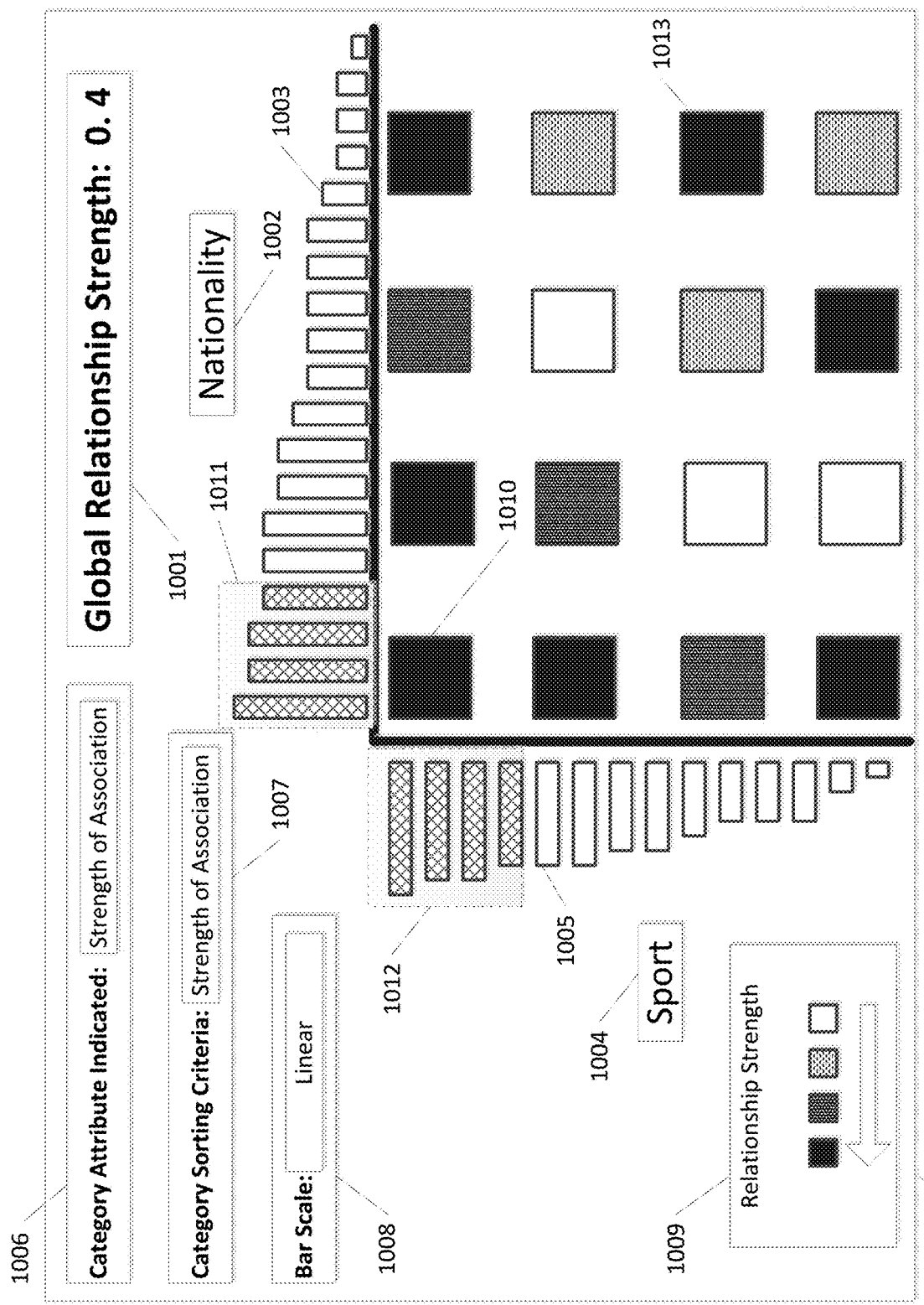

FIG. 10D illustrates the category-category visualization after the selections of FIG. 10C in the scenario where no metrics are re-calculated. As shown in FIG. 10D, the categorical association indicators corresponding to the selected category indicators 1011 and the selected category indicators 1012 have been emphasized. For example, categorical association indicator 1013 corresponds to the fourth Nationality category from the left and the third Sport category from the top.

Figure 10E:
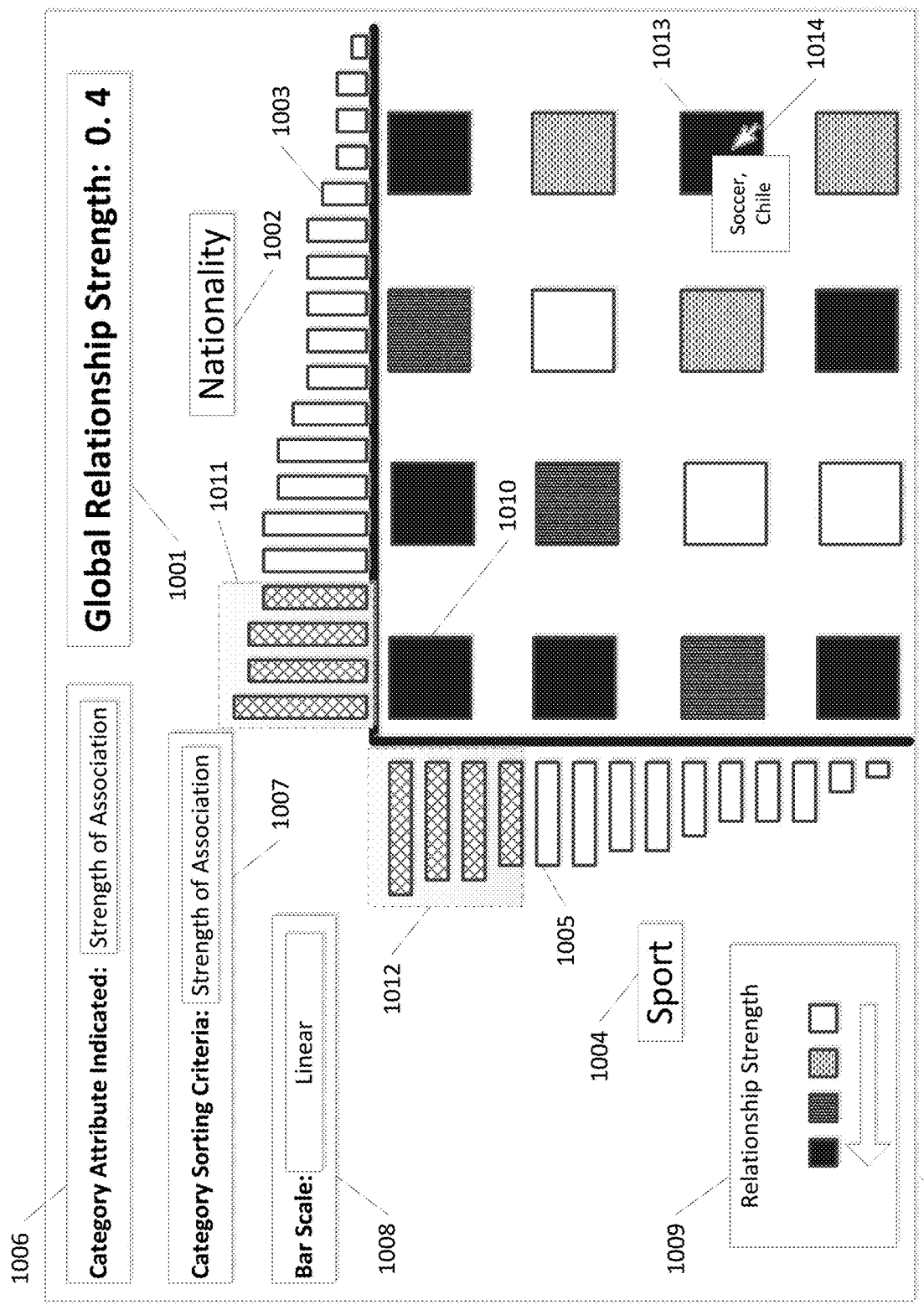

A user can interact with the categorical association indicators using a pointing device or other input to display additional information. For example, FIG. 10E illustrates the interface 1000 when the user hovers the mouse pointer 1014 or clicks on the categorical association indicator 1013. As shown in FIG. 10E, in response to the user input, a categorical association information window displays the two categories (the category in the first column and the category in the second column) corresponding to that categorical association indicator. In this case categorical association indicator 1013 correspond to the category "Soccer" in the Sport column and the category "Chile" in the Nationality column.

Figure 10F:
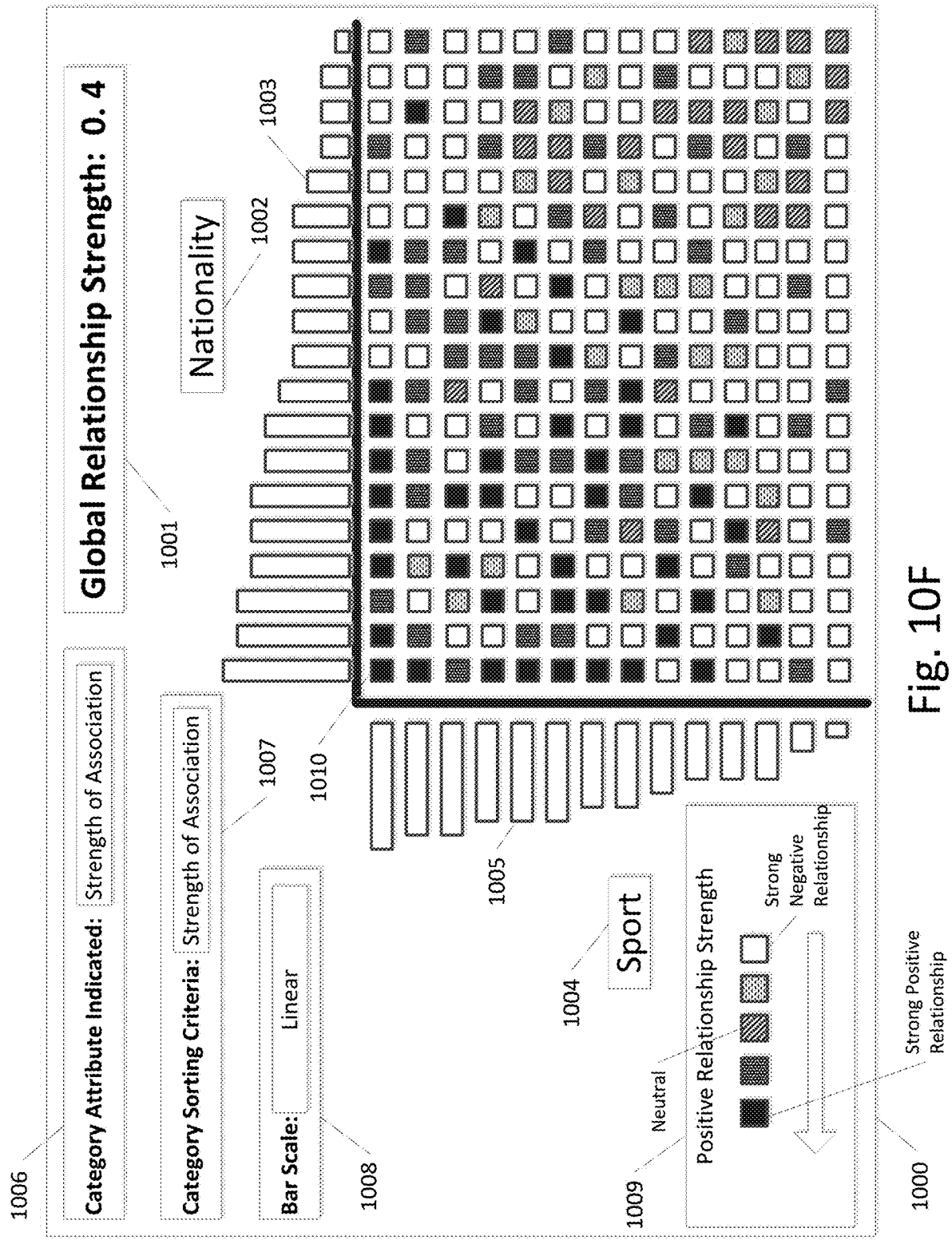

Of course, the categorical-categorical visualization is not limited to showing only an absolute strength of relationship or only positive relationships between categories. The categorical association indicators in the categorical-categorical visualization can also indicate whether a relationship is a positive or negative relationship. For example, FIG. 10F illustrates the interface 1000 of the categorical-categorical visualization and includes categorical association indicators, such as categorical association indicator 1010 that correspond to both negative categorical relationships (where observed frequency of co-occurrence is less than the expected frequency of co-occurrence) and positive categorical relationships (where observed frequency of co-occurrence is greater than the expected frequency of co-occurrence) in the categorical association data. This is shown in key 1009 of FIG. 10F. The range of relationships strengths shown in key 1009 can be represented using any form of visual representation, such shapes, colors, shades, color gradients, numbers, letters, etc. For example, negative relationships can have red categorical association indicators, positive relationships can have blue categorical association indicators, and neutral relationships can have white categorical association indicators. The strength of the relationship can then determine the intensity of the color.

Figure 11A:
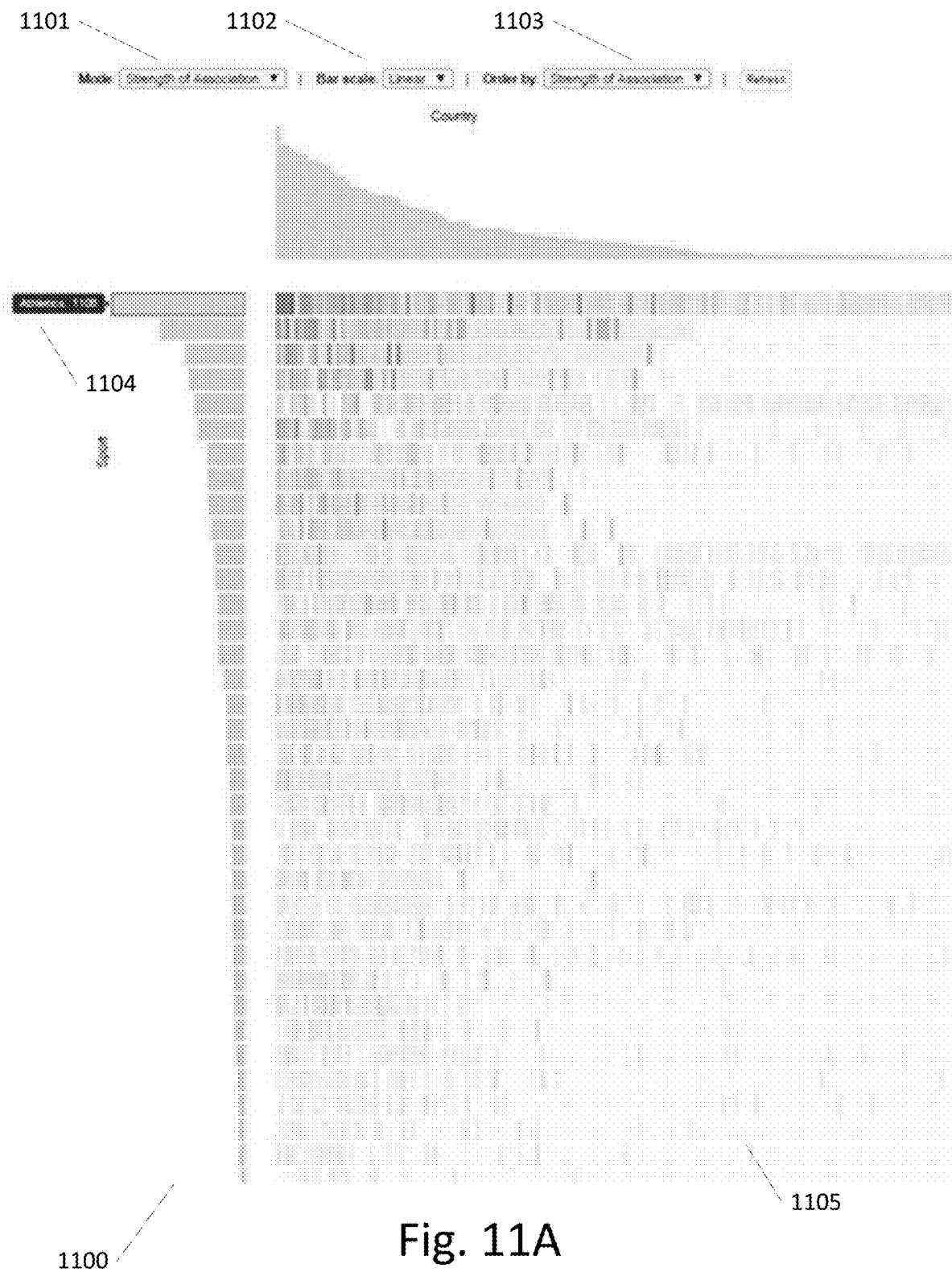
FIGS. 11A-11D illustrate another interface for visualizing categorical-categorical relationships according to an exemplary embodiment.

FIG. 11A illustrates another example of the categorical-categorical visualization for a large data set. The interface 1100 in FIG. 11 includes categorical association indicators 1105, a "mode" input interface 1101 (which corresponds to the previously discussed "category attribute indicated" interface element," a bar scale input interface 1102, and a sort order input interface 1103. Additionally, as shown in FIG. 11A, a user has selected the first category indicator in the plurality of Sport category indicators, resulting in information box 1104 which reveals the category ("Athletics") and the total strength of association (1106) of the Athletics category with the Country categories. This can be the sum of the strengths of association of the category Athletics and each of the Country categories.

Figure 11B:

FIG. 11B illustrates the interface 1100 of the categorical-categorical visualization of FIG. 11A when the user has selected one or more Countries 1107 and one or more Sports 1106. As shown in FIG. 11B, the categorical association indicators corresponding to the selected Countries 1107 and selected Sport 1106 are emphasized and enlarged. Additionally, FIG. 11B illustrates the information window that appears when the user selects categorical association indicator 1108. The information window shows the two categories corresponding to that categorical association indicator (Football, Brazil) and the strength of association (28).

Figure 11C:
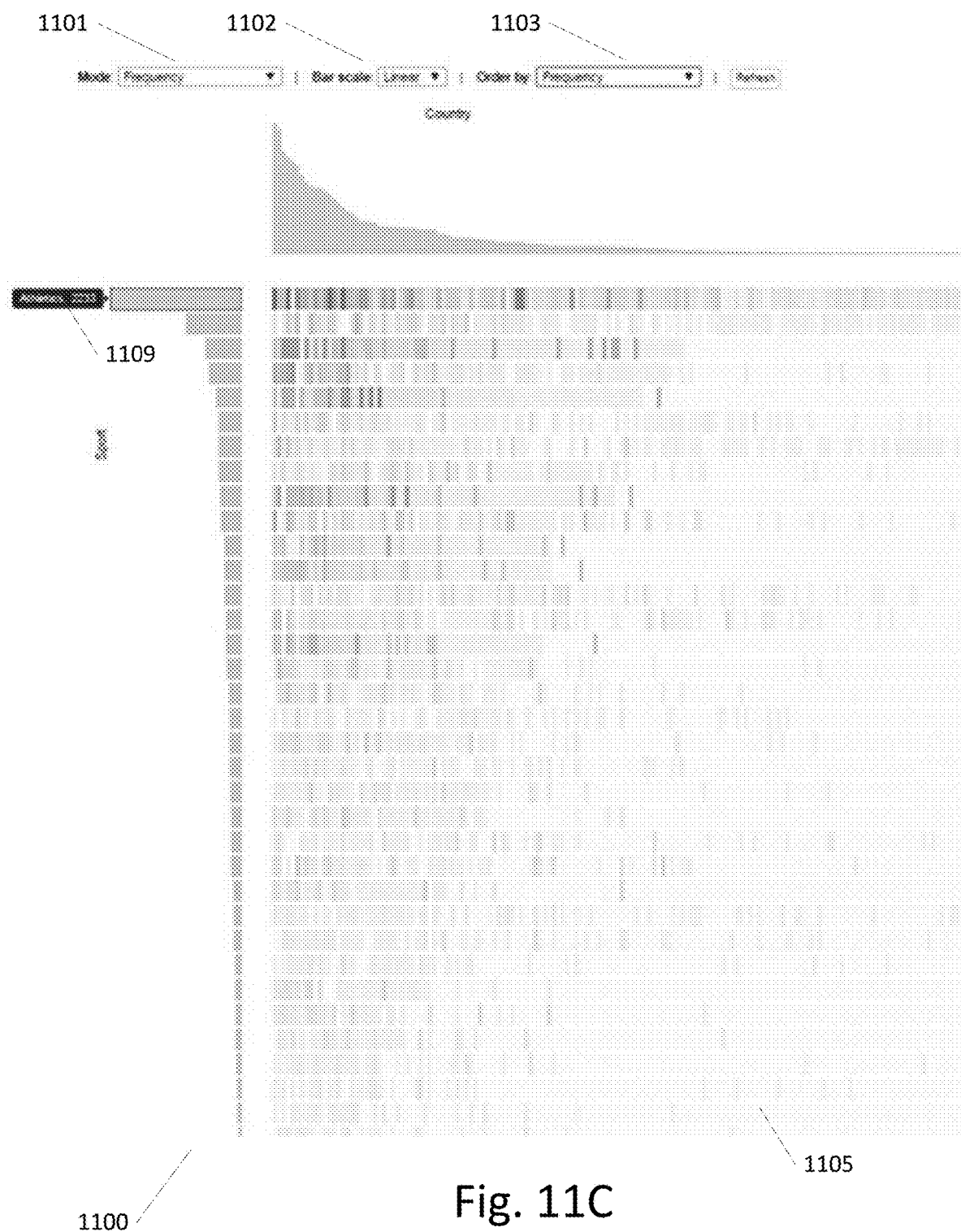

FIG. 11C is similar to FIG. 11A, except that the user has selected Mode 1101 to be "frequency" and the Sort Order 1103 to also be frequency. As a result, each of the category indicators in FIG. 11C indicates the total frequency of that category and the category indicators are also sorted by the frequency of the corresponding categories. Additionally, as shown in FIG. 11C, a user has selected the first category indicator in the plurality of Sport category indicators, resulting in information box 1109 which reveals the category ("Athletics") and the total frequency (2233) of the Athletics category.

Figure 11D:
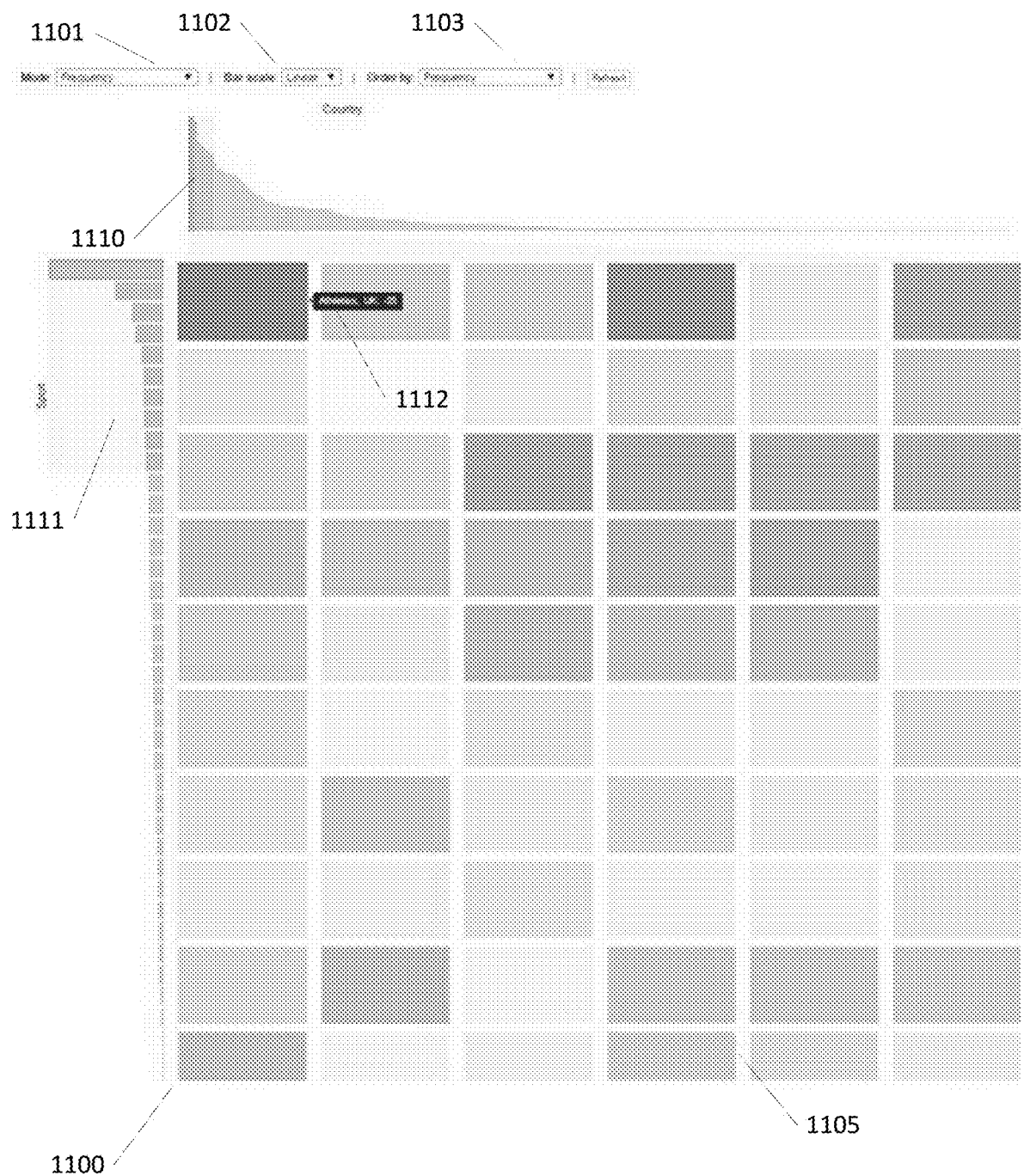

FIG. 11D illustrates the interface 1100 of the categorical-categorical visualization of FIG. 11C when the user has selected one or more Countries 1110 and one or more Sports 1110. As shown in FIG. 11D, the categorical association indicators corresponding to the selected Countries 1110 and selected Sport 1111 are emphasized and enlarged. Additionally, FIG. 11D illustrates the information window that appears when the user selects categorical association indicator 1112. The information window shows the two categories corresponding to that categorical association indicator (Athletics, UK) and the strength of association (−35).

Categorical-Numerical Categorical Statistical Measures

Categorical association data for categorical-numerical relationship classifications can be calculated in multiple ways. In particular, categorical association data for categorical-numerical relationship classifications can be generated by calculating results of a plurality of one-sample T-tests for categories in the first column and ranges of data values in the second column to generate the categorical association data quantifying each relationship between each category in the first column and each range of data values in the second column. In this case, categorical association data for each category of the categorical column would be the result of a one-sample T-test on that category over a corresponding range of data values in the numerical column. The application of the one-sample T-test for each category is discussed further in the section on Categorical-Numerical Global Statistical Measures.

Additionally, before applying a t-test, for any category of the of the categorical variable that identifies only as small sample of values on the numerical variable (i.e., a small number of occurrences of that category) the system can optionally increase this sample by simulating/extrapolating additional values that satisfy specific constraints such as preserving the mean, standard deviation, or value range of the original sample. This feature can be used to meet minimal sample size requirements for the statistical tests.

Figure 12:
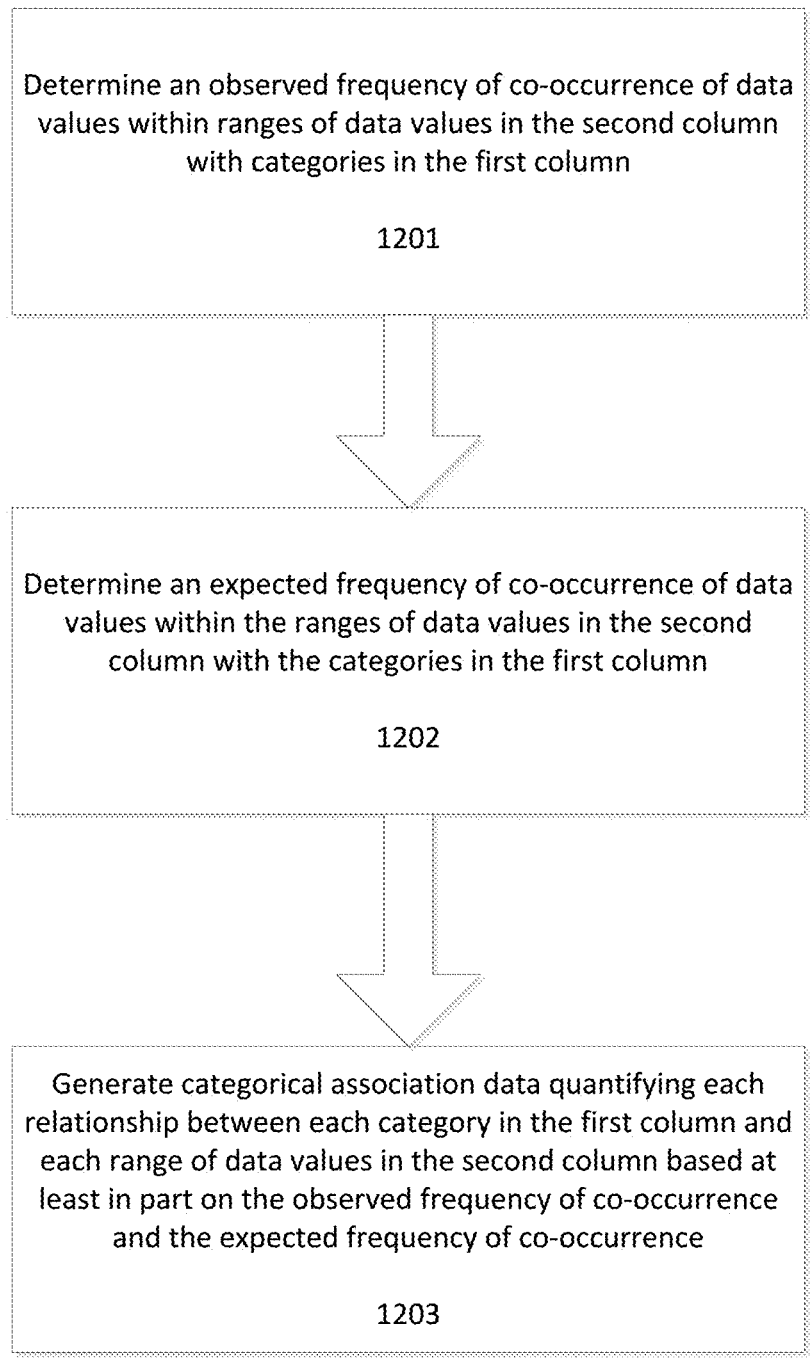
FIG. 12 illustrates a flowchart for applying categorical statistical measures to generate categorical association data for categorical-numerical relationships according to an exemplary embodiment.

FIG. 12 illustrates a flowchart for another method of generating categorical association data for a first column and second column having a categorical-numerical relationship classification. At step 1201 an observed frequency of co-occurrence of data values within ranges of data values in the second column with categories in the first column is determined.

When a range of values in the second column is specified, the problem of measuring relationship strength in a categorical-numerical pair can be reframed in terms of a r×2 contingency table where the r rows represent the categories in the first column and the 2 columns represent the selected and unselected ranges in the second column, respectively (with the unselected ranges being the second or the first column) and each cell represents whether a category of the first column is present in a range of the second column.

For each category in the first column and each range of data values in the second column, the total number of data values in the second column within the range can be determined. A range can be specified by a user (as will be discussed further below), but initially, the ranges can also be preset ranges. For example, Range 1: 0-25% of data values (in numerical ascending order) in the second column, Range 2: 25-50% of data values (in numerical ascending order) in the second column, Range 3: 50-75% of data values (in numerical ascending order) in the second column, and Range 4: 75-100% of data values (in numerical ascending order) in the second column.

Alternatively, the observed frequency and expected frequency (discussed below) calculations can be performed with different possible ranges for each category so that a range for which each category has the strongest relationship can be identified. For example, given a first category, the system can compute observed frequency of co-occurrence of data values within 10 possible ranges R1 . . . R10 for that first category. The system can then compute expected frequency of co-occurrence of data values within the 10 possible ranges R1 . . . R10 for that first category. The system can then compute a strength of association for that first category for each of the 10 possible ranges R1 . . . R10 and select the range which has the strongest (positive and/or negative) strength of association.

At step 1202 an expected frequency of co-occurrence of data values within the ranges of data values in the second column with the categories in the first column is determined. In particular, for each category and each range of data values, the expected total frequency value within the range can be calculated as a percentage of values in the distribution of the second column for the selected range multiplied by the total frequency for that category.

At step 1203 categorical association data quantifying each relationship between each category in the first column and each range of data values in the second column is generated based at least in part on the observed frequency of co-occurrence and the expected frequency of co-occurrence. The categorical association data for each category-range pair can be expressed as a relationship strength:

$$f_j = \frac{O_j}{E_j} - 1,$$

where j is the category, Oj is the observed frequency of co-occurrence and Ej is the expected frequency of co-occurrence.

When f=0, there is no relationship as the observed frequency of occurrence is equal to the expected frequency of occurrence. When f<0, there is a negative relationship, as the observed frequency of occurrence is less than the expected frequency of occurrence. When f>0, there is a positive relationship, as the observed frequency of occurrence is greater than the expected frequency of occurrence.

Categorical-Numerical Visualization

After the categorical association data is generated, the process proceeds to step 105 of FIG. 1 and the association data (the global association data and the categorical association data in this case) is transformed into a categorical-numerical visualization. The visualization can include one or more indicators corresponding to one or more relationships in the plurality of relationships (categorical and global) among the data values in both columns and the layout of the visualization can be determined based on the relationship classification. For example, the numerical-numerical visualization will have a different layout than the categorical-numerical visualization, which itself will have a different layout from the categorical-categorical visualization.

Figure 13A:
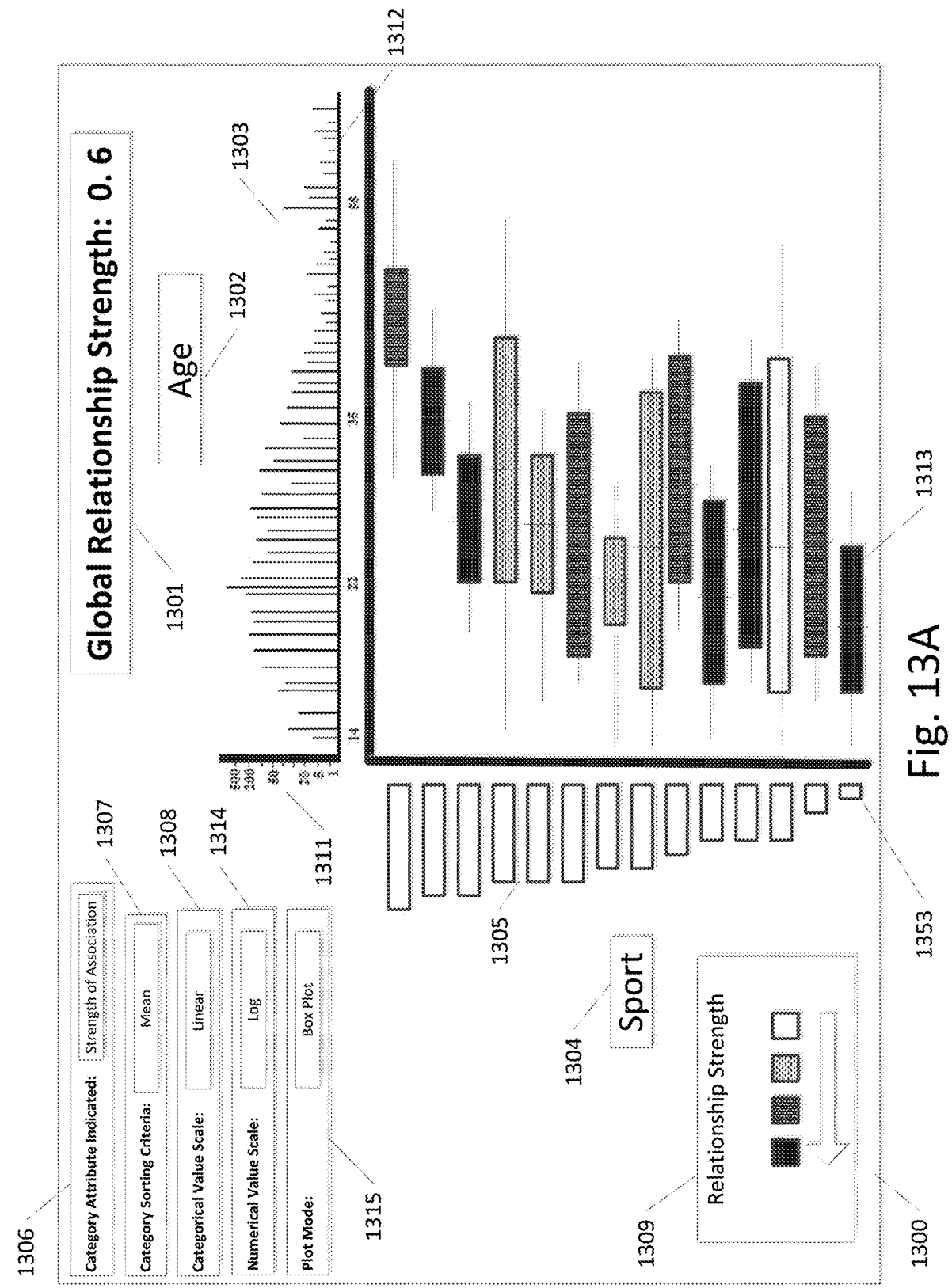
FIGS. 13A-13C illustrate an interface for visualizing categorical-numerical relationships according to an exemplary embodiment.

FIG. 13A illustrates an example of the categorical-numerical visualization in interface 1300. The interface 1300 can correspond to the Age 705A and Sport 703A columns of FIG. 7E and can be generated, for example, as a result of the user re-selecting relationship strength indicator 705C.

As shown in FIG. 13A, the interface 1300 includes a global relationship indicator 1301 corresponding to the global association data. In this case, the global relationship indicator 1301 corresponds to the normalized (from zero to one) average t-test value, as discussed earlier.

The visualization also includes a first axis comprising a plurality of category indicators 1305 representing a plurality of categories of the first column, which is indicated by column indicator 1304.

The first plurality of category indicators 1305 can be sorted according to a sorting criteria 1307, which in this case is the mean value of the data values in the second column corresponding to each category in the first column. Other sorting criteria can also include one or more of: names of categories within the first column, an intrinsic rank of categories within the first column (in the case of ordinal categorical variables), a sum of data values in the second column for a corresponding category in the first column, a frequency of a categories in the first column, a strength of association between a category in the first column and all data values in second column (here the range would include all of the data values in the second column), a range of data values in the second column for a corresponding category in the first column, an interquartile range (middle 50%) of data values in the second column for a corresponding category in the first column, a mode of data values in the second column for a corresponding category in the first column, an average of data values in the second column for a corresponding category in the first column, a variance of data values in the second column for a corresponding category in the first column, a standard deviation of data values in the second column for a corresponding category in the first column, a symmetry of data values in the second column for a corresponding category in the first column, a skewedness of data values in the second column for a corresponding category in the first column, and/or a kurtosis (measure of whether the data is peaked or flat relative to the normal distribution) of data values in the second column for a corresponding category in the first column.

Each category indicator in the plurality of category indicators 1305 visually represents a selected category attribute 1306 of the corresponding category in the first column. In this case, the category attribute indicated is the strength of association between the corresponding category in the first plurality of categories and the data values of the second column. Therefore, the categories of the first column which have a higher strength of association with the data values of the second column will have a category indicator which reflects this higher strength of association, such as through a longer bar, shading, color, or some other visual representation. Other category attributes can also include one or more of: names of categories within the first column, an intrinsic rank of categories within the first column (in the case of ordinal categorical variables), a sum of data values in the second column for a corresponding category in the first column, a frequency of a categories in the first column, a strength of association between a category in the first column and all data values in second column (here the range would include all of the data values in the second column), a range of data values in the second column for a corresponding category in the first column, an interquartile range (middle 50%) of data values in the second column for a corresponding category in the first column, a mode of data values in the second column for a corresponding category in the first column, an average of data values in the second column for a corresponding category in the first column, a variance of data values in the second column for a corresponding category in the first column, a standard deviation of data values in the second column for a corresponding category in the first column, a symmetry of data values in the second column for a corresponding category in the first column, a skewedness of data values in the second column for a corresponding category in the first column, and/or a kurtosis (measure of whether the data is peaked or flat relative to the normal distribution) of data values in the second column for a corresponding category in the first column.

The scale of each of the category indicator bars for each of the plurality of category indicators can also be adjusted from linear to logarithmic using interface component 1308. As shown in FIG. 13A, the bars of the category indicators are linear.

The visualization also includes a second axis comprising a distribution of data values 1303 in the second column, which is indicated by column indicator 1302. The distribution of data values 1303 itself plots the number of occurrences 1311 of a particular data value in the second column against the actual data values 1312 in the second column. As shown in FIG. 13A, the value scale for distribution of data values 1303 is set to logarithmic and can be adjusted between linear and logarithmic using interface element 1314.

The categorical-numerical visualization also includes a plurality of categorical association indicators, such as categorical association indicator 1313, which correspond to the categorical association data. Each categorical association indicator visually represents a relationship between a corresponding category in the plurality of categories in the first column and one or more ranges of data values in the second column. For example, categorical association indicator 1313 visually represents a relationship between the category in the first column corresponding to categorical indicator 1353 and the range of data values from approximately 16 to 24 in the second column. Based on the key 1309, the relationship is a strong relationship (black).

The interface 1300 of the categorical-numerical visualization can also include a plurality of categorical distribution indicators corresponding to a distribution visualization type.

Each categorical distribution indicator can visually represents a distribution of data values in the second column corresponding to a category in the plurality of categories of the first column.

The distribution visualization type can be referred to as the plot mode can be selected via the interface component for selecting the plot mode 1315. As shown in FIG. 13A, the selected plot mode (the distribution visualization type) is "Box Plot," which plots, as the categorical association indicator for each category, the middle 50% of data values in the second column which occur in that category, along with an indicator of relationship strength 1309 for that middle 50% of data values. In this case, the range used for the categorical-numerical categorical statistical measure is the middle 50% of data values for each category. The Box Plot, which is one of the distribution visualization types, also shows, using the line overlaid on the categorical association indicator for each category, the 25th percentile through the 75th percentile of data values in the second column which occur in that category. The box plots serve both as categorical association indicators (since they visually represent a relationship between a range of data values in the numerical column and a category in the categorical column) and as categorical distribution indicators (since they visually represent a distribution of data values in the numerical column corresponding to a category in the categorical column). Additional plot modes/distribution visualization types will described further below with reference to the remaining figures.

As shown in key 1309 of FIG. 13A, the relative strength of the relationship between a category in the first column and a range of data values in the second column is given by the shading/color of the corresponding categorical association indicator, with darker categorical association indicators corresponding to stronger relationships. However, a variety of visual representations can be utilized for the categorical association indicators. For example, each categorical association indicator in the plurality of categorical association indicators can comprise one or more of a color, a number, a shape, or any other visual representation which conveys a strength of relationship.

The interface 1300 of the categorical-numerical visualization is configured to receive user input relating to one or more of the sorting criterion 1307, the category attribute visually represented by each category indicator 1306, one or more category indicators in the plurality of category indicators 1305, a range of data values in the distribution of data values 1303 of the second column, the categorical value scale 1308, the numerical value scale 1314, and/or the plot mode (distribution visualization type) 1315.

Additional operations that can be performed on the categorical column in the categorical-numerical visualization include selecting or filtering one or more categories, grouping multiple categories into one category, splitting one category into multiple categories using an intermediate visualization (e.g., a bar chart) to allow the user to express one or more cutoff values or separators required to execute the split.

Additional operations that can be performed on the numerical column in the categorical-numerical visualization include selecting or filtering a subset or range of data values, recoding a set of ranges into categories, applying categorical-categorical statistical measures, and transforming the visualization into a categorical-categorical visualization.

Additional operations that can be performed on the categorical-numerical visualization include operations to manipulate the data, such as any of the operations described above with regard to the categorical column that can be based on the values in the numerical column, including grouping and splitting, recoding the categorical column into an ordinal column based on the values in the numerical column, and/or recoding a set of ranges in the numerical column into categories based on what categories map to each range so that the numerical column is recoded as categorical variable and the relationship can be processed and visualized as categorical-categorical as described above.

Additional operations that can be performed on the categorical-numerical visualization include operations to manipulate the visualization, such as any of the operations described above for the categorical column that can be be based on the values in the numerical column. These include sorting and selecting/filtering within one column (such as by sorting only, selecting/filtering only, and/or sorting plus selecting/filtering one or more values in both the categorical and numerical columns), selecting a range to view the strength of relationship (in terms similar to categorical-categorical visualization described earlier) by selecting one or more values in the numerical column, selecting one value in the numerical columns to filter categories in the categorical column, selecting a range of values in the numerical column to sort or filter categories in the categorical column (this is described further below), drawing a trend on the axis corresponding to the numerical column (or within a selected range of the numerical column) to sort or filter categories in the categorical column which match the trend, selecting multiple categories in the categorical column to filter values in the numerical column and comparing the result to the aggregate distribution based on the categories selected, and/or selecting ranges in the numerical column for two or more categorical columns to identify an intersection. Additional operations to manipulate the visualization include changing visualization attributes in the entire view of the categorical-numerical visualization or a selection and/or rescaling the axes corresponding to the categorical column and/or the numerical column.

The method described with reference to FIG. 1 can further include receiving, via the interface, a user input relating to one or more of: the sorting criterion, the category attribute visually represented by each category indicator, one or more category indicators in the plurality of category indicators, the range of data values in the distribution of data values in the second column, and/or the distribution visualization type and updating one or more of: the global relationship indicator, the plurality of category indicators, the categorical association indicators, and/or the plurality of categorical distribution indicators based at least in part on the user input.

Figure 13B:
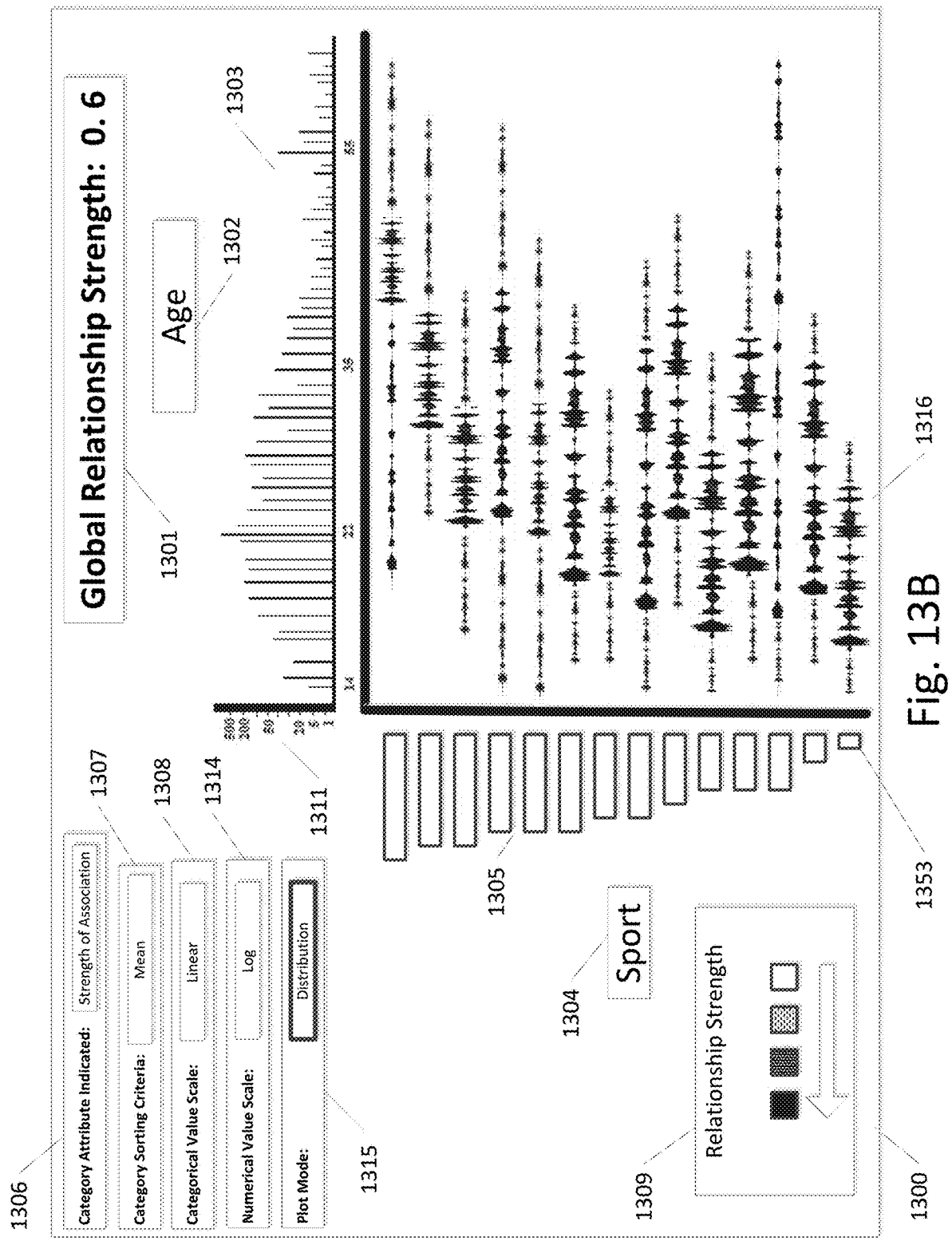

For example, FIG. 13B illustrates the scenario where the user has adjusted the distribution visualization type (plot mode 1315) to select a "distribution" mode. As a result, the box plots of FIG. 13A can be removed and replaced with raw data value distributions, such as raw data value distribution 1316. Each raw data value distribution indicates the data values in the numerical column which co-occur with a corresponding category in the categorical column. For example, raw data value distribution 1316 indicates the distribution of data values in the second column which co-occur with category 1353 in the categorical column. The raw data value distributions serve both as categorical association indicators (since they visually represent a relationship between a range of data values in the numerical column and a category in the categorical column) and as categorical distribution indicators (since they visually represent a distribution of data values in the numerical column corresponding to a category in the categorical column).

Figure 13C:
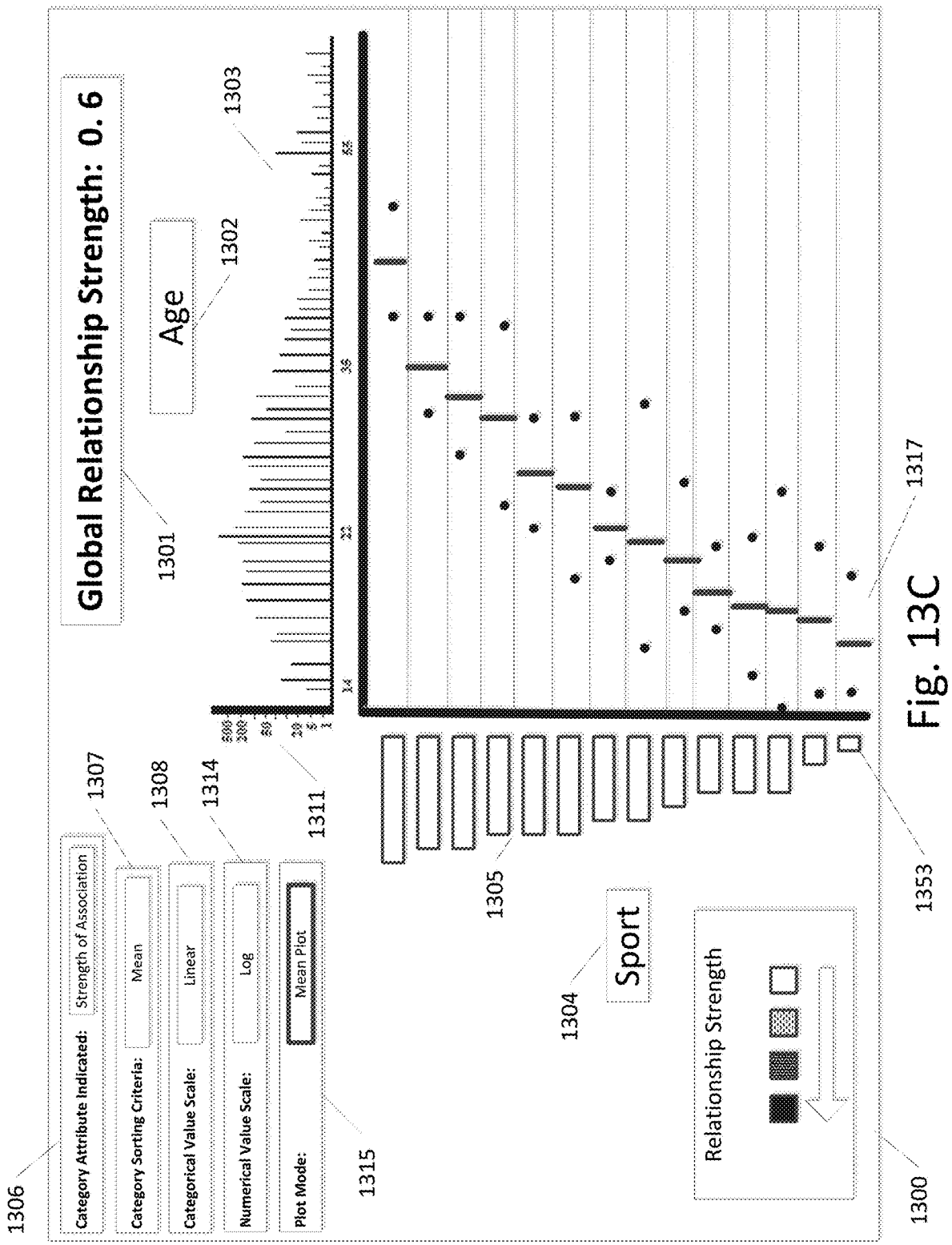

FIG. 13C illustrates the scenario where the user has adjusted the distribution visualization type (plot mode 1315) to select a "mean plot" mode. As a result, the box plots of FIG. 13A can be removed and replaced with mean plots, such as mean plot 1317. Each mean plot indicates the mean of the data values in the numerical column for each category in the categorical column. The mean is shown with a vertical line. Additionally, each mean plot indicates a standard deviation of the data values in the numerical column for each category in the categorical column using two dots on either side of the vertical line. For example, mean plot 1317 indicates the mean data values of the numerical column corresponding to category 1353 in the categorical column. The mean plots serve both as categorical association indicators (since they visually represent a relationship between a range of data values in the numerical column and a category in the categorical column) and as categorical distribution indicators (since they visually represent a distribution of data values in the numerical column corresponding to a category in the categorical column). Additionally, one or more of the plot modes can be overlaid together. For example, the mean plot and the raw data value distribution can both be displayed at the same time. Similarly, the box plot and raw data value distribution can both be displayed at the same time.

When the relationship classification is categorical-numerical and the categorical-numerical visualization is generated, the method described with reference to FIG. 1 can further include one or more of the following steps: (1) receiving, via the interface, a selection of a range of data values in the distribution of data values in the second column, (2) applying the one or more global statistical measures to the data in the first column and data corresponding to the selected range of data values in the second column to generate new global association data, (3) applying the one or more categorical statistical measures to the data in the first column and data corresponding to the selected range of data values in the second column to generate new categorical association data quantifying each relationship between each category in the first column and the selected range of data values in the second column, and (4) updating the visualization with one or more of the new global association data or the new categorical association data. Examples of these additional steps will be described with reference to FIGS. 14A-14C.

Figure 14A:
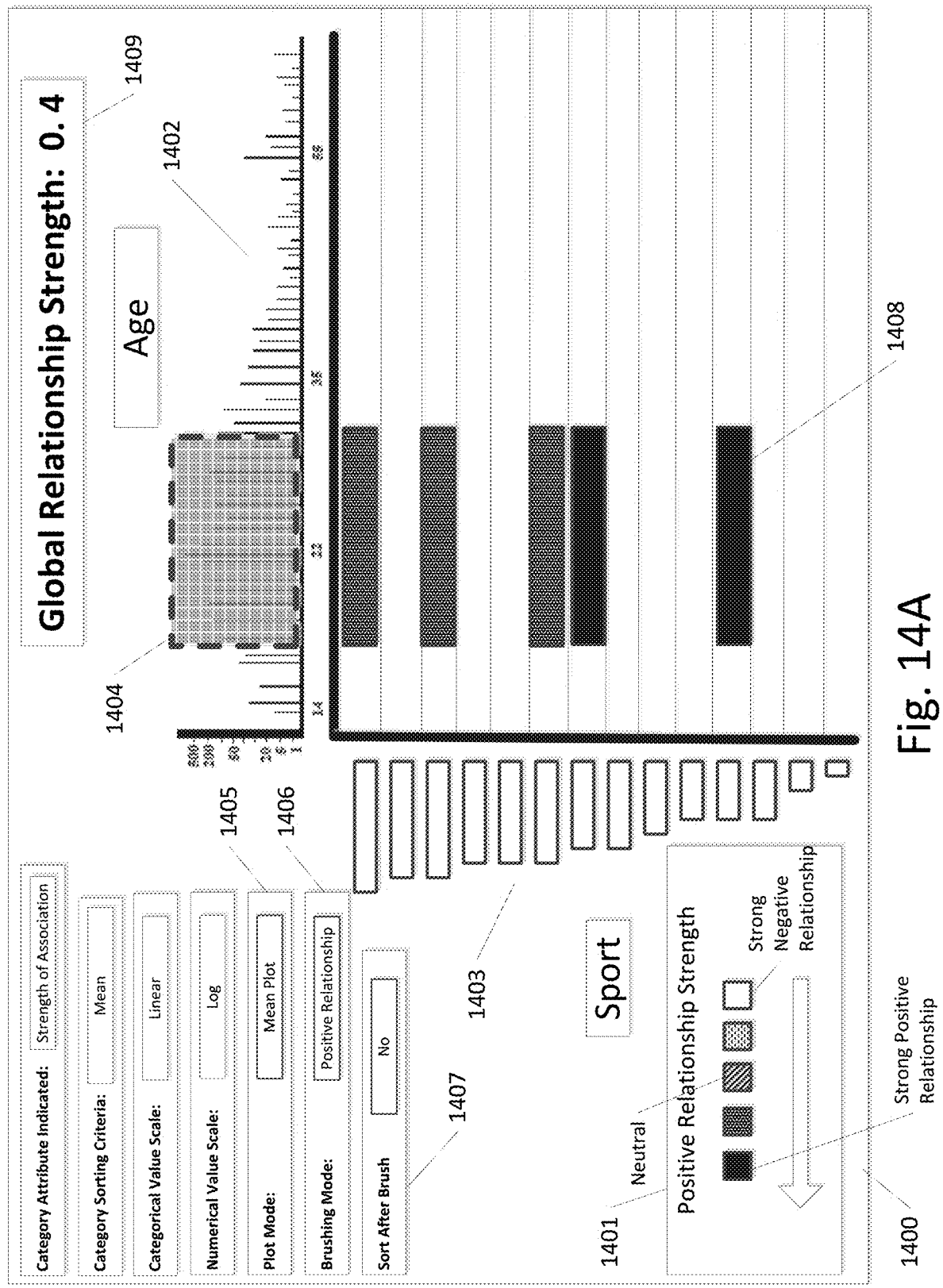
FIGS. 14A-14D illustrate an interface for visualizing categorical-numerical relationships and range selection according to an exemplary embodiment.

FIG. 14A illustrates a categorical-numerical visualization interface 1400 which is similar to those of FIGS. 13A-13C, and includes many similar elements, such as the "plot mode" input interface 1405, a first axis comprising a plurality of category indicators 1403 representing a plurality of categories of the first column, a second axis comprising a distribution of data values 1402 in the second column, and a global relationship indicator 1409 corresponding to global association data for the first categorical column and the second numerical column.

Unlike FIGS. 13A-13C, the categorical association indicators of interface 1400 can visually represent both positive and negative relationship strengths, as well as neutral relationships, as shown in key 1401. Additionally, interface 1400 includes a "brushing mode" interface element 1406, which allows the user to select whether they would like to view positive relationship strengths, negative relationship strengths, or both, as will be described below. As shown in FIG. 14A, the brushing mode is currently set to "positive relationship" meaning only positive relationship strengths will be shown.

The step of "receiving, via the interface, a selection of a range of data values in the distribution of data values in the second column" described above can be performed via a "brushing" action by the user. This brushing action can involve clicking a pointing device and dragging it to highlight or otherwise select the range of data values. Alternatively, on a touch screen device, this brushing action can be performed by a touch and drag motion.

As shown in FIG. 14A, the user has selected the range of data values 1404 which are part of the distribution of data values 1402. As discussed above, the range of data values 1404 can be selected by a brushing action or some other input action.

After selection of the range of data values 1404, the one or more global statistical measures can optionally be applied to the data in the first column and data corresponding to the selected range of data values 1404 to generate new global association data. This option can be configured by the user. If new global association data is generated for the selected range of data values, then the global relationship indicator 1409 can reflect the new global association data.

Regardless of whether new global association data is generated, after selection of the range of data values 1404, the one or more categorical statistical measures can be applied to the data in the first column and data corresponding to the selected range of data values 1404 in the second column to generate new categorical association data quantifying each relationship between each category in the first column and the selected range of data values in the second column.

The categorical-numerical visualization can then be updated with the new categorical association data. Referring to FIG. 14A, this updating step can include transmitting one or more new categorical association indicators, such as new categorical association indicator 1408, corresponding to the new categorical association data. Each new categorical association indicator in the one or more new categorical association indicators visually represents a relationship between a corresponding category in the plurality of categories in the first column and the selected range of data values 1404 in the second column.

As discussed above, the brushing mode 1406 in the interface 1400 of FIG. 14A is set to positive relationship only, so only positive relationships are represented by the one or more new categorical association indicators. Additionally, categorical-numerical visualization interface 1400 includes an interface option 1407 which allows the user to set whether the categorical indicators are sorted after a brushing action ("Sort After brush"). As this option is set to "No" in FIG. 14A, there is no sort performed as a result of the brushing.

Figure 14B:
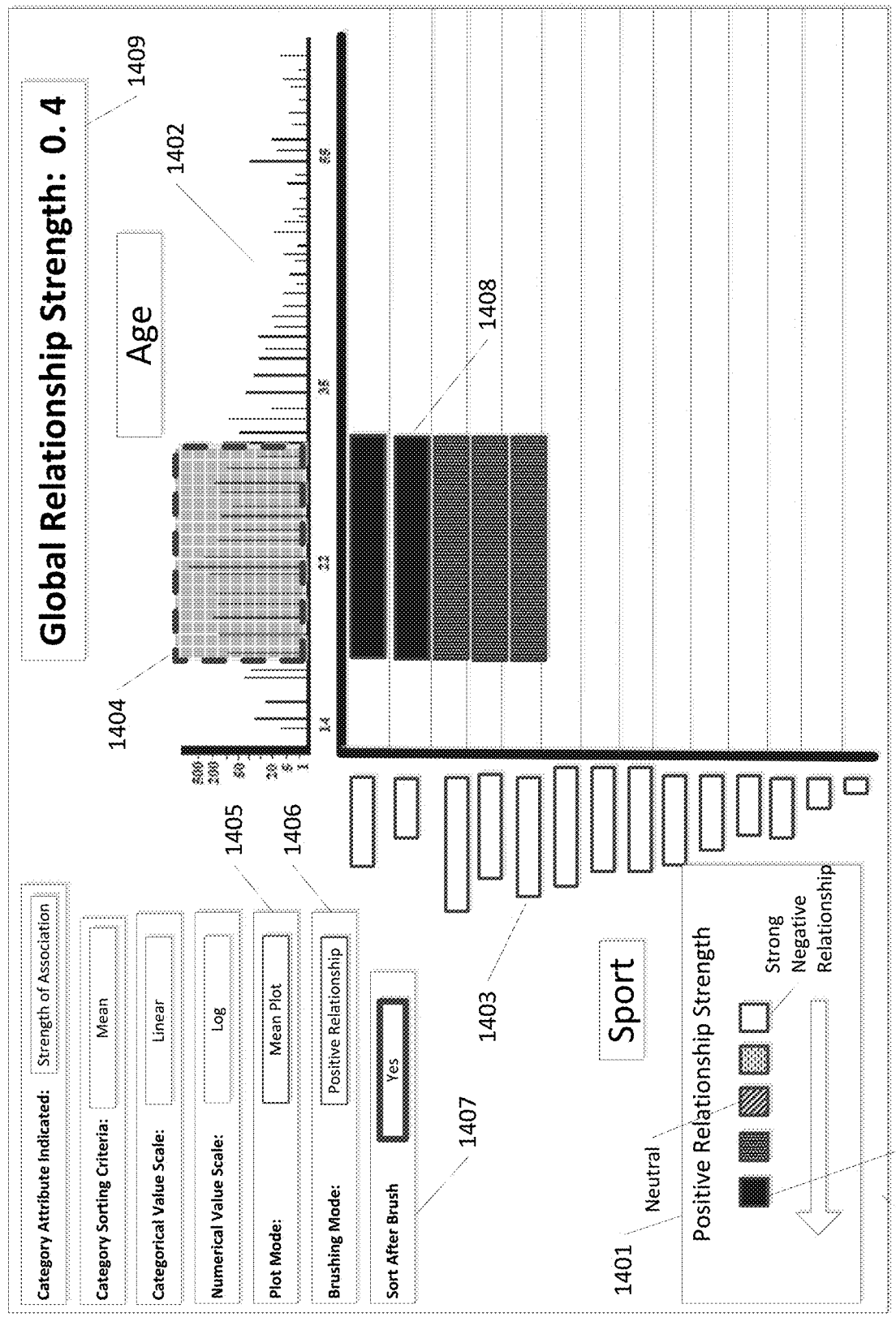

By contrast, FIG. 14B illustrates a categorical-numerical visualization interface 1400 in which the user has toggled the "Sort After Brush" setting 1407 to yes. As a result, the category indicators 1403 are sorted according to the corresponding relationships strengths of the one or more new categorical association indicators. For example, the category indicator corresponding to new categorical association indicator 1408 is in the second position, meaning that the relationship strength of the category corresponding that category indicator and the selected range of data values 1404 is the second strongest.

Figure 14C:
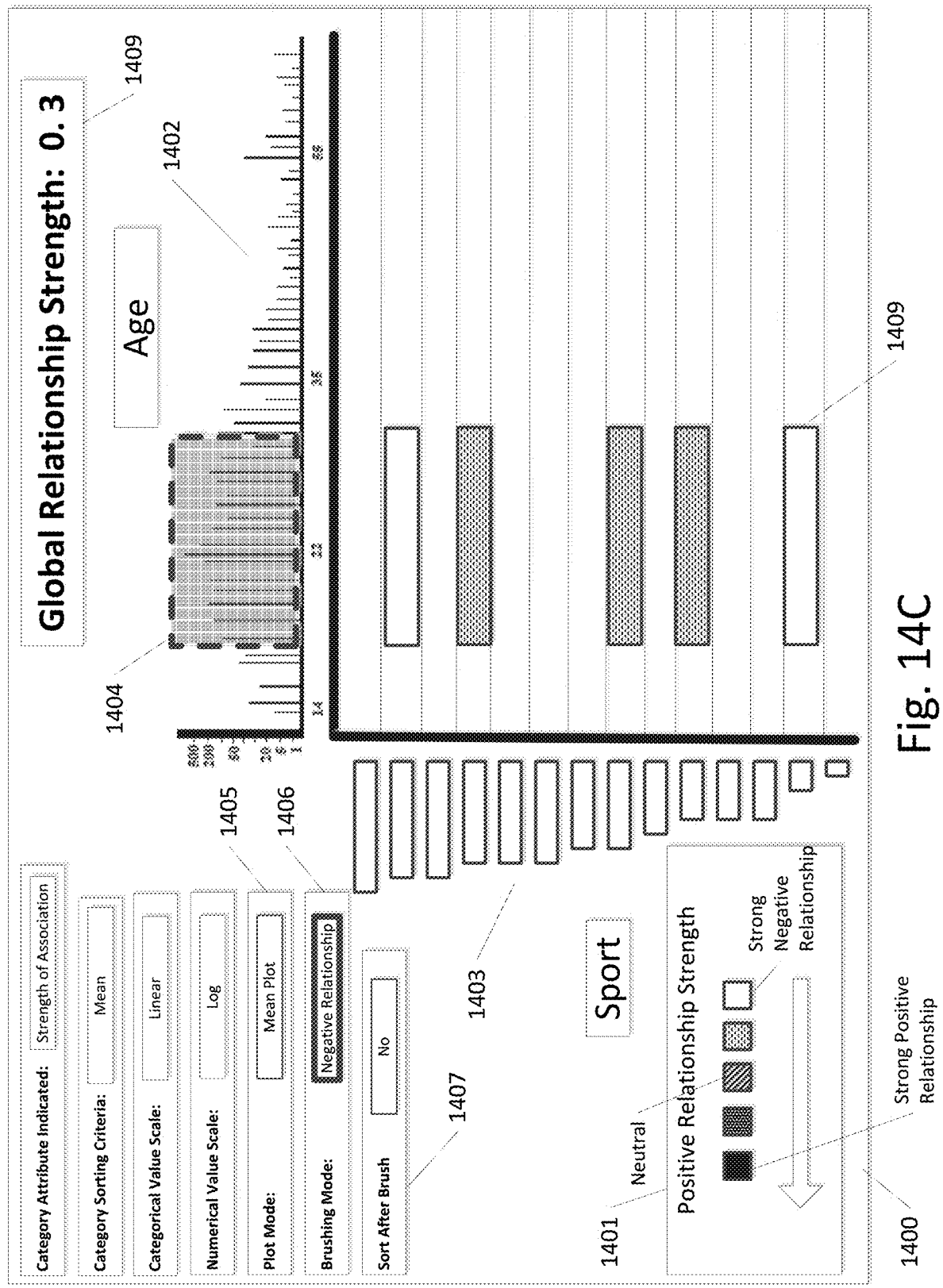

FIG. 14C illustrates a similar interface to FIG. 14A except that the user has selected the "Negative Relationship" brushing mode 1406 to show only negative relationship strengths. This results in one or more new categorical association indicators (such as new categorical association indicator 1409) for categories that have a negative relationship strength with the selected range of data values 1404. Additionally, the global relationship indicator 1409 has been updated to reflect the global negative relationship strength.

Figure 14D:
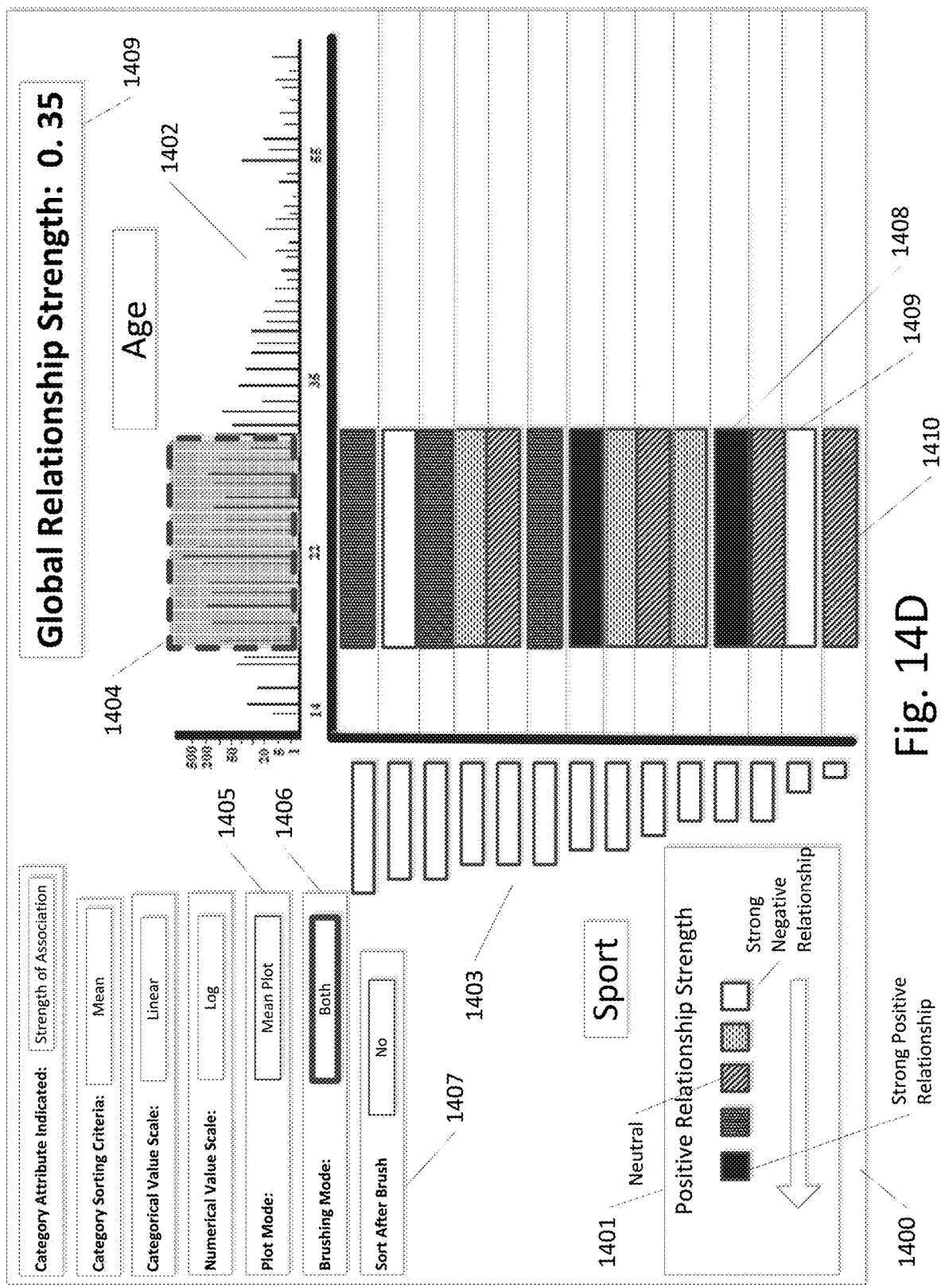

FIG. 14D illustrates a similar interface to FIGS. 14A and 14C except that the user has selected the "both" brushing mode 1406 to show both positive and negative relationship strengths. This results in one or more new categorical association indicators for all categories. Each of the one or more new categorical association indicators visually represents the relationship strength of the corresponding category with the selected range of data values 1404, as well as whether the relationship is positive or negative (or neutral). Additionally, the global relationship indicator 1409 has been updated to reflect the global relationship strength.

FIG. 15 illustrates a flowchart for updating the categorical-numerical visualization in response to a selection of a range of data values. At step 1501 a selection of a range of data values in the distribution of data values in the second (numerical) column is received via the interface. At step 1502 the one or more global statistical measures are optionally applied to the data in the first (categorical) column and data corresponding to the selected range of data values in the second (numerical) column to generate new global association data. At step 1503 the one or more categorical statistical measures are applied to the data in the first (categorical) column and data corresponding to the selected range of data values in the second (numerical) column to generate new categorical association data quantifying each relationship between each category in the first column and the selected range of data values in the second column. Step 1501-1503 are described above with respect to FIGS. 14A-14C.

At step 1504, which is optional, the one or more categorical statistical measures are applied to the data in the first (categorical) column and data corresponding to a plurality of subsets of the selected range of data values in the second (numerical) column to generate subset categorical association data quantifying each relationship between each category in the first column and each subset in the plurality of subsets of the selected range of data values in the second column. At step 1505 the visualization is updated with one or more of the new global association data, the new categorical association data, or the subset categorical association data.

With regard to step 1504, if the selected range was 5-55, then the plurality of subsets can include 5-10, 5-20, 5-25, 35-55, etc. The subset categorical association data can be calculated for each of the subsets in the plurality of subsets. Subsets can be dynamically generated while the user is performing the brush action and the one or more categorical statistical measures can be applied to the data in the categorical column and data corresponding to the dynamically generated subsets while the user is brushing/selecting the range of data values.

For example, when receiving, via the interface, a selection of a range of data values in the distribution of data values, the system can detect a user input beginning at a starting point in the distribution of data values, detect a continuation of the user input to a current position beyond the starting point in the distribution of data values, and set the range of data values for the current subset to be the range between each of the starting point and the current position. This can be repeated every time there is a continuation of input to generate multiple subsets. For example, if a user brushes a range from 5-25 (starting at 5), subsets can be calculated for 5-6, 5-7, 6-7, 5-8, 6-8, 7-8, etc. Subset categorical association data can also be dynamically calculated for these subsets and the categorical column.

In addition to calculating subset categorical association data for subsets of a selected range, the system can also automatically filter out subsets for which a relationship strength between a category in the first column and the subset of the range is below a minimum threshold (for positive relationships) or above a maximum threshold (for negative relationships). By filtering out subsets with a weak or non-existent relationship, the system can automatically identify subsets which have a strong (positive or negative) relationship, even if the selected range does not have a strong relationship.

Figure 16:
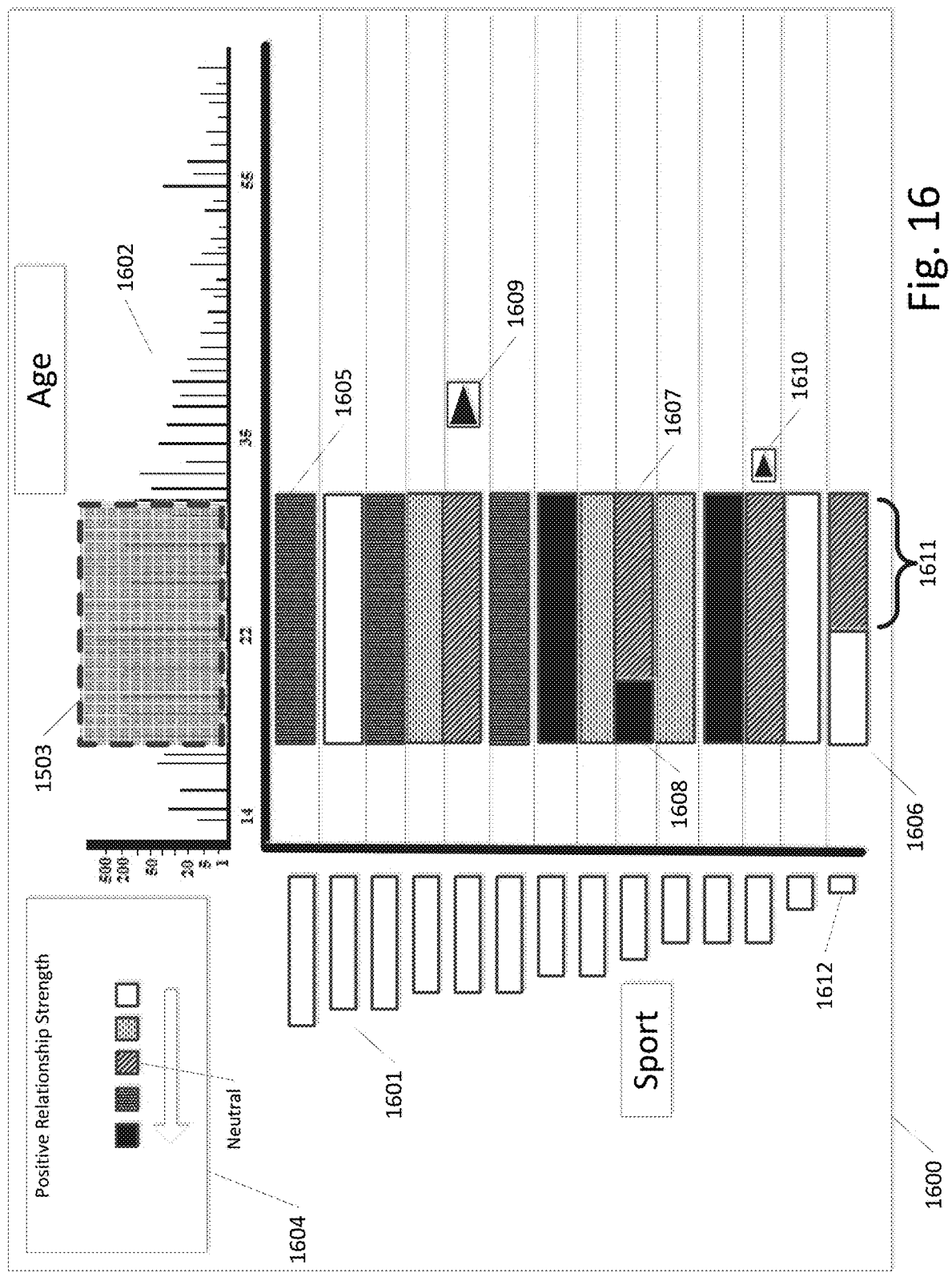
FIG. 16 illustrates an interface showing additional aspects of categorical-numerical visualizations according to an exemplary embodiment.

An example of this is shown in FIG. 16, which illustrates an interface 1600 of a categorical-numerical visualization having categorical indicators 1601 corresponding to categories of a categorical column, distribution 1602 corresponding to a distribution of data values in a numerical column, and key 1604 which indicates the strength of respective relationships.

As shown in FIG. 16, a user has selected range 1603 with a brushing action and this has resulted in the generation new categorical association indicators, such as 1605, which visually represent a relationship between a corresponding category in the plurality of categories in the categorical column and the selected range of data values 1603 in the numerical column. Not all of the categories of the categorical column have a strong relationship with the selected range 1603. For example, the category corresponding to categorical indicator 1612 has a weak relationship with the range of data values 1603, as shown by the neutral shading for a portion 1611 of the range of data values 1603.

However, as shown by new categorical association indicator 1606, the category corresponding to category indicator 1612 has a strong negative relationship with a subset of the range of data values 1603. Specifically, the category corresponding to category indicator 1612 has a strong negative relationship with the subset from the beginning of the range 1603 up to the start of interval 1611. By dynamically generating subsets of selected ranges and dynamically calculating categorical association data between categories of a categorical column and the generated subsets, the present interface makes it easy an intuitive for users to identify relationships between categorical and numerical data, even when they do not select the correct range of data values.

Interface 1600 also illustrates additional features of the categorical-numerical visualization. One or more remaining distribution indicators, such as remaining distribution indicators 1609 and 1610 can also be transmitted in the interface 1600 after a brushing action or selection of a range 1603 of data values. Each remaining distribution indicator in the one or more remaining distribution indicators corresponds to a category in the plurality of categories in the categorical column and visually represents an attribute of the distribution of data values in the numerical column for that category relative to the selected range of data values 1603 in the numerical column for that category.

For example, each remaining distribution indicator can visually represent a distance between a bound of the selected range of data values (such as the right bound of range 1503) and a bound of range of data values which includes a minimum percentage of all data values for that category. In other words, the remaining distribution indicator can indicate "how far" a user would have to brush beyond the brushed range to include a minimum percentage (which can be set by the user) of data values in the numerical column corresponding to that category. This allows a user to know if the sample size for a particular category is insufficient to form any conclusions and also lets them know where to define a range to obtain a more conclusive sample size.

Each remaining distribution indicator can also visually represent a quantity of data values for that category required to reach the minimum percentage. In other words, the remaining distribution indicator can also indicate "how much" data is missing and would be required to reach the minimum percentage.

Referring to FIG. 16, each of the remaining distribution indicators, 1609 and 1610, is a triangle. Each of the remaining distribution indicators 1609 and 1610 are positioned relative to the selected range of data values based on the distance between a bound of the selected range of data values 1603 and a bound of a range of data values which includes a minimum percentage of all data values for that category. For example, remaining distribution indicator 1609 is further from the range of data values 1603 than remaining distribution indicator 1610, meaning a user would have to brush further to the right to include a minimum percentage of all data values for the category corresponding to remaining distribution indicator 1609 relative to the category corresponding to remaining distribution indicator 1610.

Additionally, the height of the triangle in each of the remaining distribution indicators, 1609 and 1610, visually represents (such as by size, color, shape, or any other visual representation) the quantity of data values for that category required to reach the minimum percentage. For example, the quantity required to reach the minimum percentage for the category corresponding to remaining distribution indicator 1609 is greater than the quantity required to reach the minimum percentage for the category corresponding to remaining distribution indicator 1610, as the triangle in remaining distribution indicator 1609 is larger than the triangle in remaining distribution indicator 1610.

Figure 17A:
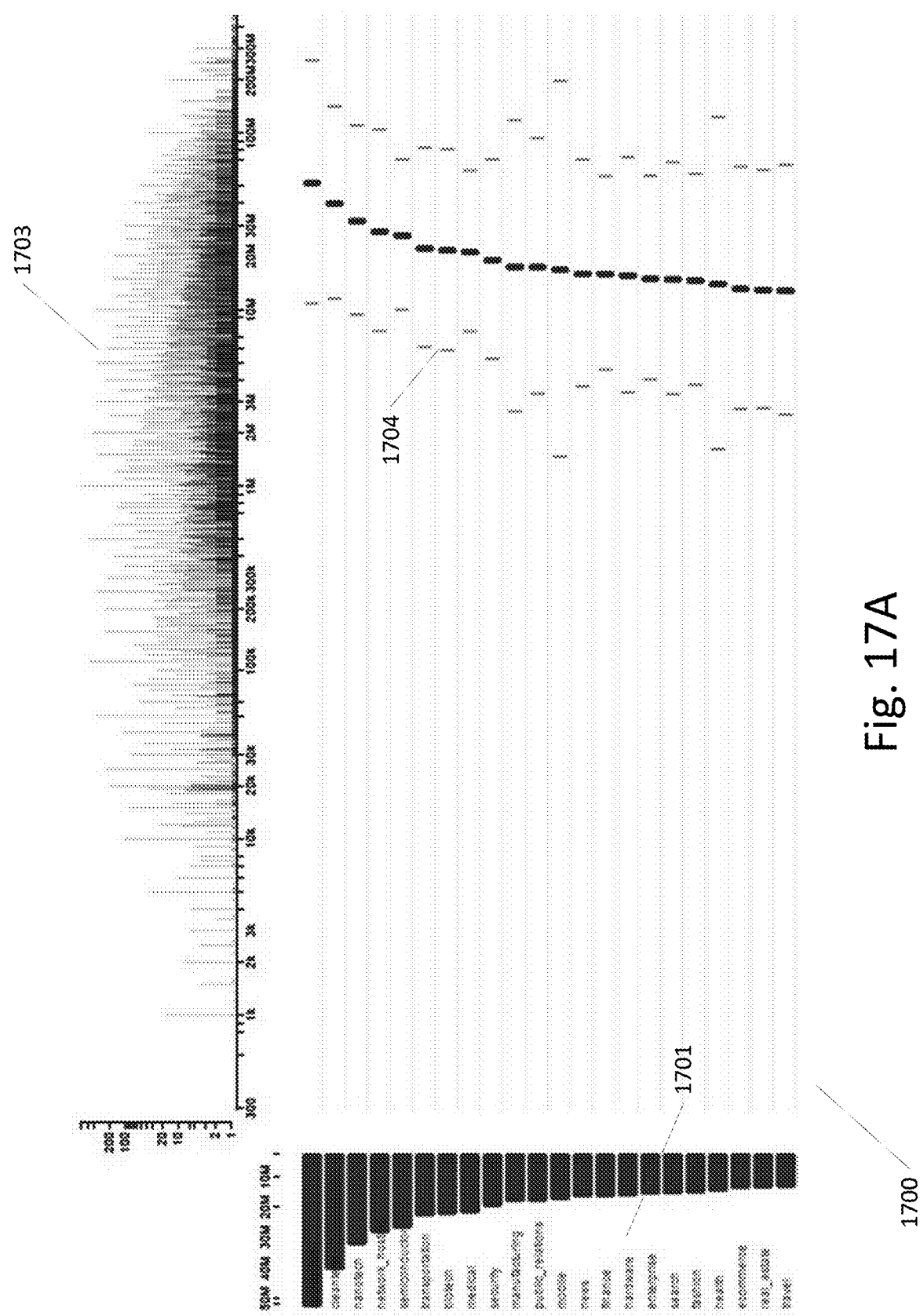
FIGS. 17A-17F illustrate another interface for visualizing categorical-numerical relationships according to an exemplary embodiment.

FIG. 17A illustrates the interface 1700 of another categorical-numerical visualization according to an exemplary embodiment. Interface 1700 includes a first axis with a plurality of category indicators 1701 corresponding to a column of industry categories and a second axis with a distribution of data values 1703 corresponding to a grant amounts for grants received. The distribution of data values 1703 plots the grant amounts against the quantity of grants. As shown in FIG. 17A, the mean plot mode has been selected, and mean plots, such as 1704, visually represent the mean grant amount for each industry category, as well as the standard deviation.

Figure 17B:
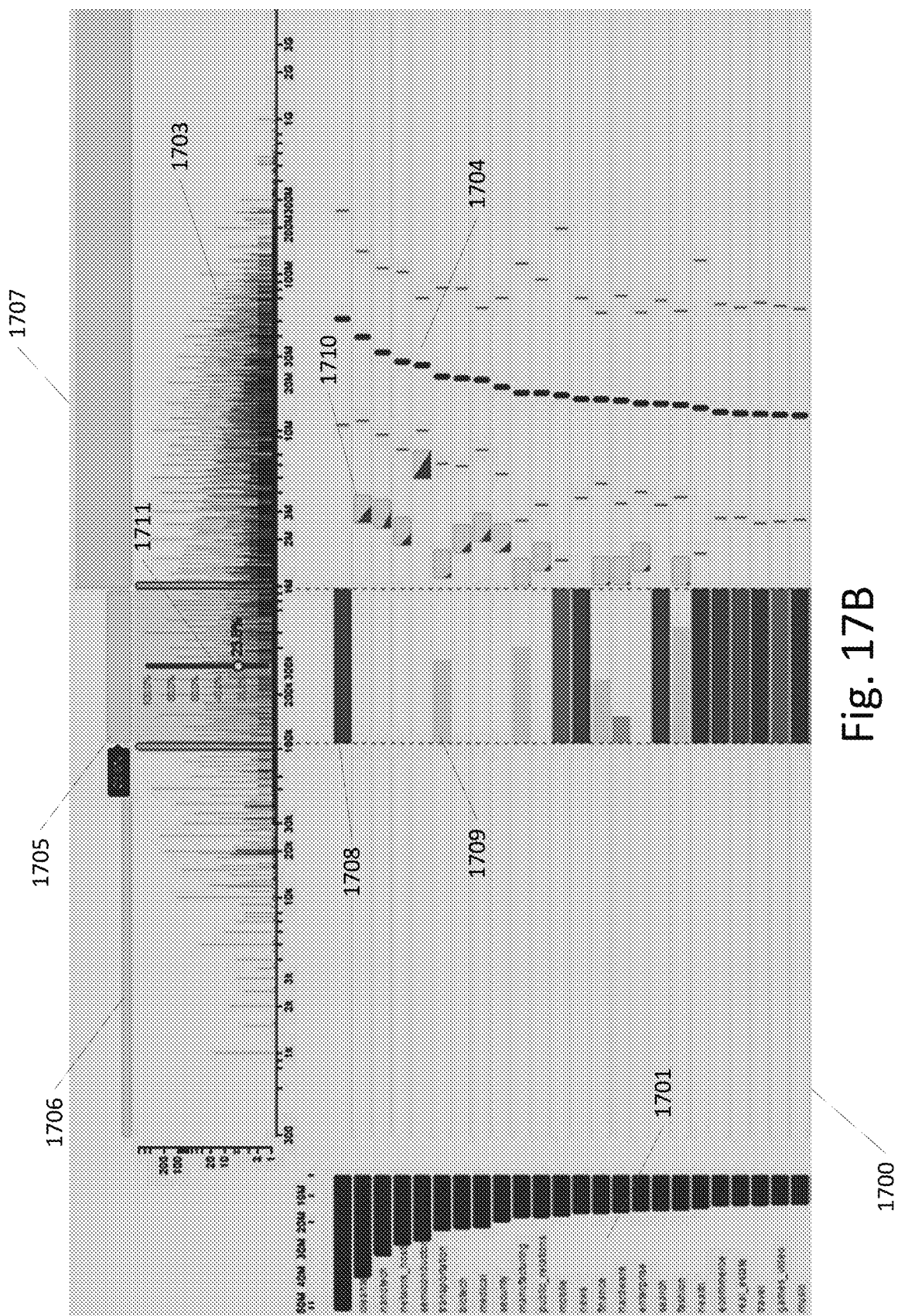

FIG. 17B is similar to FIG. 17A but shows the result of a user brushing a range of 1705 of the distribution of data values 1704 with brushing mode set to negative relationships only. As shown in FIG. 17B, this results in the visualization being updated with categorical association indicators corresponding to the brushed range, such as categorical association indicator 1708, as well as categorical association indicators corresponding to subsets of the brushed range, such as categorical association indicator 1709. This also results in the visualization being updated with remaining distribution indicators, such as remaining distribution indicator 1710. Another feature shown in FIG. 17B is that the visualization is updated with the percentage 1711 of the total distribution of data values 1704 that are contained within selected range 1705, which is 23.8%. The selection of a range also results in the partitioning of the total distribution of data values 1704 into three segments, 1706 (before the selected range), 1705 (the range), and 1707 (after the selected range). This allows the user to perform operations on any of the segments.

Figure 17C:
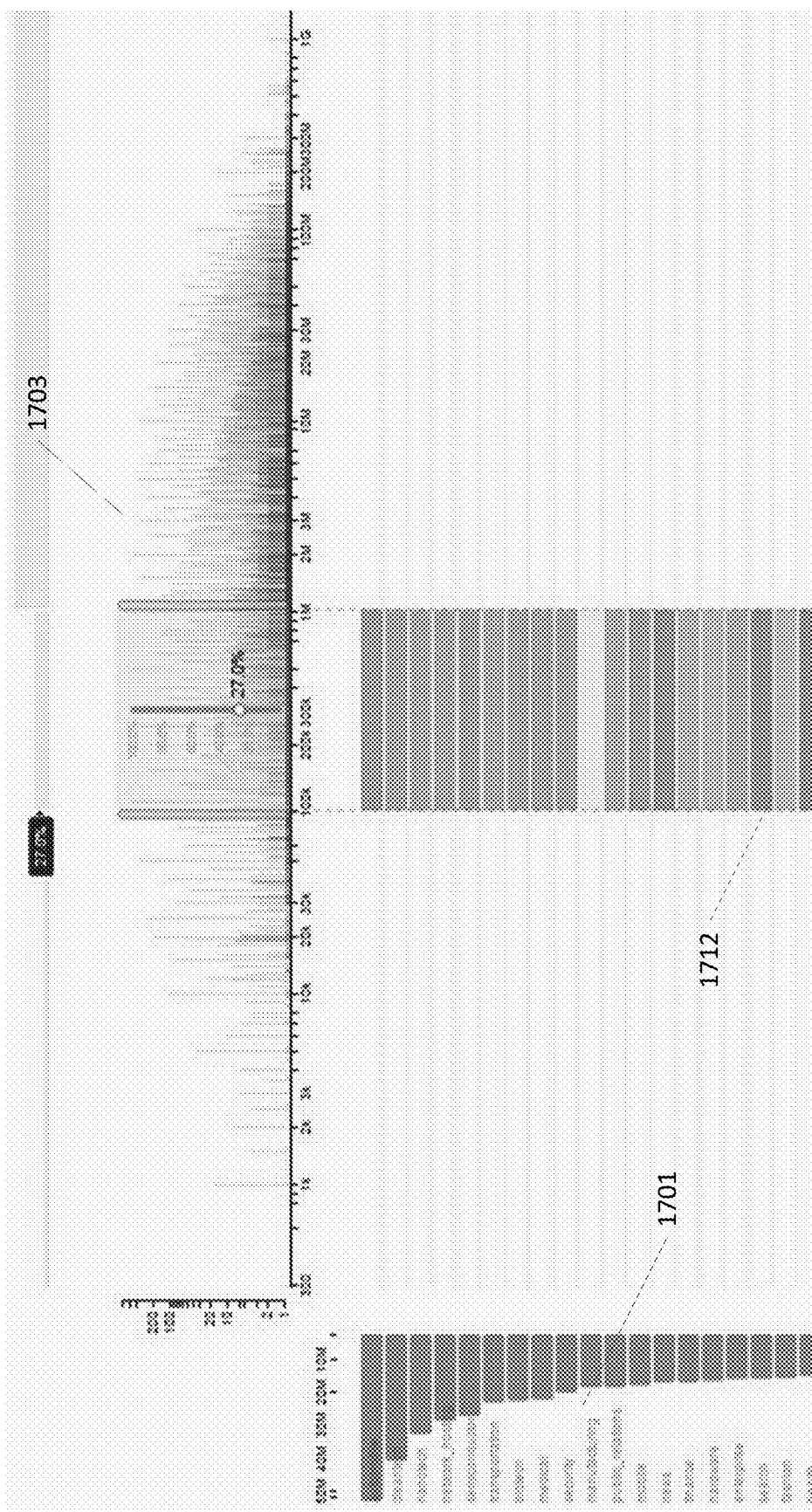

FIG. 17C is similar to FIG. 17A but shows the result of a user brushing a range of the distribution of data values 1704 with brushing mode set to both positive and negative relationships. This results in the visualization being updated with categorical association indicators corresponding to the brushed range, such as categorical association indicator 1712. As shown in FIG. 17C, the brushing action can optionally remove other plots (such as the mean plot) from the visualization. The user can toggle this option based on their preferences. Additionally, the user can select via some input or menu whether they would like to see categorical association indicators corresponding to subsets of the brushed range. In FIG. 17C this option has been disabled.

Figure 17D:
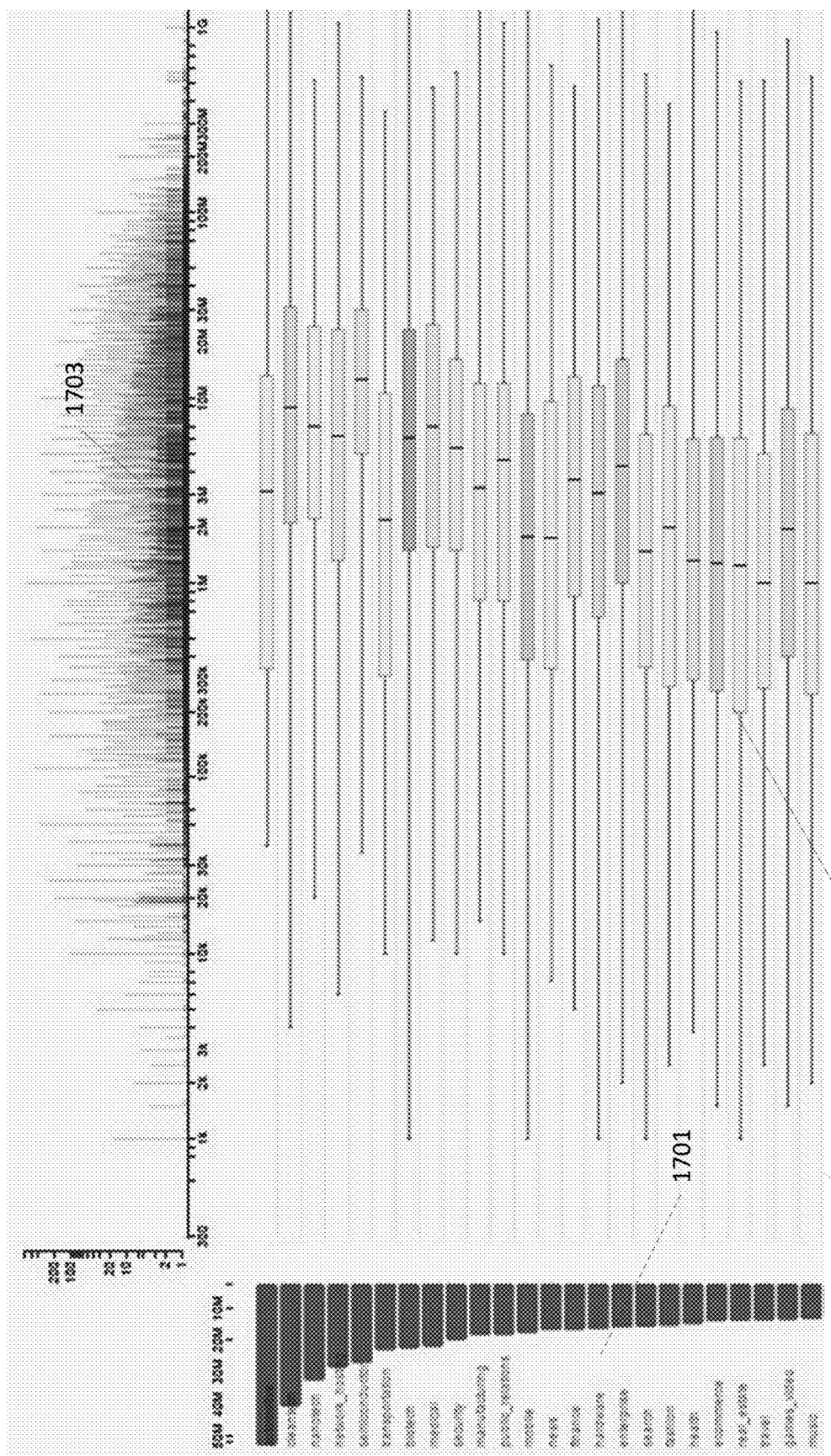

FIG. 17D is similar to FIG. 17A but shows the result of a user selecting the box-plot mode. This results in the visualization being updated with box plots, such as 1714, which visually represent the strength of association for the middle 50% of grant amounts for each industry category, as well as the $25^{th}$-$75^{th}$ percentiles.

Figure 17E:
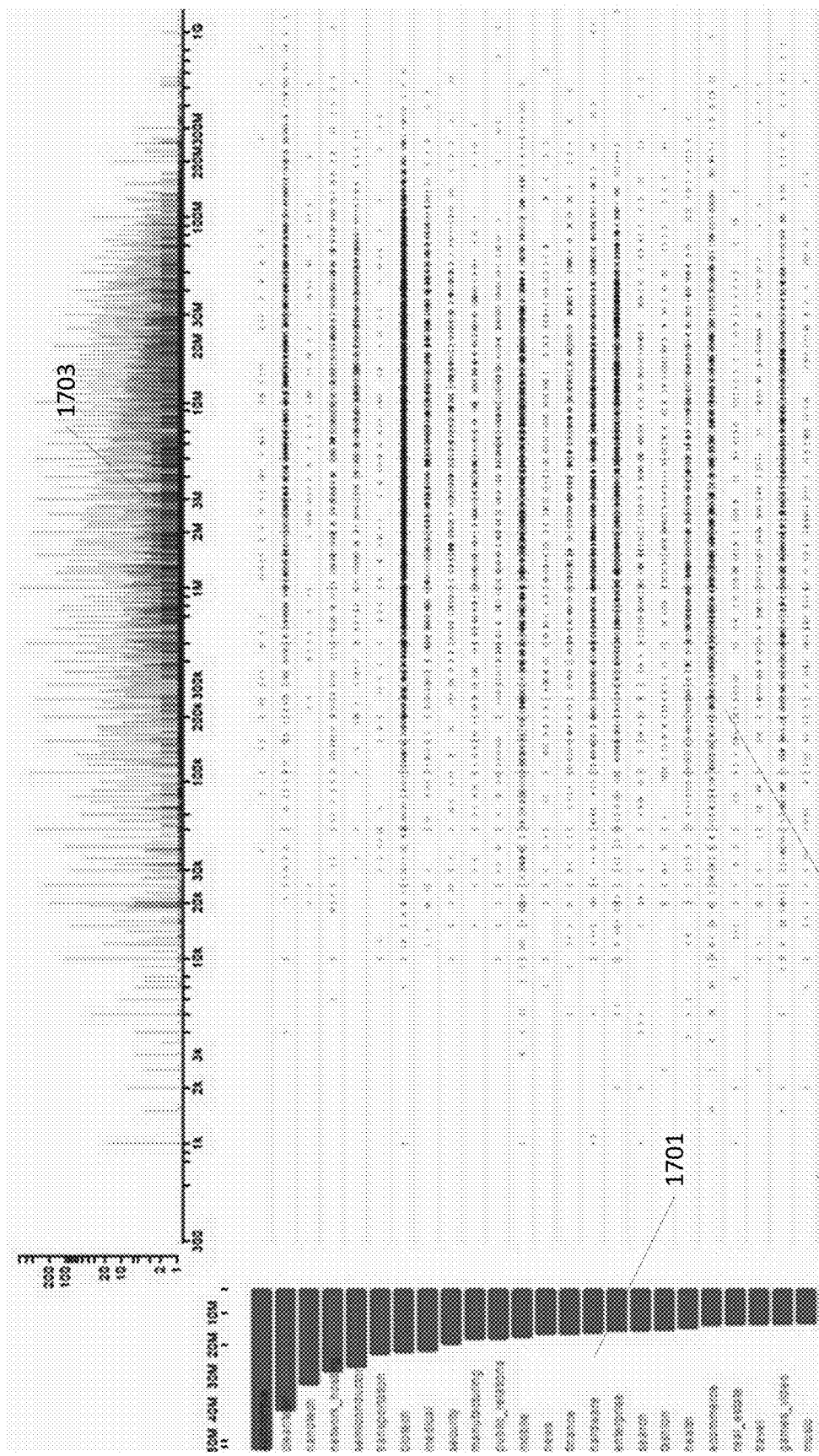

FIG. 17E is similar to FIG. 17A but shows the result of a user selecting the raw data value distributions mode. This results in the visualization being updated with raw data value distributions, such as 1715, which visually represent the distribution of grant amounts for each category of industry.

Figure 17F:
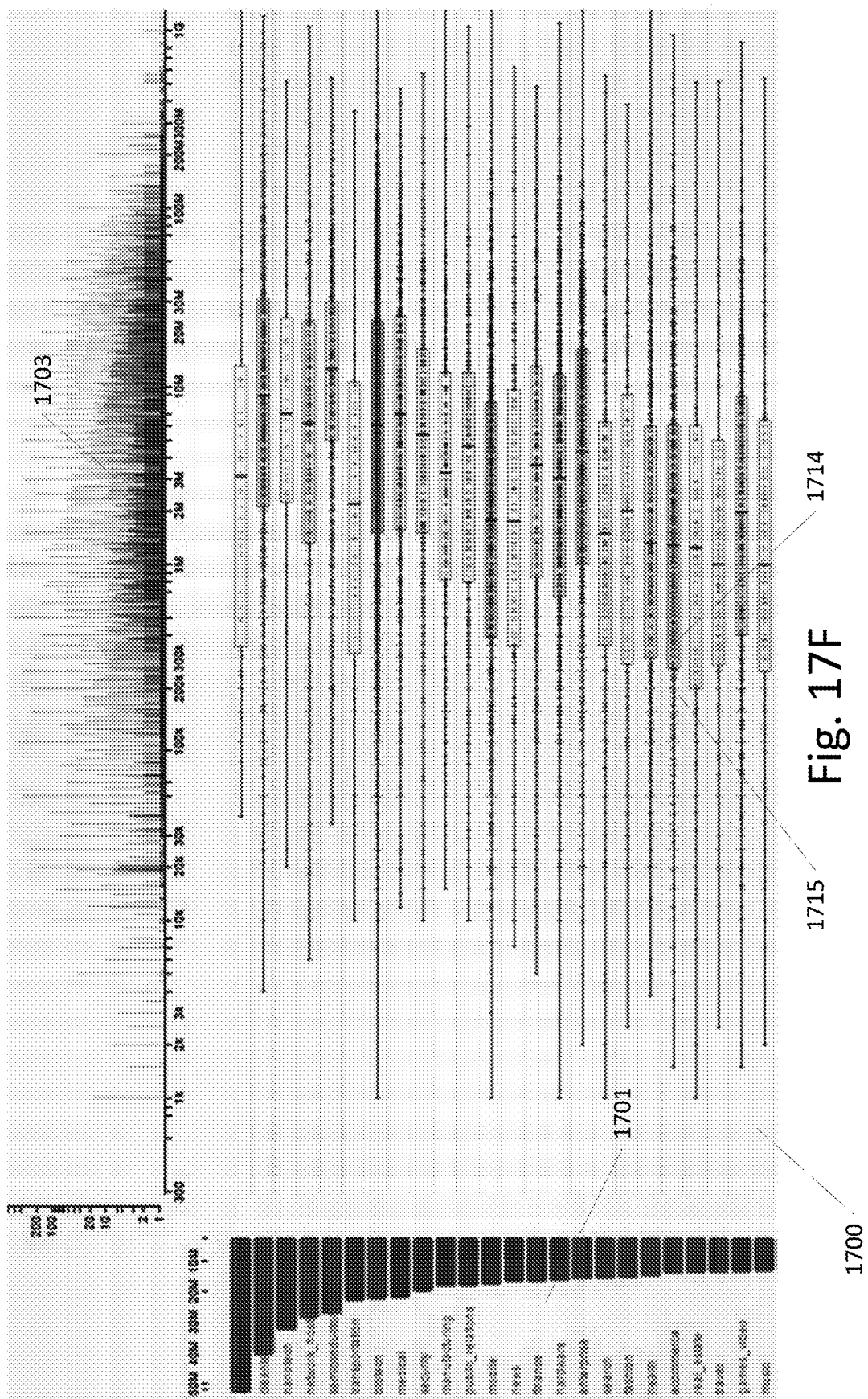

FIG. 17F is similar to FIG. 17A but shows the result of a user selecting a raw data value distributions+box plot mode. This results in the visualization being updated with raw data value distributions, such as 1715, which visually represent the distribution of grant amounts for each category of industry as well as box plots, such as 1714, which visually represent the strength of association for the middle 50% of grant amounts for each industry category, as well as the $25^{th}$-$75^{th}$ percentiles. As shown in FIG. 17F, the two categorical distribution indicators (raw data and box plot) are overlaid on each other for each category.

Figure 18A:
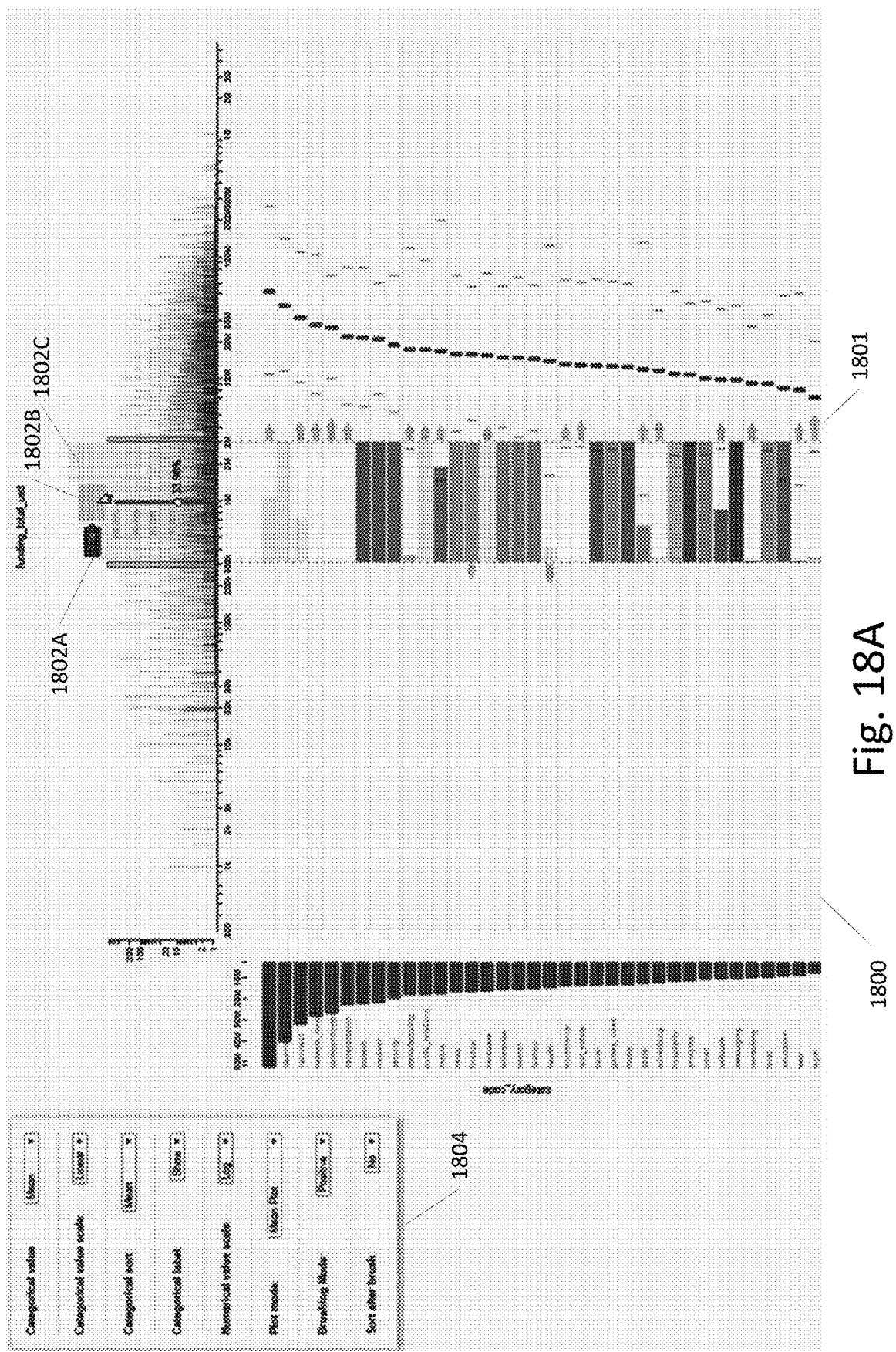
FIGS. 18A-18D illustrate another interface for visualizing categorical-numerical relationships and range selection according to an exemplary embodiment.

FIG. 18A illustrates another interface 1800 of a categorical-numerical distribution according to an exemplary embodiment. FIG. 18A includes an options menu 1804, and shows the result of a user brush of a range. As shown in in FIG. 18A, the distribution of data values is separated into three segments corresponding to data values before the range, data values in the range, and data values after the range. The percentage of data values in each of these segments is represented by the size of segment indicators 1802A, 1802B, and 1802C. The user can select each of these segment indicators for additional information and/or operations regarding each of the segments. Additionally, as shown in FIG. 18A, the visualization includes remaining distribution indicators, such as remaining distribution indicator 1801. The remaining distribution indicators in FIG. 18A take the form of arrows, with the length and direction of the arrow visually representing a distance and direction between a bound of the selected range of data values and a bound of a range of data values which includes a minimum percentage of all data values for that category.

Figure 18B:
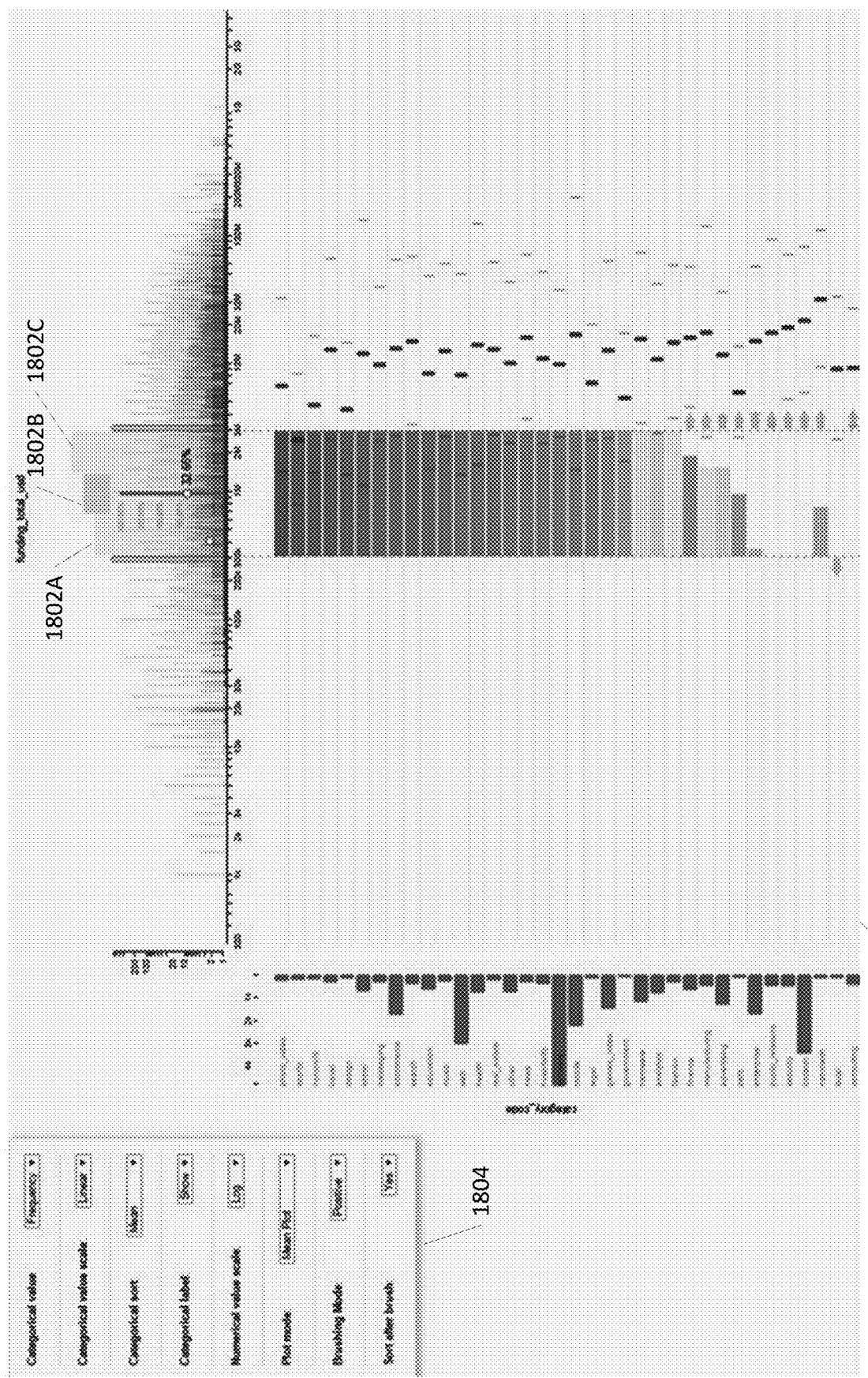

FIG. 18B is similar to FIG. 18A but shows the result of the user selection of category frequency as the categorical value indicated by category indicators rather than strength of association.

Figure 18C:
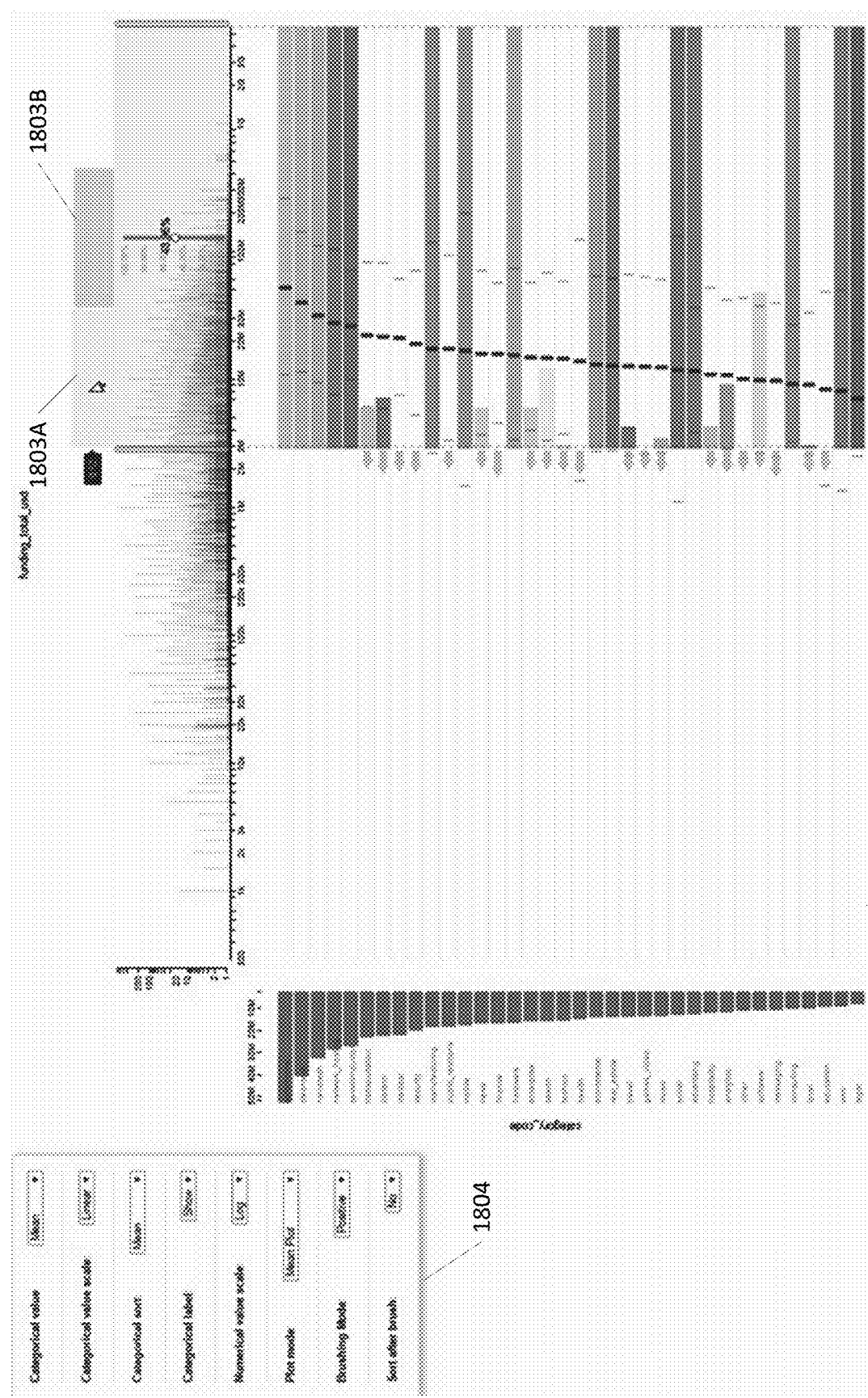

FIG. 18C is similar to FIG. 18A but shows the result of the user brushing a range from 3M onwards. This results in distribution of data values being separated into two segments corresponding to data values before the range and data values in the range. The percentage of data values in each of these segments is represented by the size of segment indicators 1803A, 1803B. The user can select each of these segment indicators for additional information and/or operations regarding each of the segments.

Figure 18D:
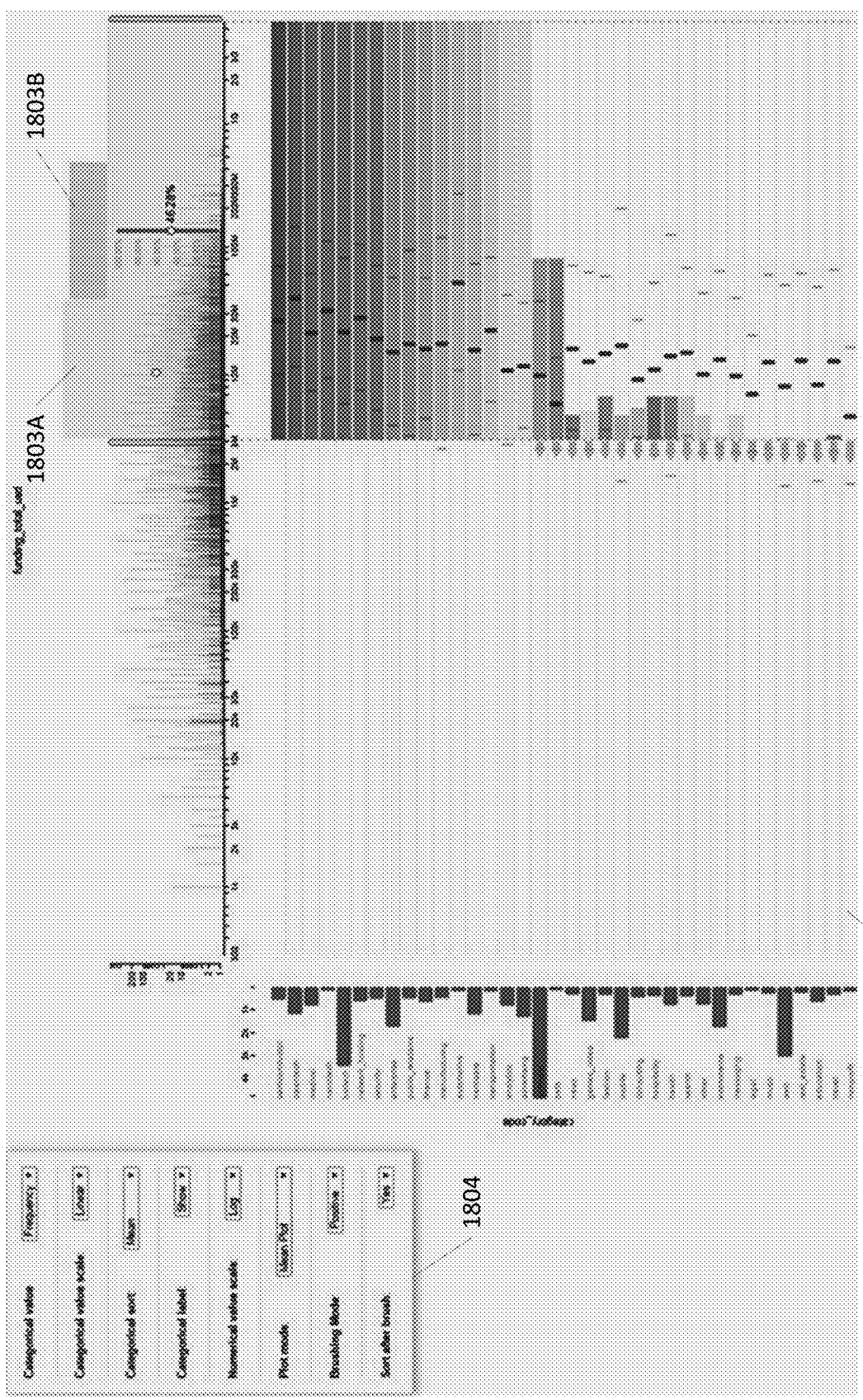

FIG. 18D is similar to FIG. 18C but shows the result of the user selection of category frequency as the categorical value indicated by category indicators rather than strength of association.

Figure 19A:
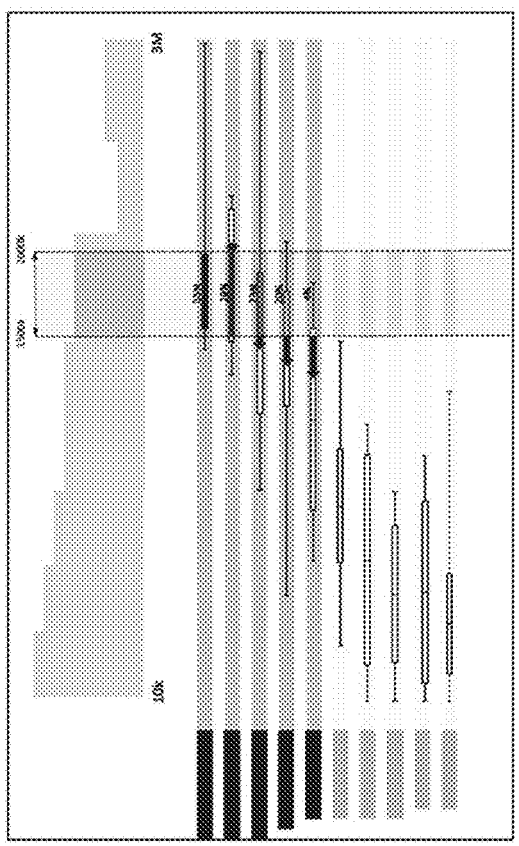
FIGS. 19A-19B illustrate an advanced sort and filter via a selection box according to an exemplary embodiment.
Figure 19B:
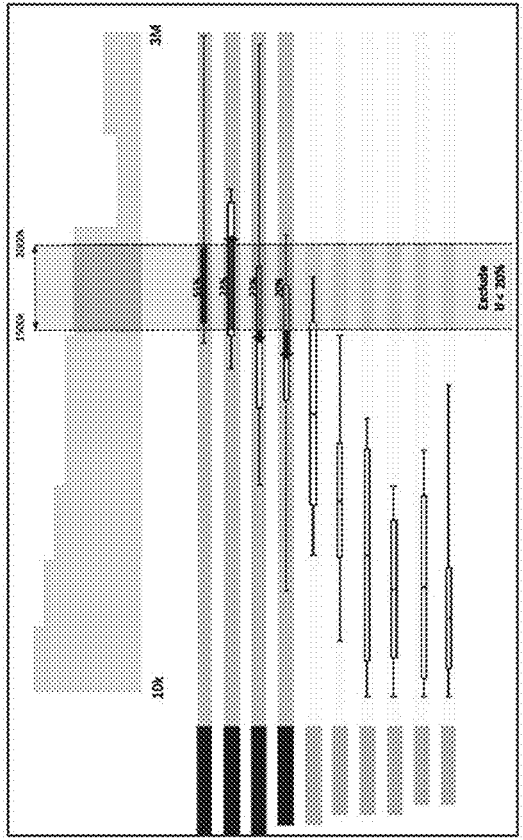

FIGS. 19A-19B illustrates additional interactive features of the categorical-numerical visualization according to an exemplary embodiment. These features, referred to as advanced sort and filter via a selection box, allow a business to select a range of interest over the global distribution of values in B and then accomplish one or more of the following goals.

A first goal is to inspect what categories are distributed differently from expectations (i.e., based on the global distribution) within the specified range of interest. E.g., what products sold more or less than expected in a given price range or in the top half of the price range?

A second goal is to inspect a known category in the categorical column (e.g., a known product name, in the list of products in the categorical column), which leads the user to select a range of interest, which then is used to compare how the other categories relate to this range of interest.

In response to the user selection of a range of interest of the numerical column, the system shows a vertical rectangle or selection box that includes the following information:

a. The expected percentage for the interval selected in the total distribution of the numerical column. See percentage value for the selected range, shown as overlaid at the center of the range, next to the slider in the top distribution in FIGS. 19A-19B.

b. How much each category-specific distributions loads within the range of interest. The color-coded overlapping area (rectangle or cell) between the category-specific distributions (row) falls in this selected range (column) shows if each category-specific distributions loads more or less than the expected percentage (see above). For example, FIGS. 19A-19B show two implementations where a color gradient is used to show if the categories load more than expected within the range of interest (see expected percentage above): the more than expected the percentage, the more bold the color of the overlapping area (rectangle or cell).

c. If the category-specific distribution stands out in relation to the expectations only for a portion of the range of interest. In these cases, in addition to learning via the color-coding how far each category is from the expected percentage in that total range, the user can also discover the cases where discrepancy from the expected percentage can be localized to a specific sub-range. By clicking on the sub-range upper limit the user can set it as the upper limit of the selected range box. For example, FIGS. 19A-19B show an implementation where some of the red or orange bars extend for only part of the selected range, while they all start from the left. They show that these categories over-perform above expectation only in that range.

d. If the remaining portion of the category-specific distribution is mainly on the left or the right of the selected range of interest. Horizontal arrows adjacent to the lower or upper limits show on what side falls more than half of the remaining category-specific distribution, after excluding the range of interest. Locally to the category-specific distribution (row), the arrow points to direction where to go to find most of the rest of the distribution, and thus reach the expected value. By clicking on the arrow the user can adjust the selected range box to reach the expected value. For example, 19A-19B show the implementation where horizontal gray arrows are shown only for category-specific distribution that load less than expected in the range of interest.

Finally, the above-mentioned vertical rectangle allows the user to:

a. Sort the categories of the categorical column based on how much they load on the range of interest: e.g., from the highest percentage to the lowest percentage within the range of interest, as shown in FIGS. 19A-19B.

b. Filter the categories of the categorical column based on how much they load on the range of interest. In this case the user enters a cutoff value for the required percentage within the range of interest, as shown in FIGS. 19A-19B.

FIGS. 19A-19B illustrate the following operations:

The user draws the filter as a green rectangle (range) on the distribution at the top, between 500 k and 2000 k.

The system shows as selected only the categories that have 20% or more of their values in this range.

The system shows with arrows where most of the rest of the values are located for each of the categories selected: the size of the arrow is proportional to the proportion of distribution left out.

By right-clicking on the rectangle, the user specifies the exclusion criterion: exclude categories with less than 20% of their values in this range.

As a result, the system excludes the category that has 4% of its values in this range.

Figure 20A:
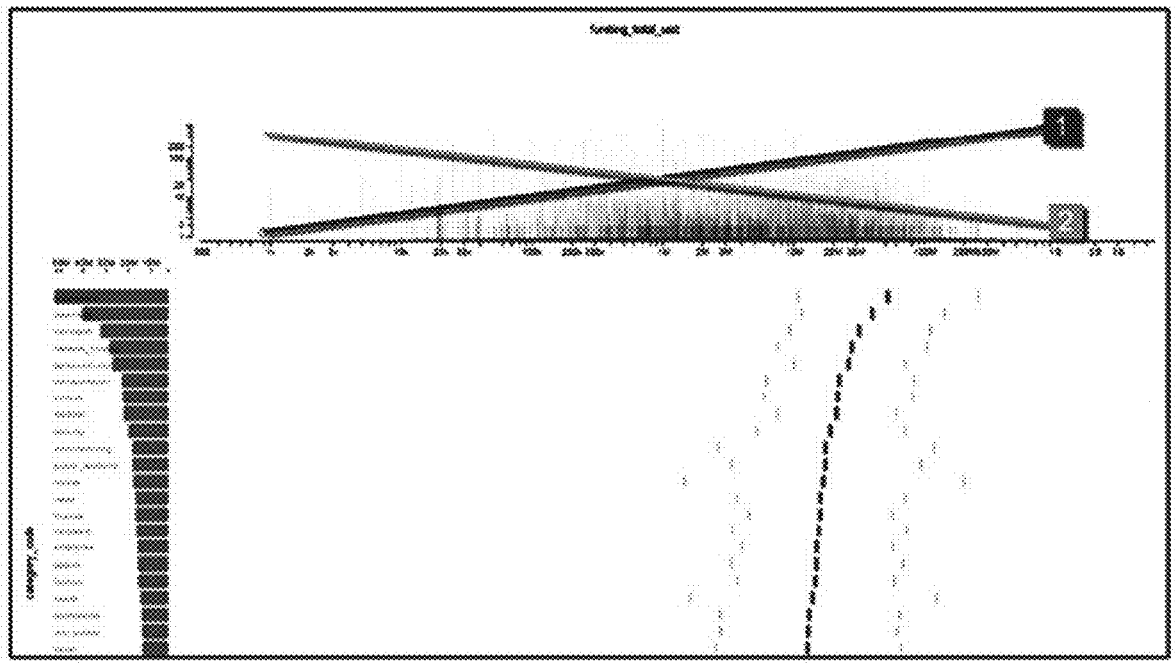
FIGS. 20A-20B illustrate trend drawing according to an exemplary embodiment.
Figure 20B:
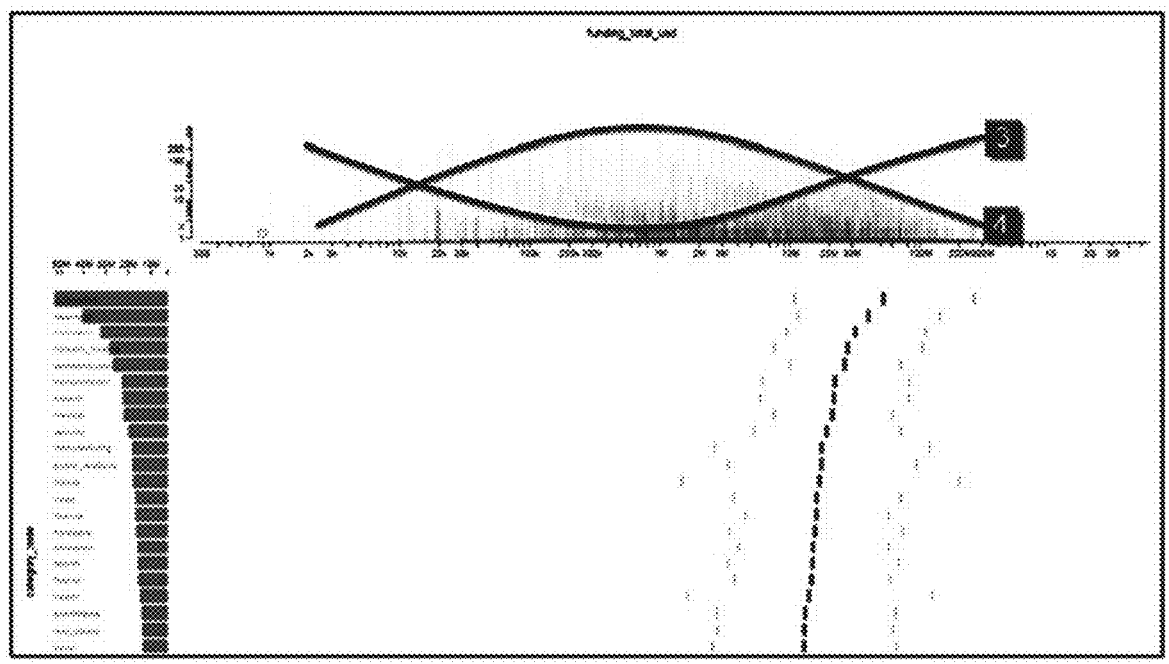

FIGS. 20A-20B illustrate additional features of the categorical-numerical visualization, referred to as advanced sort and filter via trend-drawing gestures. As shown in FIGS. 20A-20B, a user can sort and filter categories within the categorical columns by drawing trends on the distribution of values in the numerical column or within a selected range of values in the numerical column. These include linear trends, such as the ones shown in FIG. 20A and polynomial trends, such as the ones shown in FIG. 20B.

The system pre-computes best fit lines and trend-variability values. The system fits each of the allowed trends to the global distribution (frequency data over the numerical column (B)) and each of the category-specific distributions.

For each distribution, the best fit line function and a fit value are obtained. Standard regression analysis methods are used to find best fit lines. For example, for the linear trends in FIG. 20A, if we represent the data of each distribution in a scatterplot B (X) by frequency value (Y), the best fit lines are found by minimizing the sum of the squares of the vertical distances between the data points and the linear regression line.

The trend-variability values are a series of values computed for each of the existing B values. For example: a reference table that given any observed value in B, provides the corresponding sum of squares of vertical distances the between best fit lines the category-specific distributions.

The user indicates a trend of interest:

By drawing it over the global distribution over B or within a selected range of B.

By selecting a known category in the categorical column (A), which allows the system to derive best fit lines for that category-specific distribution (see next step).

In response, the system computes line-to-gesture distances and shows the closest known trends (i.e., best fit lines), as overlays on the distribution (FIGS. 20A-20B) for the user to choose by clicking on them.

The system shows at least 1 best fit line. The line with the closest line-to-gesture distance: e.g., the smallest sum of squares of vertical distances for a sample of points within the gesture.

The number of alternatives depends on:

The line-to-gesture distance for each line relevant for that range.

The average trend-variability for the range of B covered by the user gesture.

The user chooses a known trend (i.e., best fit line) among those shown. Alternatively, the user can draw a different trend and restart the process.

In response, the system:

Sorts the categories of A based on the pre-computed fit values for the best fit line chosen.

Upon demand, the system can also filter the categories in A that do not match the trend based on a threshold that depends on the average trend-variability for the range of B covered by the user gesture.

Variants of this method include: combining the use of trend+range, a tolerance slider, and/or choosing a category in A to trigger alternative trends.

Figure 21:
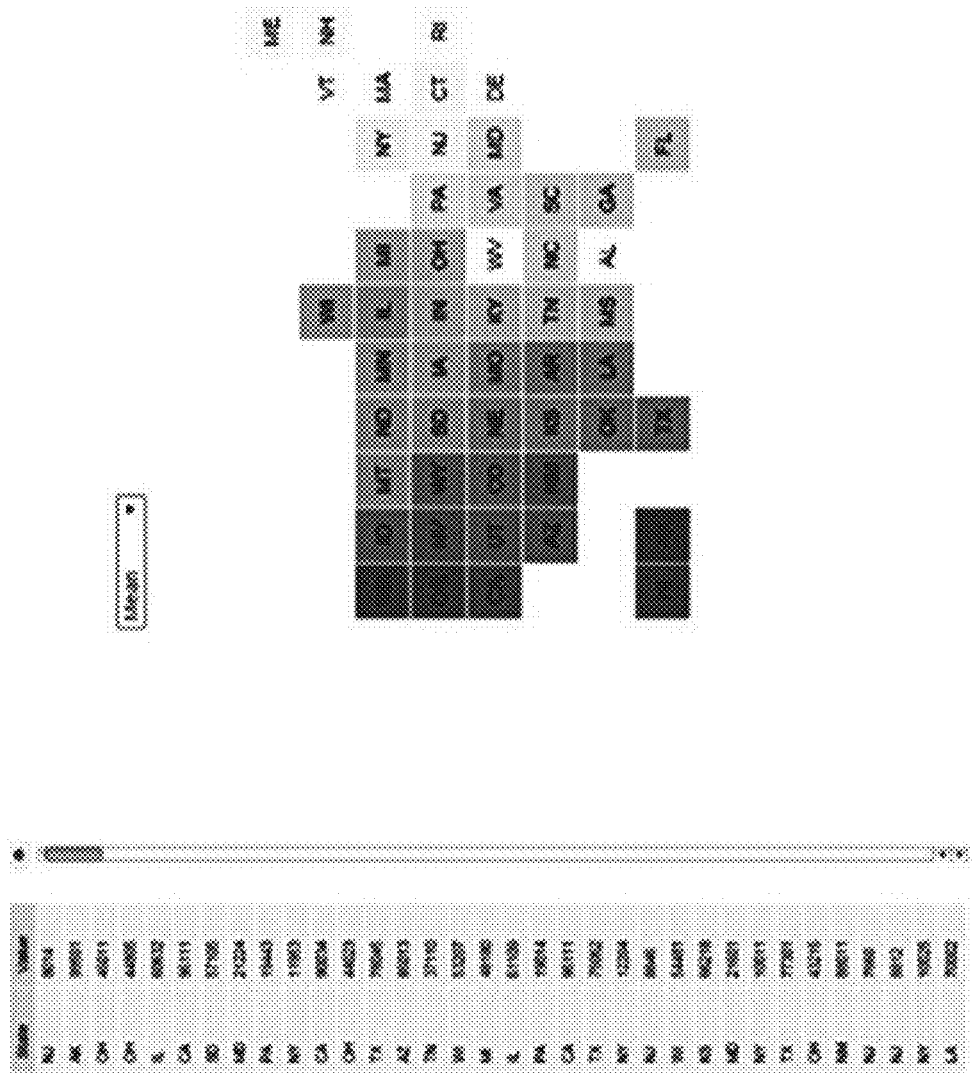
FIG. 21 illustrates a categorical-numerical visualization with geographic categories according to an exemplary embodiment.
Figure 22:
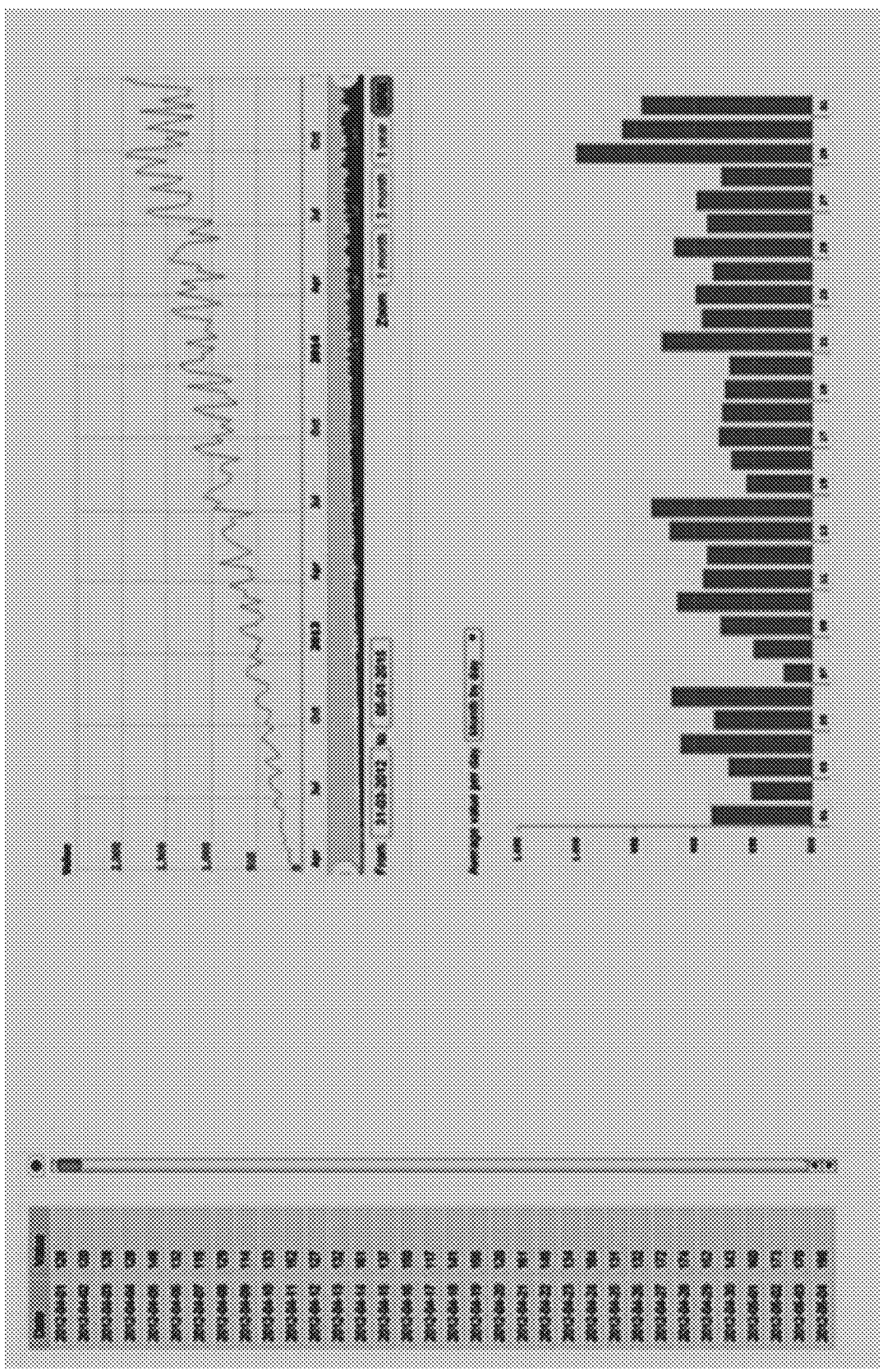
FIG. 22 illustrates a categorical-numerical visualization where the categorical column contains an ordinal column of time data according to an exemplary embodiment.

In addition to the categorical-numerical visualization disclosed above, the present system can also generate type-specific visualizations for categorical-numerical relationships. For example, FIG. 21 illustrates a categorical-numerical visualization where the categorical column contains geographic categories (categorical column) and FIG. 22 illustrates a categorical-numerical visualization where the categorical column contains an ordinal column, such as time data.

Figure 23:
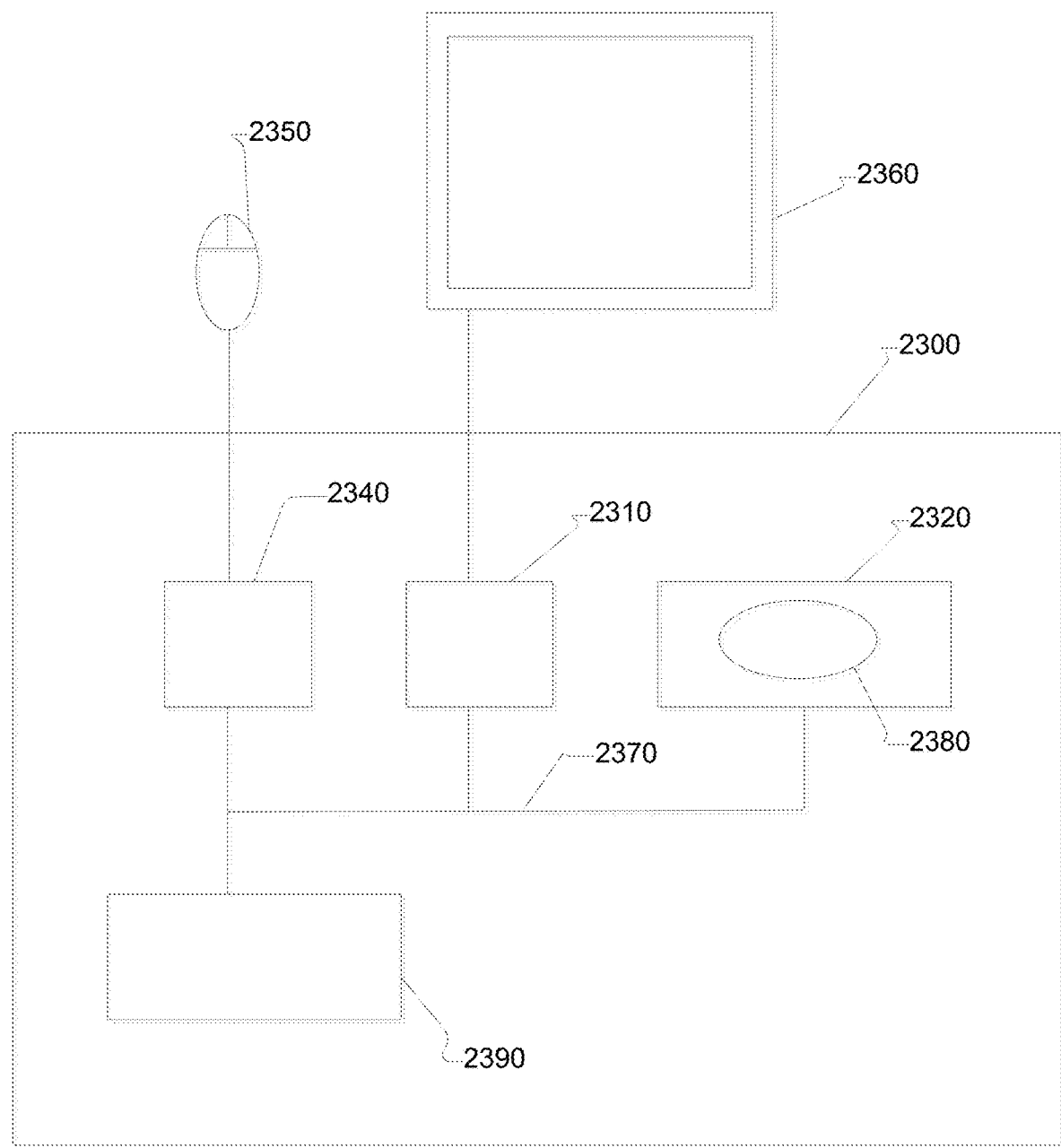
FIG. 23 illustrates an exemplary computing environment that can be used to carry out the method for visualizing relationships between pairs of columns according to an exemplary embodiment.

One or more of the above-described techniques and interfaces can be implemented in or involve one or more computer systems. FIG. 23 illustrates a generalized example of a computing environment 2300. The computing environment 2300 is not intended to suggest any limitation as to scope of use or functionality of a described embodiment.

With reference to FIG. 23, the computing environment 2300 includes at least one processing unit 2310 and memory 2320. The processing unit 2310 executes computer-executable instructions and may be a real or a virtual processor. In a multi-processing system, multiple processing units execute computer-executable instructions to increase processing power. The memory 2320 may be volatile memory (e.g., registers, cache, RAM), non-volatile memory (e.g., ROM, EEPROM, flash memory, etc.), or some combination of the two. The memory 2320 may store software instructions 2380 for implementing the described techniques when executed by one or more processors. Memory 2320 can be one memory device or multiple memory devices.

A computing environment may have additional features. For example, the computing environment 2300 includes storage 2340, one or more input devices 2350, one or more output devices 2360, and one or more communication connections 2390. An interconnection mechanism 2370, such as a bus, controller, or network interconnects the components of the computing environment 2300. Typically, operating system software or firmware (not shown) provides an operating environment for other software executing in the computing environment 2300, and coordinates activities of the components of the computing environment 2300.

The storage 2340 may be removable or non-removable, and includes magnetic disks, magnetic tapes or cassettes, CD-ROMs, CD-RWs, DVDs, or any other medium which can be used to store information and which can be accessed within the computing environment 2300. The storage 2340 may store instructions for the software 2380.

The input device(s) 2350 may be a touch input device such as a keyboard, mouse, pen, trackball, touch screen, or game controller, a voice input device, a scanning device, a digital camera, remote control, or another device that provides input to the computing environment 2300. The output device(s) 2360 may be a display, television, monitor, printer, speaker, or another device that provides output from the computing environment 2300.

The communication connection(s) 2390 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 2300, computer-readable media include memory 2320, storage 2340, communication media, and combinations of any of the above.

Of course, FIG. 23 illustrates computing environment 2300, display device 2360, and input device 2350 as separate devices for ease of identification only. Computing environment 2300, display device 2360, and input device 2350 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 2300 may be a set-top box, mobile device, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the disclosure and equivalents thereto.

What is claimed is:

1. A method executed by one or more computing devices for generating a categorical column relationship visualization interface, the method comprising:

identifying, by at least one of the one or more computing devices, a relationship classification corresponding to two columns in a plurality of columns based on a data type of each column in the two columns, wherein a first column of the two columns comprises a categorical column and wherein the relationship classification comprises either a categorical-categorical classification or a categorical-numerical classification;

applying, by at least one of the one or more computing devices, one or more statistical measures to data in the two columns to generate association data quantifying a plurality of relationships between categories in the first column and data values in a second column of the two columns, wherein the one or more statistical measures are determined based at least in part on the relationship classification; and generating, by at least one of the one or more computing devices, a visualization of the plurality of relationships by transforming the data in the two columns and the association data into a spatial arrangement of user interface elements based on the relationship classification, the visualization comprising:

a plurality of first indicators corresponding to a plurality of categories in the first column, each first indicator corresponding to a category in the plurality of categories and comprising a non-textual indicator that graphically represents an attribute of the corresponding category;

a plurality of second indicators corresponding to a plurality of values in the second column, each second indicator corresponding to a value in the plurality of values and comprising a non-textual indicator that graphically represents an attribute of the corresponding value; and a plurality of third indicators corresponding to the plurality of relationships, each third indicator corresponding to a category in the plurality of categories and one or more values in the plurality of values and indicating a strength of relationship between the corresponding category in the first column and the corresponding one or more values in the second column.

2. The method of claim 1, wherein the categorical data comprises one or more of nominal data and ordinal data.

3. The method of claim 1, further comprising:
receiving, by at least one of the one or more computing devices, a selection of two column identifiers corresponding to the two columns in the plurality of columns prior to identifying the relationship classification for the two columns of data.

4. The method of claim 1, further comprising:
determining, by at least one of the one or more computing devices, a plurality of relationship classifications corresponding to a plurality of pairs of columns in the plurality of columns based on the data type of each column in each pair of columns, wherein each column in the plurality of columns has a corresponding relationship count;

for each pair of columns in the plurality of pairs of columns:
applying, by at least one of the one or more computing devices, one or more global statistical measures to data in the pair of columns to determine whether a significant relationship exists between data values in a first column of the pair of columns and data values in a second column of the pair of columns, wherein the one or more global statistical measures are determined based at least in part on the relationship classification; and
incrementing, by at least one of the one or more computing devices, the relationship count corresponding to each column in the pair of columns based at least in part on a determination that a significant relationship exists between data values in the first column of the pair of columns and data values in the second column of the pair of columns; and transmitting, by at least one of the one or more computing devices, a plurality of relationship indicators corresponding to the plurality of columns, wherein each relationship indicator corresponds to a column in the plurality of columns and indicates the relationship count of that column.

5. The method of claim 4, wherein applying one or more global statistical measures to data in the pair of columns to determine whether a significant relationship exists between data values in a first column of the pair of columns and data values in a second column of the pair of columns comprises one of:

applying a Chi-squared test and Cramer's V measure based at least in part on a determination that the relationship classification comprises categorical-categorical; or applying one or more of a one-way Analysis of Variance (ANOVA) test or a plurality of one-sample T-tests based at least in part on a determination that the relationship classification comprises categorical-numerical.

6. The method of claim 4, wherein applying one or more global statistical measures to data in the pair of columns to determine whether a significant relationship exists between data values in a first column of the pair of columns and data values in a second column of the pair of columns comprises:

applying the one or more global statistical measures to determine a strength of relationship between data values in a first column of the pair of columns and data values in a second column of the pair of columns;
determining whether the strength of relationship is above a predetermined threshold; and
determining that a significant relationship exists between data values in a first column of the pair of columns and data values in a second column of the pair of columns based at least in part on a determination that the strength of relationship is above the predetermined threshold.

7. The method of claim 4, wherein each relationship indicator in the plurality of relationship indicators comprises a circle having a size proportional to the relationship count of the corresponding column.

8. The method of claim 1, wherein applying one or more statistical measures to data in the two columns to generate association data quantifying a plurality of relationships between data values in a first column of the two columns and data values in a second column of the two columns comprises:

applying one or more global statistical measures to the data in the two columns to generate global association data, wherein the one or more global statistical measures are based at least in part on the relationship classification; and applying one or more categorical statistical measures to the data in the two columns generate categorical association data based at least in part on a determination that the relationship classification comprises either categorical-categorical or categorical-numerical, wherein the one or more categorical statistical measures are based at least in part on the relationship classification.

9. The method of claim 8, wherein applying one or more global statistical measures based at least in part on the relationship classification comprises one of:
- applying a Chi-squared test and Cramer's V measure based at least in part on a determination that the relationship classification comprises categorical-categorical; or
- applying one or more of a one-way ANOVA test or a plurality of one-sample T-tests based at least in part on a determination that the relationship classification comprises categorical-numerical.

10. The method of claim 8, wherein the relationship classification comprises categorical-categorical and wherein applying one or more categorical statistical measures to generate categorical association data comprises:
- determining an observed frequency of co-occurrence of categories in the second column with categories in the first column;
- determining an expected frequency of co-occurrence of the categories in the second column with the categories in the first column; and
- generating the categorical association data quantifying each relationship between each category in the first column and each category in the second column based at least in part on the observed frequency of co-occurrence and the expected frequency of co-occurrence.

11. The method of claim 10, wherein the visualization comprises:
- a global relationship indicator corresponding to the global association data;
- a first axis comprising the plurality of first indicators, wherein the plurality of first indicators are sorted according to a sorting criterion;
- a second axis comprising the plurality of second indicators, the plurality of second indicators representing a plurality of categories in the second column, wherein the plurality of second indicators are sorted according to the sorting criterion; and
- an interface configured to receive a user input relating to one or more of: the sorting criterion, the attribute indicated by each first indicator, one or more first indicators in the plurality of first indicators, or one or more second indicators in the plurality of second indicators;
- wherein the plurality of third indicators correspond to the categorical association data, each third indicator visually representing a relationship between a category in the plurality of categories in the first column and a category in the plurality of categories in the second column.

12. The method of claim 11, wherein the plurality of third indicators are arranged in rows corresponding to the plurality of first indicators and columns corresponding to the plurality of second indicators.

13. The method of claim 11, wherein each third indicator in the plurality of third indicators comprises one or more of: a color, a number, or a shape.

14. The method of claim 11, wherein the attribute indicated by each first indicator comprises one or more of: an intrinsic rank of a corresponding category, a frequency of a corresponding category, or a strength of association between a corresponding category in a column and all categories in another column.

15. The method of claim 11, further comprising:
- receiving, by at least one of the one or more computing devices, via the interface, a user input relating to one or more of: the sorting criterion, the attribute indicated by each first indicator, one or more first indicators in the plurality of first indicators, or one or more second indicators in the plurality of second indicators; and
- updating, by at least one of the one or more computing devices, one or more of: the global relationship indicator, the plurality of first indicators, the plurality of second indicators, or the third indicators based at least in part on the user input.

16. The method of claim 15, wherein the user input comprise a selection of one or more first indicators in the plurality of first indicators and a selection of one or more second indicators in the plurality of second indicators and further comprising:
- applying, by at least one of the one or more computing devices, the one or more global statistical measures to the data in one or more categories of the first column corresponding to the one or more first indicators and one or more categories of the second column corresponding to the one or more second indicators to generate new global association data;
- applying, by at least one of the one or more computing devices, the one or more categorical statistical measures to the data in the one or more categories of the first column and the one or more categories of the second column to generate new categorical association data; and
- updating, by at least one of the one or more computing devices, the visualization based at least in part on one or more of the new global association data or the new categorical association data;
- wherein the one or more categories of the first column correspond to the selected one or more first indicators in the first plurality of category indicators and wherein the one or more categories of the second column correspond to the selected one or more second indicators in the second plurality of category indicators.

17. The method of claim 8, wherein the relationship classification comprises categorical-numerical and wherein applying one or more categorical statistical measures to generate categorical association data comprises either:
- calculating results of a plurality of one-sample T-tests for categories in the first column and ranges of data values in the second column to generate the categorical association data quantifying each relationship between each category in the first column and each range of data values in the second column;
- or
- determining an observed frequency of co-occurrence of data values within ranges of data values in the second column with categories in the first column;
- determining an expected frequency of co-occurrence of data values within the ranges of data values in the second column with the categories in the first column; and
- generating the categorical association data quantifying each relationship between each category in the first column and each range of data values in the second column based at least in part on the observed frequency of co-occurrence and the expected frequency of co-occurrence.

18. The method of claim 17, wherein the visualization comprises:
- a global relationship indicator corresponding to the global association data;

a first axis comprising the plurality of first indicators, wherein the plurality of first indicators are sorted according to a sorting criterion;

a second axis comprising the plurality of second indicators, the plurality of second indicators representing a distribution of data values in the second column; and an interface configured to receive a user input relating to one or more of: the sorting criterion, the attribute indicated by each first indicator, one or more first indicators in the plurality of first indicators, or a range of data values in the distribution of data values in the second column;

wherein the plurality of third indicators correspond to the categorical association data, each third indicator visually representing a relationship between a corresponding category in the plurality of categories in the first column and one or more ranges of data values in the second column.

19. The method of claim 18, wherein the visualization further comprises:

a plurality of categorical distribution indicators corresponding to a distribution visualization type, wherein each categorical distribution indicator visually represents a distribution of data values in the second column corresponding to a category in the plurality of categories of the first column;

wherein the interface is further configured to receive a user input relating to the distribution visualization type.

20. The method of claim 19, further comprising:

receiving, by at least one of the one or more computing devices, via the interface, a user input relating to one or more of: the sorting criterion, the category attribute visually represented by each first indicator, one or more first indicators in the plurality of first indicators, the range of data values in the distribution of data values in the second column, or the distribution visualization type; and updating, by at least one of the one or more computing devices, one or more of: the global relationship indicator, the plurality of first indicators, the plurality of third indicators, or the plurality of categorical distribution indicators based at least in part on the user input.

21. The method of claim 18, wherein each third indicator in the plurality of third indicators comprises one or more of: a color, a number, or a shape.

22. The method of claim 18, wherein the attribute indicated by each first indicator comprises one or more of: an intrinsic rank of a corresponding category, a frequency of a corresponding category, or a strength of association between a corresponding category in a column and all data values in another column.

23. The method of claim 18, further comprising:

receiving, by at least one of the one or more computing devices, via the interface, a selection of a range of data values in the distribution of data values in the second column;

applying, by at least one of the one or more computing devices, the one or more global statistical measures to the data in the first column and data corresponding to the selected range of data values in the second column to generate new global association data;

applying, by at least one of the one or more computing devices, the one or more categorical statistical measures to the data in the first column and data corresponding to the selected range of data values in the second column to generate new categorical association data quantifying each relationship between each category in the first column and the selected range of data values in the second column; and updating, by at least one of the one or more computing devices, the visualization with one or more of the new global association data or the new categorical association data.

24. The method of claim 23, wherein updating the visualization with one or more of the new global association data or the new categorical association data comprises:

transmitting one or more new third indicators corresponding to the new categorical association data, wherein each new third indicator in the one or more new third indicators visually represents a relationship between a corresponding category in the plurality of categories in the first column and the selected range of data values in the second column.

25. The method of claim 24, wherein updating the visualization with one or more of the new global association data or the new categorical association data further comprises:

transmitting one or more remaining distribution indicators, wherein each remaining distribution indicator in the one or more remaining distribution indicators corresponds to a category in the plurality of categories in the first column and visually represents an attribute of the distribution of data values in the second column for that category relative to the selected range of data values in the second column for that category.

26. The method of claim 25, wherein each remaining distribution indicator visually represents a distance between a bound of the selected range of data values and a bound of a range of data values which includes a minimum percentage of all data values for that category.

27. The method of claim 26, wherein each remaining distribution indicator visually represents a quantity of data values for that category required to reach the minimum percentage.

28. The method of claim 27, wherein each remaining distribution indicator comprises a triangle, wherein the triangle is positioned relative to the selected range of data values based on the distance, and wherein the height of the triangle visually represents the quantity of data values for that category required to reach the minimum percentage.

29. The method of claim 23, further comprising:

applying, by at least one of the one or more computing devices, the one or more categorical statistical measures to the data in the first column and data corresponding to a plurality of subsets of the selected range of data values to generate subset categorical association data quantifying each relationship between each category in the first column and each subset in the plurality of subsets of the selected range of data values in the second column; and updating, by at least one of the one or more computing devices, the visualization with the subset categorical association data.

30. The method of claim 23, wherein receiving, via the interface, a selection of a range of data values in the distribution of data values in the second column comprises:

detecting, via the interface, a user input beginning at a starting point in the distribution of data values;

detecting, via the interface, a continuation of the user input to a current position beyond the starting point in the distribution of data values; and setting the range of data values to be the range between the starting point and the current position.

31. An apparatus for generating a categorical column relationship visualization interface, the apparatus comprising:
one or more processors; and
one or more memories operatively coupled to at least one of the one or more processors and having instructions stored thereon that, when executed by at least one of the one or more processors, cause at least one of the one or more processors to:
identify a relationship classification corresponding to two columns in a plurality of columns based on a data type of each column in the two columns, wherein a first column of the two columns comprises a categorical column and wherein the relationship classification comprises either a categorical-categorical classification or a categorical-numerical classification;
apply one or more statistical measures to data in the two columns to generate association data quantifying a plurality of relationships between categories in the first column and data values in a second column of the two columns, wherein the one or more statistical measures are determined based at least in part on the relationship classification; and
generate a visualization of the plurality of relationships by transforming the data in the two columns and the association data into a spatial arrangement of user interface elements based on the relationship classification, the visualization comprising:
a plurality of first indicators corresponding to a plurality of categories in the first column, each first indicator corresponding to a category in the plurality of categories and comprising a non-textual indicator that graphically represents an attribute of the corresponding category;
a plurality of second indicators corresponding to a plurality of values in the second column, each second indicator corresponding to a value in the plurality of values and comprising a non-textual indicator that graphically represents an attribute of the corresponding value; and
a plurality of third indicators corresponding to the plurality of relationships, each third indicator corresponding to a category in the plurality of categories and one or more values in the plurality of values and indicating a strength of relationship between the corresponding category in the first column and the corresponding one or more values in the second column.

32. The apparatus of claim 31, wherein the categorical data comprises one or more of nominal data and ordinal data.

33. The apparatus of claim 31, wherein at least one of the one or more memories has further instructions stored thereon that, when executed by at least one of the one or more processors, cause at least one of the one or more processors to:
receive a selection of two column identifiers corresponding to the two columns in the plurality of columns prior to identifying the relationship classification for the two columns of data.

34. The apparatus of claim 31, wherein at least one of the one or more memories has further instructions stored thereon that, when executed by at least one of the one or more processors, cause at least one of the one or more processors to:
determine a plurality of relationship classifications corresponding to a plurality of pairs of columns in the plurality of columns based on the data type of each column in each pair of columns, wherein each column in the plurality of columns has a corresponding relationship count;
for each pair of columns in the plurality of pairs of columns:
apply one or more global statistical measures to data in the pair of columns to determine whether a significant relationship exists between data values in a first column of the pair of columns and data values in a second column of the pair of columns, wherein the one or more global statistical measures are determined based at least in part on the relationship classification; and
increment the relationship count corresponding to each column in the pair of columns based at least in part on a determination that a significant relationship exists between data values in the first column of the pair of columns and data values in the second column of the pair of columns; and
transmit a plurality of relationship indicators corresponding to the plurality of columns, wherein each relationship indicator corresponds to a column in the plurality of columns and indicates the relationship count of that column.

35. The apparatus of claim 34, wherein the instructions that, when executed by at least one of the one or more processors, cause at least one of the one or more processors to apply one or more global statistical measures to data in the pair of columns to determine whether a significant relationship exists between data values in a first column of the pair of columns and data values in a second column of the pair of columns further cause at least one of the one or more processors to perform one of:
applying a Chi-squared test and Cramer's V measure based at least in part on a determination that the relationship classification comprises categorical-categorical; or
applying one or more of a one-way Analysis of Variance (ANOVA) test or a plurality of one-sample T-tests based at least in part on a determination that the relationship classification comprises categorical-numerical.

36. The apparatus of claim 34, wherein the instructions that, when executed by at least one of the one or more processors, cause at least one of the one or more processors to apply one or more global statistical measures to data in the pair of columns to determine whether a significant relationship exists between data values in a first column of the pair of columns and data values in a second column of the pair of columns further cause at least one of the one or more processors to:
apply the one or more global statistical measures to determine a strength of relationship between data values in a first column of the pair of columns and data values in a second column of the pair of columns;
determine whether the strength of relationship is above a predetermined threshold; and
determine that a significant relationship exists between data values in a first column of the pair of columns and data values in a second column of the pair of columns based at least in part on a determination that the strength of relationship is above the predetermined threshold.

37. The apparatus of claim 34, wherein each relationship indicator in the plurality of relationship indicators comprises a circle having a size proportional to the relationship count of the corresponding column.

38. The apparatus of claim 31, wherein the instructions that, when executed by at least one of the one or more processors, cause at least one of the one or more processors to apply one or more statistical measures to data in the two columns to generate association data quantifying a plurality of relationships between data values in a first column of the two columns and data values in a second column of the two columns further cause at least one of the one or more processors to:
  apply one or more global statistical measures to the data in the two columns to generate global association data, wherein the one or more global statistical measures are based at least in part on the relationship classification; and
  apply one or more categorical statistical measures to the data in the two columns generate categorical association data based at least in part on a determination that the relationship classification comprises either categorical-categorical or categorical-numerical, wherein the one or more categorical statistical measures are based at least in part on the relationship classification.

39. The apparatus of claim 38, wherein the instructions that, when executed by at least one of the one or more processors, cause at least one of the one or more processors to applying one or more global statistical measures based at least in part on the relationship classification further cause at least one of the one or more processors to:
  applying a Chi-squared test and Cramer's V measure based at least in part on a determination that the relationship classification comprises categorical-categorical; or
  applying one or more of a one-way ANOVA test or a plurality of one-sample T-tests based at least in part on a determination that the relationship classification comprises categorical-numerical.

40. The apparatus of claim 38, wherein the relationship classification comprises categorical-categorical and wherein the instructions that, when executed by at least one of the one or more processors, cause at least one of the one or more processors to apply one or more categorical statistical measures to generate categorical association data further cause at least one of the one or more processors to:
  determine an observed frequency of co-occurrence of categories in the second column with categories in the first column;
  determine an expected frequency of co-occurrence of the categories in the second column with the categories in the first column; and
  generate the categorical association data quantifying each relationship between each category in the first column and each category in the second column based at least in part on the observed frequency of co-occurrence and the expected frequency of co-occurrence.

41. The apparatus of claim 40, wherein the visualization comprises:
  a global relationship indicator corresponding to the global association data;
  a first axis comprising the plurality of first indicators, wherein the plurality of first indicators are sorted according to a sorting criterion;
  a second axis comprising the plurality of second indicators, the plurality of second indicators representing a plurality of categories in the second column, wherein the plurality of second indicators are sorted according to the sorting criterion; and
  an interface configured to receive a user input relating to one or more of: the sorting criterion, the attribute indicated by each first indicator, one or more first indicators in the plurality of first indicators, or one or more second indicators in the plurality of second indicators;
  wherein the plurality of third indicators correspond to the categorical association data, each third indicator visually representing a relationship between a category in the plurality of categories in the first column and a category in the plurality of categories in the second column.

42. The apparatus of claim 41, wherein the plurality of third indicators are arranged in rows corresponding to the plurality of first indicators and columns corresponding to the plurality of second indicators.

43. The apparatus of claim 41, wherein each third indicator in the plurality of third indicators comprises one or more of: a color, a number, or a shape.

44. The apparatus of claim 41, wherein the attribute indicated by each first indicator comprises one or more of: an intrinsic rank of a corresponding category, a frequency of a corresponding category, or a strength of association between a corresponding category in a column and all categories in another column.

45. The apparatus of claim 41, wherein at least one of the one or more memories has further instructions stored thereon that, when executed by at least one of the one or more processors, cause at least one of the one or more processors to:
  receive, via the interface, a user input relating to one or more of: the sorting criterion, the attribute indicated by each first indicator, one or more first indicators in the plurality of first indicators, or one or more second indicators in the plurality of second indicators; and
  update one or more of: the global relationship indicator, the plurality of first indicators, the plurality of second indicators, or the third indicators based at least in part on the user input.

46. The apparatus of claim 45, wherein the user input comprise a selection of one or more first indicators in the plurality of first indicators and a selection of one or more second indicators in the plurality of second indicators and wherein at least one of the one or more memories has further instructions stored thereon that, when executed by at least one of the one or more processors, cause at least one of the one or more processors to:
  apply the one or more global statistical measures to the data in one or more categories of the first column corresponding to the one or more first indicators and one or more categories of the second column corresponding to the one or more second indicators to generate new global association data;
  apply the one or more categorical statistical measures to the data in the one or more categories of the first column and the one or more categories of the second column to generate new categorical association data; and
  update the visualization based at least in part on one or more of the new global association data or the new categorical association data;
  wherein the one or more categories of the first column correspond to the selected one or more first indicators in the first plurality of category indicators and wherein the one or more categories of the second column correspond to the selected one or more second indicators in the second plurality of category indicators.

47. The apparatus of claim 38, wherein the relationship classification comprises categorical-numerical and wherein the instructions that, when executed by at least one of the one or more processors, cause at least one of the one or more processors to apply one or more categorical statistical measures to generate categorical association data further cause at least one of the one or more processors to either:
calculate results of a plurality of one-sample T-tests for categories in the first column and ranges of data values in the second column to generate the categorical association data quantifying each relationship between each category in the first column and each range of data values in the second column;
or
determine an observed frequency of co-occurrence of data values within ranges of data values in the second column with categories in the first column;
determine an expected frequency of co-occurrence of data values within the ranges of data values in the second column with the categories in the first column; and
generate the categorical association data quantifying each relationship between each category in the first column and each range of data values in the second column based at least in part on the observed frequency of co-occurrence and the expected frequency of co-occurrence.

48. The apparatus of claim 47, wherein the visualization comprises:
a global relationship indicator corresponding to the global association data;
a first axis comprising the plurality of first indicators, wherein the plurality of first indicators are sorted according to a sorting criterion;
a second axis comprising the plurality of second indicators, the plurality of second indicators representing a distribution of data values in the second column; and
an interface configured to receive a user input relating to one or more of: the sorting criterion, the attribute indicated by each first indicator, one or more first indicators in the plurality of first indicators, or a range of data values in the distribution of data values in the second column;
wherein the plurality of third indicators correspond to the categorical association data, each third indicator visually representing a relationship between a corresponding category in the plurality of categories in the first column and one or more ranges of data values in the second column.

49. The apparatus of claim 48, wherein the visualization further comprises:
a plurality of categorical distribution indicators corresponding to a distribution visualization type, wherein each categorical distribution indicator visually represents a distribution of data values in the second column corresponding to a category in the plurality of categories of the first column;
wherein the interface is further configured to receive a user input relating to the distribution visualization type.

50. The apparatus of claim 49, wherein at least one of the one or more memories has further instructions stored thereon that, when executed by at least one of the one or more processors, cause at least one of the one or more processors to:
receive, via the interface, a user input relating to one or more of: the sorting criterion, the category attribute visually represented by each first indicator, one or more first indicators in the plurality of first indicators, the range of data values in the distribution of data values in the second column, or the distribution visualization type; and
update one or more of: the global relationship indicator, the plurality of first indicators, the plurality of third indicators, or the plurality of categorical distribution indicators based at least in part on the user input.

51. The apparatus of claim 48, wherein each third indicator in the plurality of third indicators comprises one or more of: a color, a number, or a shape.

52. The apparatus of claim 48, wherein the attribute indicated by each first indicator comprises one or more of: an intrinsic rank of a corresponding category, a frequency of a corresponding category, or a strength of association between a corresponding category in a column and all data values in another column.

53. The apparatus of claim 48, wherein at least one of the one or more memories has further instructions stored thereon that, when executed by at least one of the one or more processors, cause at least one of the one or more processors to:
receive via the interface, a selection of a range of data values in the distribution of data values in the second column;
apply the one or more global statistical measures to the data in the first column and data corresponding to the selected range of data values in the second column to generate new global association data;
apply the one or more categorical statistical measures to the data in the first column and data corresponding to the selected range of data values in the second column to generate new categorical association data quantifying each relationship between each category in the first column and the selected range of data values in the second column; and
update the visualization with one or more of the new global association data or the new categorical association data.

54. The apparatus of claim 53, wherein the instructions that, when executed by at least one of the one or more processors, cause at least one of the one or more processors to update the visualization with one or more of the new global association data or the new categorical association data further cause at least one of the one or more processors to:
transmit one or more new third indicators corresponding to the new categorical association data, wherein each new third indicator in the one or more new third indicators visually represents a relationship between a corresponding category in the plurality of categories in the first column and the selected range of data values in the second column.

55. The apparatus of claim 54, wherein the instructions that, when executed by at least one of the one or more processors, cause at least one of the one or more processors to update the visualization with one or more of the new global association data or the new categorical association data further cause at least one of the one or more processors to:
transmit one or more remaining distribution indicators, wherein each remaining distribution indicator in the one or more remaining distribution indicators corresponds to a category in the plurality of categories in the first column and visually represents an attribute of the distribution of data values in the second column for that category relative to the selected range of data values in the second column for that category.

56. The apparatus of claim 55, wherein each remaining distribution indicator visually represents a distance between a bound of the selected range of data values and a bound of a range of data values which includes a minimum percentage of all data values for that category.

57. The apparatus of claim 56, wherein each remaining distribution indicator visually represents a quantity of data values for that category required to reach the minimum percentage.

58. The apparatus of claim 57, wherein each remaining distribution indicator comprises a triangle, wherein the triangle is positioned relative to the selected range of data values based on the distance, and wherein the height of the triangle visually represents the quantity of data values for that category required to reach the minimum percentage.

59. The apparatus of claim 53, wherein at least one of the one or more memories has further instructions stored thereon that, when executed by at least one of the one or more processors, cause at least one of the one or more processors to:
apply the one or more categorical statistical measures to the data in the first column and data corresponding to a plurality of subsets of the selected range of data values to generate subset categorical association data quantifying each relationship between each category in the first column and each subset in the plurality of subsets of the selected range of data values in the second column; and
update the visualization with the subset categorical association data.

60. The apparatus of claim 53, wherein the instructions that, when executed by at least one of the one or more processors, cause at least one of the one or more processors to receive, via the interface, a selection of a range of data values in the distribution of data values in the second column further cause at least one of the one or more processors to:
detect, via the interface, a user input beginning at a starting point in the distribution of data values;
detect, via the interface, a continuation of the user input to a current position beyond the starting point in the distribution of data values; and
set the range of data values to be the range between the starting point and the current position.

61. At least one non-transitory computer-readable medium storing computer-readable instructions that, when executed by one or more computing devices, cause at least one of the one or more computing devices to:
identify a relationship classification corresponding to two columns in a plurality of columns based on a data type of each column in the two columns, wherein a first column of the two columns comprises a categorical column and wherein the relationship classification comprises either a categorical-categorical classification or a categorical-numerical classification;
apply one or more statistical measures to data in the two columns to generate association data quantifying a plurality of relationships between categories in the first column and data values in a second column of the two columns, wherein the one or more statistical measures are determined based at least in part on the relationship classification; and
generate a visualization of the plurality of relationships by transforming the data in the two columns and the association data into a spatial arrangement of user interface elements based on the relationship classification, the visualization comprising:
a plurality of first indicators corresponding to a plurality of categories in the first column, each first indicator corresponding to a category in the plurality of categories and comprising a non-textual indicator that graphically represents an attribute of the corresponding category;
a plurality of second indicators corresponding to a plurality of values in the second column, each second indicator corresponding to a value in the plurality of values and comprising a non-textual indicator that graphically represents an attribute of the corresponding value; and
a plurality of third indicators corresponding to the plurality of relationships, each third indicator corresponding to a category in the plurality of categories and one or more values in the plurality of values and indicating a strength of relationship between the corresponding category in the first column and the corresponding one or more values in the second column.

62. The at least one non-transitory computer-readable medium of claim 61, wherein the categorical data comprises one or more of nominal data and ordinal data.

63. The at least one non-transitory computer-readable medium of claim 61, further storing computer-readable instructions that, when executed by at least one of the one or more computing devices, cause at least one of the one or more computing devices to:
receive a selection of two column identifiers corresponding to the two columns in the plurality of columns prior to identifying the relationship classification for the two columns of data.

64. The at least one non-transitory computer-readable medium of claim 61, further storing computer-readable instructions that, when executed by at least one of the one or more computing devices, cause at least one of the one or more computing devices to:
determine a plurality of relationship classifications corresponding to a plurality of pairs of columns in the plurality of columns based on the data type of each column in each pair of columns, wherein each column in the plurality of columns has a corresponding relationship count;
for each pair of columns in the plurality of pairs of columns:
apply one or more global statistical measures to data in the pair of columns to determine whether a significant relationship exists between data values in a first column of the pair of columns and data values in a second column of the pair of columns, wherein the one or more global statistical measures are determined based at least in part on the relationship classification; and
increment the relationship count corresponding to each column in the pair of columns based at least in part on a determination that a significant relationship exists between data values in the first column of the pair of columns and data values in the second column of the pair of columns; and
transmit a plurality of relationship indicators corresponding to the plurality of columns, wherein each relationship indicator corresponds to a column in the plurality of columns and indicates the relationship count of that column.

65. The at least one non-transitory computer-readable medium of claim 64, wherein the instructions that, when executed by at least one of the one or more computing devices, cause at least one of the one or more computing devices to apply one or more global statistical measures to data in the pair of columns to determine whether a significant relationship exists between data values in a first column of the pair of columns and data values in a second column of the pair of columns further cause at least one of the one or more computing devices to perform one of:
  applying a Chi-squared test and Cramer's V measure based at least in part on a determination that the relationship classification comprises categorical-categorical; or
  applying one or more of a one-way Analysis of Variance (ANOVA) test or a plurality of one-sample T-tests based at least in part on a determination that the relationship classification comprises categorical-numerical.

66. The at least one non-transitory computer-readable medium of claim 64, wherein the instructions that, when executed by at least one of the one or more computing devices, cause at least one of the one or more computing devices to apply one or more global statistical measures to data in the pair of columns to determine whether a significant relationship exists between data values in a first column of the pair of columns and data values in a second column of the pair of columns further cause at least one of the one or more computing devices to:
  apply the one or more global statistical measures to determine a strength of relationship between data values in a first column of the pair of columns and data values in a second column of the pair of columns;
  determine whether the strength of relationship is above a predetermined threshold; and
  determine that a significant relationship exists between data values in a first column of the pair of columns and data values in a second column of the pair of columns based at least in part on a determination that the strength of relationship is above the predetermined threshold.

67. The at least one non-transitory computer-readable medium of claim 64, wherein each relationship indicator in the plurality of relationship indicators comprises a circle having a size proportional to the relationship count of the corresponding column.

68. The at least one non-transitory computer-readable medium of claim 61, wherein the instructions that, when executed by at least one of the one or more computing devices, cause at least one of the one or more computing devices to apply one or more statistical measures to data in the two columns to generate association data quantifying a plurality of relationships between data values in a first column of the two columns and data values in a second column of the two columns further cause at least one of the one or more computing devices to:
  apply one or more global statistical measures to the data in the two columns to generate global association data, wherein the one or more global statistical measures are based at least in part on the relationship classification; and
  apply one or more categorical statistical measures to the data in the two columns generate categorical association data based at least in part on a determination that the relationship classification comprises either categorical-categorical or categorical-numerical, wherein the one or more categorical statistical measures are based at least in part on the relationship classification.

69. The at least one non-transitory computer-readable medium of claim 68, wherein the instructions that, when executed by at least one of the one or more computing devices, cause at least one of the one or more computing devices to applying one or more global statistical measures based at least in part on the relationship classification further cause at least one of the one or more computing devices to perform one of:
  applying a Chi-squared test and Cramer's V measure based at least in part on a determination that the relationship classification comprises categorical-categorical; or
  applying one or more of a one-way ANOVA test or a plurality of one-sample T-tests based at least in part on a determination that the relationship classification comprises categorical-numerical.

70. The at least one non-transitory computer-readable medium of claim 68, wherein the relationship classification comprises categorical-categorical and wherein the instructions that, when executed by at least one of the one or more computing devices, cause at least one of the one or more computing devices to apply one or more categorical statistical measures to generate categorical association data further cause at least one of the one or more computing devices to:
  determine an observed frequency of co-occurrence of categories in the second column with categories in the first column;
  determine an expected frequency of co-occurrence of the categories in the second column with the categories in the first column; and
  generate the categorical association data quantifying each relationship between each category in the first column and each category in the second column based at least in part on the observed frequency of co-occurrence and the expected frequency of co-occurrence.

71. The at least one non-transitory computer-readable medium of claim 70, wherein the visualization comprises:
  a global relationship indicator corresponding to the global association data;
  a first axis comprising the plurality of first indicators, wherein the plurality of first indicators are sorted according to a sorting criterion;
  a second axis comprising the plurality of second indicators, the plurality of second indicators representing a plurality of categories in the second column, wherein the plurality of second indicators are sorted according to the sorting criterion; and
  an interface configured to receive a user input relating to one or more of: the sorting criterion, the attribute indicated by each first indicator, one or more first indicators in the plurality of first indicators, or one or more second indicators in the plurality of second indicators;
  wherein the plurality of third indicators correspond to the categorical association data, each third indicator visually representing a relationship between a category in the plurality of categories in the first column and a category in the plurality of categories in the second column.

72. The at least one non-transitory computer-readable medium of claim 71, wherein the plurality of third indicators are arranged in rows corresponding to the plurality of first indicators and columns corresponding to the plurality of second indicators.

73. The at least one non-transitory computer-readable medium of claim 71, wherein each third indicator in the plurality of third indicators comprises one or more of: a color, a number, or a shape.

74. The at least one non-transitory computer-readable medium of claim 71, wherein the attribute indicated by each first indicator comprises one or more of: a name of a corresponding category, an intrinsic rank of a corresponding category, a frequency of a corresponding category, or a strength of association between a corresponding category in a column and all categories in another column.

75. The at least one non-transitory computer-readable medium of claim 71, further storing computer-readable instructions that, when executed by at least one of the one or more computing devices, cause at least one of the one or more computing devices to:
receive, via the interface, a user input relating to one or more of: the sorting criterion, the attribute indicated by each first indicator, one or more first indicators in the plurality of first indicators, or one or more second indicators in the plurality of second indicators; and
update one or more of: the global relationship indicator, the plurality of first indicators, the plurality of second indicators, or the third indicators based at least in part on the user input.

76. The at least one non-transitory computer-readable medium of claim 75, wherein the user input comprise a selection of one or more first indicators in the plurality of first indicators and a selection of one or more second indicators in the plurality of second indicators and further storing computer-readable instructions that, when executed by at least one of the one or more computing devices, cause at least one of the one or more computing devices to:
apply the one or more global statistical measures to the data in one or more categories of the first column corresponding to the one or more first indicators and one or more categories of the second column corresponding to the one or more second indicators to generate new global association data;
apply the one or more categorical statistical measures to the data in the one or more categories of the first column and the one or more categories of the second column to generate new categorical association data; and
update the visualization based at least in part on one or more of the new global association data or the new categorical association data;
wherein the one or more categories of the first column correspond to the selected one or more first indicators in the first plurality of category indicators and wherein the one or more categories of the second column correspond to the selected one or more second indicators in the second plurality of category indicators.

77. The at least one non-transitory computer-readable medium of claim 68, wherein the relationship classification comprises categorical-numerical and wherein the instructions that, when executed by at least one of the one or more computing devices, cause at least one of the one or more computing devices to apply one or more categorical statistical measures to generate categorical association data further cause at least one of the one or more computing devices to either:
calculate results of a plurality of one-sample T-tests for categories in the first column and ranges of data values in the second column to generate the categorical association data quantifying each relationship between each category in the first column and each range of data values in the second column;
or
determine an observed frequency of co-occurrence of data values within ranges of data values in the second column with categories in the first column;
determine an expected frequency of co-occurrence of data values within the ranges of data values in the second column with the categories in the first column; and
generate the categorical association data quantifying each relationship between each category in the first column and each range of data values in the second column based at least in part on the observed frequency of co-occurrence and the expected frequency of co-occurrence.

78. The at least one non-transitory computer-readable medium of claim 77, wherein the visualization comprises:
a global relationship indicator corresponding to the global association data;
a first axis comprising the plurality of first indicators, wherein the plurality of first indicators are sorted according to a sorting criterion;
a second axis comprising the plurality of second indicators, the plurality of second indicators representing a distribution of data values in the second column; and
an interface configured to receive a user input relating to one or more of: the sorting criterion, the attribute indicated by each first indicator, one or more first indicators in the plurality of first indicators, or a range of data values in the distribution of data values in the second column;
wherein the plurality of third indicators correspond to the categorical association data, each third indicator visually representing a relationship between a corresponding category in the plurality of categories in the first column and one or more ranges of data values in the second column.

79. The at least one non-transitory computer-readable medium of claim 78, wherein the visualization further comprises:
a plurality of categorical distribution indicators corresponding to a distribution visualization type, wherein each categorical distribution indicator visually represents a distribution of data values in the second column corresponding to a category in the plurality of categories of the first column;
wherein the interface is further configured to receive a user input relating to the distribution visualization type.

80. The at least one non-transitory computer-readable medium of claim 79, further storing computer-readable instructions that, when executed by at least one of the one or more computing devices, cause at least one of the one or more computing devices to:
receive, via the interface, a user input relating to one or more of: the sorting criterion, the category attribute visually represented by each first indicator, one or more first indicators in the plurality of first indicators, the range of data values in the distribution of data values in the second column, or the distribution visualization type; and
update one or more of: the global relationship indicator, the plurality of first indicators, the plurality of third indicators, or the plurality of categorical distribution indicators based at least in part on the user input.

81. The at least one non-transitory computer-readable medium of claim 78, wherein each third indicator in the plurality of third indicators comprises one or more of: a color, a number, or a shape.

82. The at least one non-transitory computer-readable medium of claim 78, wherein the attribute indicated by each first indicator comprises one or more of: an intrinsic rank of a corresponding category, a frequency of a corresponding category, or a strength of association between a corresponding category in a column and all data values in another column.

83. The at least one non-transitory computer-readable medium of claim 78, further storing computer-readable instructions that, when executed by at least one of the one or more computing devices, cause at least one of the one or more computing devices to:
   receive via the interface, a selection of a range of data values in the distribution of data values in the second column;
   apply the one or more global statistical measures to the data in the first column and data corresponding to the selected range of data values in the second column to generate new global association data;
   apply the one or more categorical statistical measures to the data in the first column and data corresponding to the selected range of data values in the second column to generate new categorical association data quantifying each relationship between each category in the first column and the selected range of data values in the second column; and
   update the visualization with one or more of the new global association data or the new categorical association data.

84. The at least one non-transitory computer-readable medium of claim 83, wherein the instructions that, when executed by at least one of the one or more computing devices, cause at least one of the one or more computing devices to update the visualization with one or more of the new global association data or the new categorical association data further cause at least one of the one or more computing devices to:
   transmit one or more new third indicators corresponding to the new categorical association data, wherein each new third indicator in the one or more new third indicators visually represents a relationship between a corresponding category in the plurality of categories in the first column and the selected range of data values in the second column.

85. The at least one non-transitory computer-readable medium of claim 84, wherein the instructions that, when executed by at least one of the one or more computing devices, cause at least one of the one or more computing devices to update the visualization with one or more of the new global association data or the new categorical association data further cause at least one of the one or more computing devices to:
   transmit one or more remaining distribution indicators, wherein each remaining distribution indicator in the one or more remaining distribution indicators corresponds to a category in the plurality of categories in the first column and visually represents an attribute of the distribution of data values in the second column for that category relative to the selected range of data values in the second column for that category.

86. The at least one non-transitory computer-readable medium of claim 85, wherein each remaining distribution indicator visually represents a distance between a bound of the selected range of data values and a bound of a range of data values which includes a minimum percentage of all data values for that category.

87. The at least one non-transitory computer-readable medium of claim 86, wherein each remaining distribution indicator visually represents a quantity of data values for that category required to reach the minimum percentage.

88. The at least one non-transitory computer-readable medium of claim 87, wherein each remaining distribution indicator comprises a triangle, wherein the triangle is positioned relative to the selected range of data values based on the distance, and wherein the height of the triangle visually represents the quantity of data values for that category required to reach the minimum percentage.

89. The at least one non-transitory computer-readable medium of claim 83, further storing computer-readable instructions that, when executed by at least one of the one or more computing devices, cause at least one of the one or more computing devices to:
   apply the one or more categorical statistical measures to the data in the first column and data corresponding to a plurality of subsets of the selected range of data values to generate subset categorical association data quantifying each relationship between each category in the first column and each subset in the plurality of subsets of the selected range of data values in the second column; and
   update the visualization with the subset categorical association data.

90. The at least one non-transitory computer-readable medium of claim 83, wherein the instructions that, when executed by at least one of the one or more computing devices, cause at least one of the one or more computing devices to receive, via the interface, a selection of a range of data values in the distribution of data values in the second column further cause at least one of the one or more computing devices to:
   detect, via the interface, a user input beginning at a starting point in the distribution of data values;
   detect, via the interface, a continuation of the user input to a current position beyond the starting point in the distribution of data values; and
   set the range of data values to be the range between the starting point and the current position.

* * * * *